US012559968B2

(12) United States Patent
Leites et al.

(10) Patent No.: US 12,559,968 B2
(45) Date of Patent: Feb. 24, 2026

(54) DOOR LOCK ASSEMBLY WITH SELF ADJUSTING SPINDLES

(71) Applicant: ASSA ABLOY Access and Egress Hardware Group, Inc., New Haven, CT (US)

(72) Inventors: Rick Leites, West Haven, CT (US); Eric Palmieri, Rocky Hill, CT (US); Sharath Ramachandran, New Haven, CT (US); Scott Morstatt, Maryville, TN (US); Douglas Clark, Wallingford, CT (US)

(73) Assignee: ASSA ABLOY Access and Egress Hardware Group, Inc., New Haven, CT (US)

( * ) Notice: Subject to any disclaimer, the term of this patent is extended or adjusted under 35 U.S.C. 154(b) by 162 days.

(21) Appl. No.: 17/736,692

(22) Filed: May 4, 2022

(65) Prior Publication Data

US 2022/0356731 A1 Nov. 10, 2022

Related U.S. Application Data

(60) Provisional application No. 63/232,838, filed on Aug. 13, 2021, provisional application No. 63/184,512, filed on May 5, 2021.

(51) Int. Cl.

*E05B 3/06* (2006.01)
*E05B 15/00* (2006.01)
*E05B 47/06* (2006.01)

(52) U.S. Cl.

CPC .......... *E05B 3/065* (2013.01); *E05B 47/0615* (2013.01); *E05B 15/0033* (2013.01)

(58) Field of Classification Search

CPC ........ E05B 3/065; E05B 3/06; E05B 47/0615; E05B 15/0033; E05B 15/04; E05B 65/108; E05B 9/02; E05B 2047/0048; E05B 2047/0058; E05B 2047/0084; E05B 17/0004; E05B 17/002; E05B 47/0012; E05B 47/0603; E05B 47/0692;

(Continued)

(56) References Cited

U.S. PATENT DOCUMENTS 3,856,339 A 12/1974 Tornoe et al.
5,529,354 A 6/1996 Studt et al.

(Continued)

FOREIGN PATENT DOCUMENTS

AU 2022219947 A1 * 9/2023 ........... E05B 1/0053
CA 2695647 A1 * 9/2010 ......... E05B 15/0013

(Continued)

OTHER PUBLICATIONS

KR200296127Y1 Nov. 11, 2022 Espacenet machine translation claims and description (Year: 2024).*

(Continued)

*Primary Examiner* — Steven A Tullia
(74) *Attorney, Agent, or Firm* — Wolf, Greenfield & Sacks, P.C.

(57) ABSTRACT

A door lock system that adjusts to doors of different thicknesses. The door lock system may include self-adjusting spindles that engage and center a lock body in a door. The spindles may exert equal and opposing forces that center the lock body within the door and align the lock body with a latch.

20 Claims, 52 Drawing Sheets

(58) Field of Classification Search

CPC ......... E05B 65/1046; E05B 2015/0406; E05B 63/04; E05B 9/00; E05B 63/16; E05B 63/0056; E05B 2015/0448; E05B 13/106; Y10T 292/57

See application file for complete search history.

(56) References Cited

U.S. PATENT DOCUMENTS

| | | | | |
|---|---|---|---|---|
| 5,730,014 | A | 3/1998 | Berger et al. | |
| 6,223,572 | B1 | 5/2001 | Marttinen | |
| 6,351,976 | B1 * | 3/2002 | Chen | E05B 13/10 292/336.3 |
| 7,082,794 | B2 * | 8/2006 | Shen | E05B 17/0062 292/169.22 |
| 7,178,373 | B2 * | 2/2007 | Shen | E05B 17/0062 292/169.22 |
| 8,544,903 | B1 * | 10/2013 | Shamp | E05B 63/10 292/1.5 |
| 9,169,666 | B2 * | 10/2015 | Hodgin | E05B 3/08 |
| 9,464,458 | B2 | 10/2016 | Huang et al. | |
| 10,724,274 | B2 * | 7/2020 | Murphy | E05B 55/005 |
| 11,187,008 | B2 * | 11/2021 | Kwon | E05B 13/005 |
| 11,391,059 | B2 | 7/2022 | Alber et al. | |
| 11,885,161 | B2 | 1/2024 | Clark et al. | |
| 2002/0113445 | A1 | 8/2002 | Brown | |
| 2005/0212306 | A1 * | 9/2005 | Huang | E05B 63/006 292/336.3 |
| 2007/0046038 | A1 | 3/2007 | Schlack et al. | |
| 2008/0111384 | A1 * | 5/2008 | Ellis | E05B 3/065 292/336.3 |
| 2009/0277232 | A1 * | 11/2009 | Walsh, III | E05B 47/0661 70/278.7 |
| 2011/0248518 | A1 | 10/2011 | Tien | |
| 2013/0009410 | A1 | 1/2013 | Ludwig et al. | |
| 2014/0001772 | A1 | 1/2014 | Mani | |
| 2014/0159392 | A1 | 6/2014 | Tsai et al. | |
| 2015/0013402 | A1 | 1/2015 | Murphy | |
| 2015/0015003 | A1 | 1/2015 | Tsai et al. | |
| 2016/0298360 | A1 | 10/2016 | Moon | |
| 2017/0275911 | A1 | 9/2017 | Holman et al. | |
| 2017/0275915 | A1 * | 9/2017 | Murphy | E05B 55/005 |
| 2019/0024412 | A1 | 1/2019 | Lammers et al. | |
| 2019/0136581 | A1 | 5/2019 | Barker et al. | |
| 2019/0213813 | A1 | 7/2019 | Chong et al. | |
| 2021/0010297 | A1 | 1/2021 | Murphy et al. | |
| 2021/0310281 | A1 | 10/2021 | Barker et al. | |
| 2021/0388635 | A1 * | 12/2021 | Stendal | E05B 63/16 |
| 2022/0356729 | A1 | 11/2022 | Leites et al. | |
| 2022/0356730 | A1 | 11/2022 | Leites et al. | |
| 2022/0356732 | A1 | 11/2022 | Leites et al. | |
| 2023/0049416 | A1 | 2/2023 | Clark et al. | |
| 2023/0053324 | A1 | 2/2023 | Leites et al. | |

FOREIGN PATENT DOCUMENTS

| | | | | | |
|---|---|---|---|---|---|
| CN | 114382341 | A | | 4/2022 | |
| DE | 10 2011 051 553 | A1 | | 1/2013 | |
| GB | 655528 | A | * | 7/1951 | E05B 3/00 |
| GB | 2170551 | A | * | 8/1986 | E05B 55/00 |
| GB | 2391286 | A | * | 2/2004 | E05B 3/00 |
| GB | 2534682 | A | * | 8/2016 | E05B 15/0033 |
| JP | H08511843 | A | * | 12/1996 | E05B 15/02 |
| KR | 200296127 | Y1 | * | 8/2002 | E05B 3/14 |
| KR | 20090000457 | U | * | 1/2009 | E05B 3/06 |
| KR | 20100114671 | A | * | 4/2009 | E05B 15/0033 |
| KR | 20130036831 | A | * | 10/2011 | E05B 63/0056 |
| NZ | 588454 | A | * | 1/2011 | E05B 3/065 |
| WO | WO-9425709 | A1 | * | 11/1994 | E05B 15/02 |
| WO | WO-2005111347 | A1 | * | 11/2005 | E05B 63/16 |
| WO | WO-2007008694 | A2 | * | 1/2007 | E05B 47/0661 |
| WO | WO-2013192207 | A1 | * | 12/2013 | E05B 15/02 |
| WO | WO-2018158476 | A1 | * | 9/2018 | E04H 4/10 |
| WO | WO-2019212362 | A1 | * | 11/2019 | E05B 3/065 |
| WO | WO-2020074393 | A1 | * | 4/2020 | E05B 15/0033 |
| WO | WO-2021050422 | A1 | * | 3/2021 | E05B 15/0033 |

OTHER PUBLICATIONS

Clark et al., Door Lock Assembly. Co-pending U.S. Appl. No. 17/736,620, filed May 4, 2022.

Clark et al., Door Lock Assembly with Safeguarding Against Bypassing. Co-pending U.S. Appl. No. 17/736,724, filed May 4, 2022.

Clark et al., Door Lock Assembly Including Weatherization. Co-pending U.S. Appl. No. 17/736,747, filed May 4, 2022.

Clark et al., Door Lock Assembly with Waggle Reduction. Co-pending U.S. Appl. No. 17/736,782, filed May 4, 2022.

Clark et al., Door Lock Assembly with Keyless Handle. Co-pending U.S. Appl. No. 17/856,225, filed Jul. 1, 2022.

U.S. Appl. No. 17/736,620, filed May 4, 2022, Clark et al.

U.S. Appl. No. 17/736,724, filed May 4, 2022, Clark et al.

U.S. Appl. No. 17/736,747, filed May 4, 2022, Clark et al.

U.S. Appl. No. 17/736,782, filed May 4, 2022, Clark et al.

U.S. Appl. No. 17/856,225, filed Jul. 1, 2022, Clark et al.

* cited by examiner

DOOR LOCK ASSEMBLY WITH SELF ADJUSTING SPINDLES

CROSS-REFERENCE TO RELATED APPLICATIONS

This application claims the benefit under 35 U.S.C. § 119 (e) to U.S. Provisional Application Ser. No. 63/184,512, entitled "DOOR LOCK ASSEMBLY WITH SELF ADJUSTING SPINDLES," filed May 5, 2021, and to U.S. Provisional Application Ser. No. 63/232,838 entitled "DOOR LOCK ASSEMBLY WITH SELF ADJUSTING SPINDLES," filed Aug. 13, 2021, each of which is herein incorporated by reference in its entirety.

FIELD

This disclosure relates generally to door lock assemblies, including bored lock assemblies, mortise lock assemblies, exit devices, and deadbolt assemblies.

BACKGROUND

It has become increasingly common for exterior doors to be equipped with electromechanical locking systems. Such locking systems include electrical hardware. Often, these electromechanical locking systems include portions mounted on both the inside and outside surfaces of the door.

SUMMARY

In some embodiments, a handing assembly for a door lock system comprises a housing including an opening, a disc positioned in the housing, wherein the disc includes an outer spindle extending from the disc through the opening, and a spring configured to bias the disc toward a first position. The handing assembly also comprises a catch configured to engage the disc when the disc is moved from the first position to a second position and to retain the disc in the second position.

In some embodiments, a method of handing a handle of a door lock system comprises moving a disc from a first position to a second position in a first direction, biasing the disc toward the first position with a spring in a second direction opposite the first direction, retaining the disc in the second position by engaging a first recess of the disc with a catch, and moving the outer spindle to a third position in the first direction while the catch is engaged with the first recess.

In some embodiments, a door lock system comprises a first spindle and a second spindle extending along a lock axis. The door lock system further comprises a lock body wherein the first spindle is configured to engage a first side of the lock body to bias the lock body in a first direction along the lock axis, and the second spindle is configured to engage a second side of the lock body opposite the first side of the lock body to bias the lock body in a second direction along the lock axis. The first direction is opposite the second direction, and the first spindle and the second spindle exert equal and opposite forces on the lock body.

In some embodiments, a method for installing a lock body in a door comprises engaging a first spindle on a first side of a lock body along a lock axis, wherein the first spindle biases the lock body in a first direction along the lock axis. The method further comprises engaging a second spindle on a second side of a lock body along the lock axis, wherein the second spindle biases the lock body in a second direction opposite the first direction, and wherein the first spindle and the second spindle exert equal and opposing forces on the lock body to center the lock body along a central plane of a door.

In some embodiments, a lock portion of an electronic door lock system comprises a first housing including a backplate having a first surface and a second surface opposite the first surface, wherein the second surface is configured to be mounted against a door surface. The lock portion further comprises a second housing disposed within the first housing and attached to the first surface of the backplate, wherein the second housing is secured to the backplate by one or more fasteners that are only accessible from the second surface of the backplate. The lock portion further comprises an actuator disposed in the second housing and one or more power wires contained within the second housing, wherein the one or more power wires are connected to the actuator, wherein the one or more power wires are configured to selectively supply power to the actuator, and wherein the one or more power wires are secured to the second housing in a loop.

In some embodiments, a method of securing wiring in an electronic door lock system comprises passing a wire into a first housing through a first opening in a backplate of the first housing, inserting the wire into a second opening of a second housing disposed in the first housing, wherein the second housing is attached to a first surface of the backplate, looping the wire around a ledge attached to the second housing such that a first section of the wire overlaps a second section of the wire, and compressing the first section and the second section together to form a loop.

In some embodiments, a door lock system comprises a lock spindle aligned along a lock axis, a first end of the lock spindle configured to engage a lock body, an outer spindle aligned along the lock axis and cooperating with the lock spindle, the outer lock spindle having a first diameter, and a disc operatively connected to the outer spindle. The disc has an opening centered on the lock axis to slidingly receive the lock spindle along the lock axis. The disc has a second diameter larger than the first diameter, wherein the opening and the lock spindle have complementary shapes, and wherein torque is transmitted from a handle to the disc and from the disc to the lock spindle via the opening.

In some embodiments, a method of operating a door lock system comprises inserting a lock spindle aligned along a lock axis through an opening in a disc to engage a first end of the lock spindle in a lock body, wherein the opening and the lock spindle have complementary shapes. The method further comprises rotating an outer spindle operatively coupled to the disc about the lock axis, wherein torque is transmitted from the outer spindle to the disc and from the disc to the lock spindle via the opening.

In some embodiments, a door lock system comprises a handle attached to an outer spindle extending along a lock axis and a locking block disposed in the handle, wherein the locking block is moveable along the lock axis between a first position and a second position. The door lock system further comprises a lock spindle configured to engage a portion of the locking block to move the locking block from the first position to the second position.

In some embodiments, a method of removing a handle from a door lock system comprise biasing a locking block disposed in a handle in a first direction along a lock axis to a first position, wherein when the locking block is in the first position, a first portion of the locking block is positioned adjacent a catch that secures the handle to an outer spindle. The method further comprises moving the locking block along a lock axis in a second direction, opposite the first direction, from the first position to a second position, wherein when the locking block is in the second position, a second portion of the locking block is positioned adjacent the catch. The method further comprises moving the catch from an engaged position to a disengaged position.

In some embodiments, a door lock system comprises an exterior lock portion including an exterior escutcheon and an exterior housing, a printed circuit board disposed between the exterior escutcheon and the exterior housing, and a gasket disposed on a first side of the printed circuit board, wherein the gasket includes an L-shaped perimeter that wraps around a perimeter of the circuit board and covers a portion of a second side of the printed circuit board. The door lock system further comprises a plate disposed between the gasket and the exterior escutcheon, wherein the plate is configured to compress the L-shaped perimeter of the gasket against a ridge that protrudes from the exterior housing, wherein the ridge is configured to compress into the L-shaped perimeter to create a seal around the printed circuit board.

In some embodiments, a door lock system comprises an exterior lock portion and an outer spindle disposed in the exterior lock portion that extends through an opening in the exterior lock portion. The door lock system further comprises a gasket disposed in the exterior lock portion, wherein the gasket includes an opening through which the outer spindle extends, the opening including a beveled perimeter having a smaller diameter on an outer surface than a diameter on an inner surface, wherein the smaller diameter of the opening is smaller than a diameter of the outer spindle such that the smaller diameter is configured to compress against the outer spindle.

In some embodiments, a door lock system comprises an interior housing having a battery compartment disposed therein, the interior housing including a slanted surface at least partially surrounding the battery compartment wherein the slanted surface includes a rib that protrudes from the slanted surface around at least a portion of the battery compartment. The door lock system further comprises a battery cover enclosing the battery compartment, and wherein an inner surface of the battery cover includes a slanted surface that complements the slanted surface on the housing. The door lock system further comprises a first compressible insert disposed between the slanted surface of the housing and the slanted surface of the batter cover, wherein the rib on the slanted surface is configured to compress into the first compressible insert.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings.

DETAILED DESCRIPTION

Figure 1:
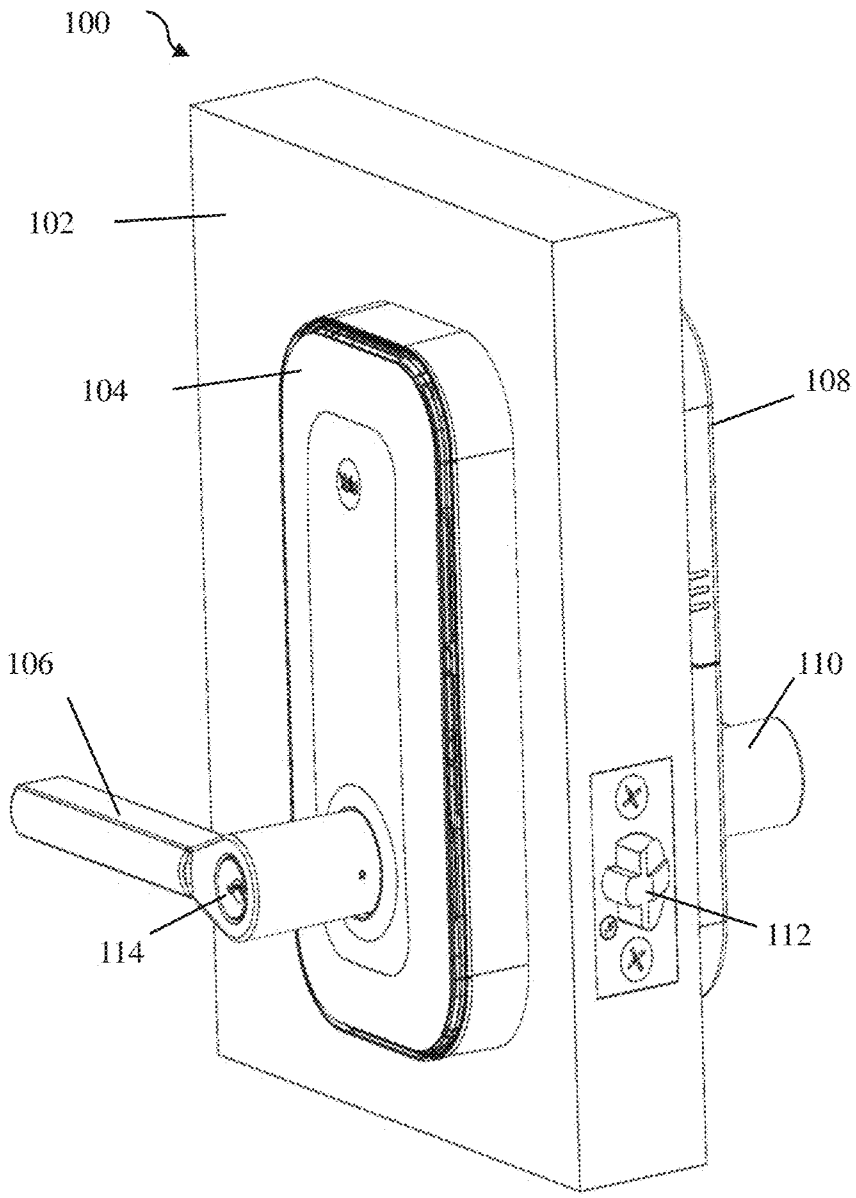
FIG. 1 is a perspective view of an embodiment of a door lock system.

Handles and locks in door lock systems are either left-handed or right-handed, depending on which way a door swings open. If door lock systems with the wrong handing are installed, the door may not open or close properly and/or the handles may be installed upside down or rotate in the wrong direction. In conventional systems, changing the handing of the locks and handles may not be possible, or it may be difficult and require extra tools and/or components to disassemble and reassemble the door lock system to provide the appropriate handing.

In view of the above, the inventors have recognized and appreciated designs for a door lock system in which the handles can each be quickly and reliably set as left-handed or right-handed to accommodate the door on which the door lock system is installed. In this manner, the door lock system may be universal for any door installation, whether it be left-handed or right-handed. The door lock system may be purchased or shipped with or without handles attached. The handing of the door lock system need not be considered prior to installation and the handles may be initially in a default position, or otherwise not set as either left-handed or right-handed. During installation on a door, the rotating a handle or a handing assembly on the door lock system in one of two directions from the default position to a left or right home position may set the handing of the handles based on the door's swing. The handing may also be optionally returned to the default position and subsequently reset to the left or right home position without disassembling the door lock system or any extra tools. The handing of the door lock system may be set and/or reset prior to or after handles have been attached to the door lock system.

In some embodiments, a door lock system may include a toolless handing assembly disposed at least partially in the lock portion that may set the handing of a handle. The handing assembly may include a rotatable disc within a housing. An outer spindle attached to the disc may extend through an opening in the housing to allow a user to rotate the disc from an initial, default position, to a right or left home position. For example, the installer may rotate the spindle clockwise for a left handle or rotate the spindle counterclockwise for a right handle. A spring may maintain the disc in the default position, where the spring may be unloaded until the outer spindle rotates the disc to either the left or right home position, causing the spring to load. Once in the left or right home position, a catch may engage a recess in the disc to retain the disc in the respective home position and to counter the force exerted on the disc by the loaded spring. The catch may retain the disc in the home position but allow rotation of the disc in a range of motion to allow the handle to rotate and open the door. The loaded spring may also cause a handle attached to the door lock system to return to the set home position after pressure has been applied to rotate the handle and open the door.

In some embodiments, a handing assembly may include an adjustment lever attached to the end of the outer spindle to assist in rotating the outer spindle and disc from a default position to a home position. In some embodiments, the adjustment lever may include an arrow or other position marker to indicate which way to turn the spindle to set the appropriate handing. For example, in some embodiments the arrow or other position marker may indicate which direction to rotate the adjustment lever so that the position maker points to a door latch. In some embodiments, the adjustment lever may be removed and replaced with a handle before the handing has been set. In such embodiments, the handle may be employed to rotate the spindle to set the appropriate handing for the door lock system. In some embodiments, the adjustment lever may be removed and replaced with a handle after the handing has been set. In some embodiments, a handle may be initially attached to the outer spindle and no adjustment lever may be employed, as the present disclosure is not so limited.

The inventors have further recognized and appreciated designs for a toolless handing assembly that can reset the handing of a door lock system without taking apart the door lock system or otherwise replacing components of the door lock system. As discussed previously, in some embodiments the handing assembly may include a catch configured to engage a recess form in a disc when a spindle is moved to a home position from a default position. To reset the handing assembly, the catch may be released from the recess in the disc, causing the disc to rotate back to the default position due to the force of a spring. In some embodiments, the catch may be spring loaded to bias the catch toward the recess in the disc. To release the catch and reset the handing assembly, a user may simply move the spring-loaded catch from an engaged position to a disengaged position (e.g., pull up on the spring-loaded catch). In other embodiments, the handing assembly may include an opening in a lock portion back-plate that the catch may protrude through. When the door lock system is installed on a door, a surface of the door may push against the catch to move the catch to an engaged position to engage the catch in the recess in the disc. The surface of the door may also and hold the catch in the recess in the disc and inhibit the catch from moving to a disengaged position. Removing the door lock system from the door (or, in some embodiments, a portion of the door lock system including at least the catch) may remove the force holding the catch in the engaged position, thereby allowing the catch to move to the disengaged position and allowing the spring to rotate the disc. Once the catch is in the disengaged position, the spring may automatically reset the handing assembly to the default position. The door lock system could then be reinstalled on the same or a new door with a different handing, if desired.

Door lock systems are not only left or right handed, but are also manufactured to fit doors of particular standard door thicknesses. Typically, door lock systems made for doors with one thickness may not be installed on doors with other thicknesses. Conventional door locks may be designed to meet security and wear standards and therefore may be made with rigid parts to comply with these standards, making it difficult to change the dimension of the lock system to fit doors of different thicknesses. Furthermore, a lock body installed in the door typically needs to be centered in the door to align with a latch. Accordingly, installing a conventional door lock system designed for one door thickness onto a door with a different door thickness may result in a poorly performing or non-functional door lock.

In view of the above, the inventors have recognized and appreciated designs for a door lock system that may automatically and reliably adjust to doors of different thicknesses. In this manner, the door lock system may be universal for typical door installation, no matter the typical door thickness. In particular, the inventors have appreciated the benefits of a door lock system including self-adjusting spindles that engage and position a lock body in a door. The spindles may each exert an opposing and equal force that centers the lock body within the door and align the lock body with a latch regardless of the door thickness.

In some embodiments, a door lock system may include a lock body positioned within an opening of a door. The lock body may include openings on each side of the lock body to receive a pair of lock spindles that position the lock body within the door. The openings may be symmetrically aligned on the lock body (e.g., the openings may be disposed on opposing sides of the lock body) and the lock spindles and the openings may be aligned along a common axis that is perpendicular to a plane of the door. The spindles may be slidably held within an exterior lock portion and an interior lock portion installed on an exterior and interior side of the door. The spindles may slide horizontally through an opening in a rear surface of the exterior and interior lock portions. In some embodiments, springs may bias the lock spindles toward the lock body through the openings in the rear surfaces. The springs may exert opposing forces on each of the lock spindles to position the lock body in the door. In some embodiments, the springs may have equal spring constants such that the springs exert approximately equal and opposing forces on each of the lock spindles to center the lock body in the door. In other embodiments, the springs may have unequal spring constants such that the springs exert unequal, opposing forces on each of the lock spindles to maintain the lock body in an off-centered alignment in the door, as the present disclosure is not so limited. The openings in the rear surface of the lock portions may include ridges that engage ledges on the lock spindles to prevent the springs from pushing the lock spindles completely through the openings.

Conventional handlesets in door lock systems include a trim plate that is mounted to an exterior side of a door and a handle (e.g., knob or lever) rotationally attached via a shank to a cylindrical spindle through an opening in the plate. The cylindrical spindle may engage an opening in a lock body inside the door. When the handle is rotated, the handle may rotate the shank and spindle about a center axis perpendicular to a plane of the door, and the lock body may convert the rotational motion into linear motion to retract a latch in the door and allow the door to be opened. Because of tolerances in each of the connections between the components and because of the mounting arrangement for the door lock system in the door, a handle may be able to shift and partially rotate without opening the door. Accordingly, such conventional arrangements may result in a loose (also referred to as "waggle") handle. Furthermore, the shank and spindle typically have small diameters relative to their lengths along the center axis. Accordingly, the long, thin spindles may not sufficiently stabilize the handle, and the handle may move or shift from the center axis, also resulting in such a loose handle.

In view of the above, the inventors have recognized and appreciated designs for a door lock system that efficiently and reliably translates torque from a handle to a lock body and reduces or eliminates unwanted movement of a handle. In some embodiments, rotational motion may be directly translated to a disc with a large diameter that retains the lock spindle in a spindle opening. The lock spindle and the spindle opening may have complementary non-circular shapes and sizes such that the lock spindle is coupled to the disc about the center axis. The spindle lock being coupled to the disc and the increased diameter of the disc more efficiently transmits torque through the lock spindle on a lock body when a handle is rotated, and better supports the handle along a center axis.

Electronic door lock systems may include data wires and power wires interconnecting various electrical components. The data wires may transmit information between an exterior and interior lock portion regarding the state of the system (e.g., unlocked, locked, access denied, access granted, etc.). The power wires may power operating components, such as an actuator that may actuate to lock and unlock the system. With electronic door lock systems, it may be beneficial to unlock the door from an exterior side. An exterior lock portion may include an input device for a user to present a credential. For example, the exterior lock portion may include a keypad to enter in an access code or a scanner for a user to scan in an access code (e.g., using an RFID card, fingerprint or other biometric identifier, smartphone, etc.). Once the credential is verified, the door lock system may automatically unlock or allow a user to manually unlock the system. Electronic door locks may be utilized in any of the embodiments described herein.

Typically, a valid electronic signal transmitted along the data wires is required to cause a processor to send power to the actuator to unlock the system (e.g., after presenting an authorized credential). However, if the power wires connected to the actuator are accessed externally (i.e., the door lock system is breached) then an alternate power source may be connected to the wires to actuate the actuator and unlock the system without proper credentials.

In view of the above, the inventors have recognized and appreciated designs for an electronic door lock system that includes a reinforcement area to protect power wires from being accessed during an attempted breach of the system. In the event an exterior lock portion has been damaged and/or parts of the lock portion have been removed, the power wires may remain protected inside a secondary housing, which may be formed of a durable material like metal (e.g., stainless steel). The secondary housing may be attached (e.g., back screwed) to a backplate that is mounted to a door by an interior lock portion. Accordingly, the secondary housing may not be removable from the backplate from the exterior side. In this manner, even if all other components of the exterior lock portion have been removed, the secondary housing may not be breached, and the power wires may remain protected inside the secondary housing.

In some embodiments, a door lock system may include a secondary housing to hold and protect the data and/or power wires that control the operating components. The secondary housing may include a cover with wings extending from sides of the cover. The wings may be attached to a backplate via screw holes inserted from the rear of the backplate. The screws may only be removed from the rear of the backplate. Thus, the cover may not be removed from the exterior side of the lock portion (i.e., the side facing away from the door). Accordingly, the components housed inside of the secondary housing may not be non-destructively accessible from the exterior side of a door.

The inventors have further recognized and appreciated designs for a door lock system that secures wiring within a secondary housing. In some embodiments, power wires may connect to an actuator that is also securely held within the secondary housing, but data wires may extend through an opening in the secondary housing to connect to an electronic component (e.g., light emitting diode array, credential reader, keypad, etc.) in the exterior lock portion outside the secondary housing. The power wires and the data wires may be connected as part of the same wiring loop until they split to connect to their respective electric components. In some instances, an unauthorized user attempting to bypass the door lock system may attempt to access the power wires by pulling on the exposed data wires to also pull the power wires out of the secondary housing. Accordingly, in some embodiments, the wiring may be installed in the secondary housing by wrapping the wires around and compressing the wires between various ledges and ridges formed by the secondary housing to create a wire loop. Looping and compressing the wires into a loop may relieve any strain placed on the wires if someone were to pull on the exposed data wires. Specifically, the loop may inhibit an unauthorized user's ability to pull the power wires out of the secondary housing by applying force to the accessible data wires. In some embodiments, the secondary housing may include various ridges and ledges to compress, wrap, and pinch the data and power wires as they pass into the exterior lock portion from an opening in a metal backplate and travel through the secondary housing to their respective operating components. Thus, the door lock system provides a secure system that safeguards against attempts to bypass the electric locking components.

Door lock systems may include a mechanism to remove a door handle, such as in the event a user desires to replace the handle. For example, some handles may include a small opening to access a handle catch disposed inside the handle that secures the handle to a shank. The handle may be removed by inserting an object into the opening and moving the handle catch to disengage the catch from the handle. Once the handle is removed, however, the door lock security may be compromised. In many door lock systems, a key cylinder in the handle and shank may prevent the catch from being disengaged from the handle when the key cylinder is rotated to a locked state. The key cylinder may be shaped and positioned in the shank such that the catch may be moved only when the lock cylinder has been rotated to an unlocked state. When the key cylinder is in a locked state, however, the key cylinder may prevent the catch from being moved by someone attempting to breach the lock.

Some embodiments of door lock systems (whether electronic or not) may have handles that are key free, or may not include a key cylinder in the handle that can selectively block movement of a catch to prevent removal of the handle. Such embodiments are referred to as "keyless" cylinders hereinafter. In view of the above, the inventors have recognized and appreciated designs for a secure handle with a keyless cylinder that may be removed via an opening to access a handle catch that secures the handle to a shank. In some embodiments, the keyless cylinder may include a locking block disposed in the handle that is moveable between a locked state, which prevents a handle catch from being pushed in, and an unlocked state, which allows the handle catch to be pushed in to disengage the handle.

In some embodiments, the locking block may be spring loaded or otherwise biased in a first direction along a lock axis toward the door to a locked position. The locking block may only be moved in a second direction, opposite the first direction, to an unlocked state by pushing a lock spindle in the second direction. The lock spindle may exert a force on the locking block in the second direction and overcome the spring force to move the locking block to the unlocked position. The lock spindle may only be accessed from an inner side of a backplate of the exterior lock portion when the lock portion is removed from the door. Because the back plate is back screwed to the door from an interior side, the exterior lock portion may only be removed from an interior side of the door. A user needs to already have access to an interior side of the door to remove the lock portion from the door and push in the lock spindle to move the locking block to the second, unlocked position. Accordingly, only in this unlocked position, may an exterior handle be removed.

In some embodiments, the lock spindle is slidingly disposed in a square opening of a spindle coupler and is spring loaded to be biased out of the lock portion in the second direction toward a door. Accordingly, a user trying to remove a handle would need to continuously hold the lock spindle in the pushed in position against the spring force in the second direction, and therefore would only have one hand to both insert an object into the handle opening to push in the handle catch and pull off the handle. In view of the above, the inventors have recognized and appreciated designs for a lock spindle that can be held in the pushed in position. In some embodiments, the lock spindle may include notches on corners near a first end that, when the lock spindle is pushed in the second direction through the square opening, the notches line up with ridges in the opening of the spindle coupler. The ridges may allow the allow the lock spindle to be rotated about the lock axis. In the rotated state, the notches may include ledges that engage a rear surface of the spindle coupler to hold the lock spindle in the pushed-in position along the lock axis. With the lock spindle held in the pushed in position, a user may use both hands to remove the exterior handle.

When exterior portions of door locks are installed, it is unlikely that the internal environment of those exterior portions are entirely isolated from the external environments. Air from the environment could enter the housing of the door lock from any gap in the housing, whether the gap was intentional or not. For example, air from the environment may enter from the inside of the door through door prep holes, from around the exterior housing through any gaps between housing components or between the housing and the door, from any gap formed between the housing and the handle extending from the housing, or from any other naturally formed gap or accidentally formed gap in the housing. Since the air within the housing is partially isolated from the environment, the internal temperature and humidity does not immediately change as the environment changes and instead slowly equilibrates with the environment as environmental air leaks into the housing.

In regions where temperature and humidity changes dramatically over the course of a day, when the environment warms up, hot and humid air can enter into the housing of a door lock, contacting the colder air within. Similarly, when the environment cools, cold and dry air can leak into the housing and contact warmer and more humid air within the housing. Due to the possibility of gas exchange between the inside and outside of the housing, without wishing to be limited to theory, the changing conditions within the housing can result in condensation forming within the housing. As one of skill in the art would understand, condensation making contact with either electrical or mechanical components of an electronic door lock system could lead to damage of the door lock system. Recognizing this possibility, the inventors have contemplated that electrical door lock systems could be improved.

In one embodiment, an electronic door lock system includes specifically designed gaskets and housing components, shaped such that the gaskets are compressed between portions of the door lock housing having a perimeter ridge that presses into the gasket, creating a seal around electrical and mechanical components to mitigate gas exchange or water flow between the inside of the housing and the outside of the housing.

For the purposes of this disclosure, the terms “inner” and “inward” refer to being closer to the door and the terms “outer” and “outward” refer to being further from the door. The terms “upper” and “upward” refer to the direction away from the ground, while the terms “lower” and “downward” refer to the direction pointing towards the ground. One of skill in the art should understand that although the embodiments herein are described as being in a certain orientation, the systems and devices described are not limited to the described orientation and could function and apply in different orientations as well. The side of the door facing the area to be secured will be referred to as the “interior,” and the side opposite the area to be secured will be referred to as the “exterior.”

It should be understood that unless otherwise differentiated, when air and/or water flow is referred to as entering or potentially entering the housing, or the exterior or interior portions of the door lock, unless otherwise differentiated, both refer to air and/or water penetrating beyond the surfaces of the door lock that are intended to contact the outside environment such that air and/or water enters the internal environment of the door lock.

In some embodiments, an electronic door lock system may include a first gasket in an exterior lock portion sized and shaped to match an entire surface of a circuit board disposed in the exterior lock portion between the first gasket and an exterior housing. The gasket may cover a first side of the circuit board and include an L-shaped perimeter that wraps around a perimeter edge of the circuit board and partially onto a second side of the circuit board. An outer plate may be disposed between the first gasket and a front cover of the exterior lock portion. These components may be secured and tightened together via screws and screw holes such that the outer plate compresses the l-shaped perimeter of the first gasket against a ledge in the exterior housing that extends circumferentially around the entire perimeter of the circuit board. The ledge may include a triangular shaped ridge that presses into the L-shaped perimeter of the gasket to seal against entry of water and air.

The inventors have also contemplated that air and water could enter the mechanical area of the exterior lock portion through a possible gap between the door handle and the exterior escutcheon of the exterior lock portion. For example, an outer spindle or shank may extend through an opening in a front cover housing to receive a handle. Because air and water may leak in through this opening, the inventors have appreciated and recognized designs to mitigate air flow through this opening while still allowing the outer spindle to rotate to open a door. In some embodiments, the first gasket includes an opening with a beveled perimeter. The beveled perimeter may have an outer diameter smaller than an inner diameter and a diameter of an outer spindle such that the beveled perimeter pushes outward and compresses against a surface of the outer spindle, creating a seal around the outer spindle while still allowing the outer spindle to rotate within the opening to open a door.

In some embodiments, an electronic door lock system may include a second gasket disposed in an interior housing of an interior lock portion. The second gasket may cover a first side of a circuit board and include an L-shaped perimeter that surrounds a perimeter edge of the circuit board. An inner plate disposed between a back plate of the interior lock portion and a second side of the circuit board may compress the perimeter of the gasket against a wall in the interior housing. The wall may have a shape that matches the perimeter of the gasket, resulting in uniform compression around the gasket perimeter, and sealing the circuit board from entry of water and air. The wall may include a beveled edge that presses into the perimeter of the gasket, providing additional gasket sealing to further ensure that air and gas flow is obstructed between the compressing surfaces.

In some embodiments, the second gasket and/or the interior housing include a plurality of openings that could be designed to permit the passage of components from the electrical door lock system that are designed to extend into or through the gasket and/or a surface in the interior housing. For example, these components could include but are not limited to: fasteners to secure the housing, power and/or signal connections, and/or drive bars connecting to the latch. The inventors have also recognized that if the openings are not exactly the same size as the component that extends through the opening, a passage for air and water to enter portions of the door lock could be created. In these embodiments, the openings may include protruding beveled ledges that circumferentially surround the openings that compress into a surface of the gasket when the lock portion is assembled, mitigating air and water flow through these openings. Furthermore, an opening in the gasket may include a protruding rib that extends from the outer surface of the second gasket and circumferentially surround the opening. The protruding rib may press against a corresponding protruding ledge of the interior housing to form a seal when the lock portion is assembled.

Batteries in electronic door lock systems risk corrosion if exposed to moisture. The inventors have recognized and appreciated designs for sealing battery compartments from entry of water and air. In some embodiments, a battery compartment may be disposed on a slanted surface of an interior housing of an interior lock portion. The sloped surface may include one or more ribs that extend around the battery compartment. The interior housing may include a battery cover that slides up and down the interior housing to remove and attach the cover. The battery cover may include an inner sloped surface that matches the sloped surface on the front cover such that the slanted surfaces are positioned next to each other when the cover is attached. A compressible insert may be disposed between the slanted surface such that when the battery cover is fully attached to the interior housing, the one or more ribs may press into the compressible insert to create a seal against water entry around the battery compartment. The sloped surfaces prevent the ribs from pressing into the compressible insert until the cover is fully attached to allow the cover to easily slide up and down to change the batteries.

The material for the first and second gaskets may be any suitable material that can compress and create a suitable seal. In one embodiment, the gasket is formed of a flexible material. In one embodiment, the gasket is formed from a rubber-like material. In one embodiment, the gasket is formed silicone rubber material. Plastic materials may also be used. The gasket body may have a thickness of equal to or greater than approximately 0.5 mm, 0.75 mm, 1 mm, or 1.25 mm. The gasket body may have a thickness of less than or equal to approximately 1.5 mm, 1.75 mm, 2 mm, 2.5 mm, 3 mm. The materials for the compressible insert may be any suitable that can compress and create a suitable seal. In one embodiment, the compressible insert is made of foam. In one embodiment, the compressible insert may be made of a rubber-like material or a plastic material.

Turning to the figures, specific non-limiting embodiments are described in further detail. It should be understood that the various systems, components, features, and methods described relative to these embodiments may be used either individually and/or in any desired combination as the disclosure is not limited to only the specific embodiments described herein.

FIG. 1 illustrates a door lock system 100 installed on a door 102 in accordance with some embodiments. The door lock system 100 includes an exterior lock portion 104, an exterior handle 106, an interior lock portion 108, an interior handle 110, a lock body inside the door (see FIG. 10), and a lock latch 112. In some embodiments as shown in FIG. 1, the door lock system 100 may be an electronic locking system. The embodiment of FIG. 1 illustrates a left-handed reverse lock with a door that swings open toward the exterior side. When the exterior handle 106 is rotated downward in a counterclockwise direction relative to a plane of the door, the lock body converts the rotational motion into linear motion to retract the lock latch 112 and allow the door 102 to be opened. The exterior handle 106 may include a lock cylinder 114 or other access entry system such as a keypad or device configured to receive an electronic credential or command that prevents the lock body from retracting the latch 112 until a key or other credential is presented. Similarly, the interior handle 110 may be rotated downward in a clockwise direction relative to the plane of the door to release the latch 112 to open the door 102. In some embodiments, no credential may be required before the interior handle may be rotated to release the latch 112 to open the door 102.

Handing Assembly

Figure 2:
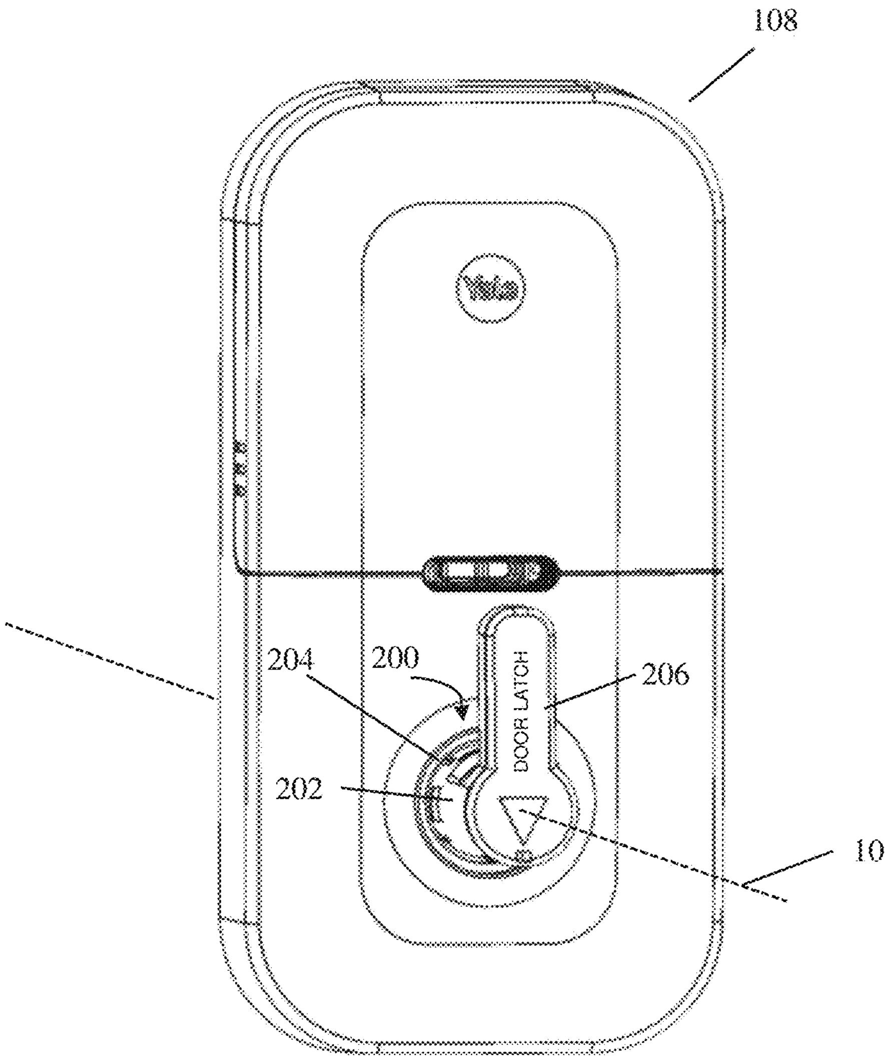
FIG. 2 is a perspective view of an embodiment of an interior lock portion with a handing assembly.

FIG. 2 illustrates an embodiment of the interior lock portion 108 without the interior handle 110. In some embodiments, the state of the interior lock portion 108 in FIG. 2 may be a state in which the interior lock portion is initially installed on a door. In some embodiments, the interior lock portion 108 includes a handing assembly 200 to set the handing of the handle 110. The handing assembly 200 may include a first outer spindle 202 that extends through an opening 204 in the face of the interior lock portion 108. In some embodiments the handing assembly may include an adjustment lever 206 attached to the first outer spindle 202. The handing assembly 200 may have a default position, such as with the adjustment lever 206 pointing upward as shown in FIG. 2, before the handing is set. Rotating the handing assembly 200 a set number of degrees, such as 90 degrees, about axis 10 may set the handle with either a left or right handing, depending on which way the tool 200 is rotated. axis 10 extends in a direction perpendicular to the lock portion and door. Once set, the handing assembly is in a home position. Depending on the direction the handing assembly is rotated, the handing assembly may be in a left home position or a right home position. As discussed in more detail below with respect to FIGS. 5 and 8A-8C, the adjustment tool may include a catch 220 that locks the handing assembly 200 in a respective home position while allowing the handle 110 to rotate to open the lock latch 112.

In some embodiments, the adjustment lever 206 may include an arrow indicating the door latch where the lock latch 112 is located on the edge of the door indicating which way to turn the handing assembly 200. It should be noted that the adjustment lever 206 may be optional and not required to use to the adjustment tool. In some embodiments, the adjustment lever 206 may be discarded after setting the handing of the handle.

Figure 3:
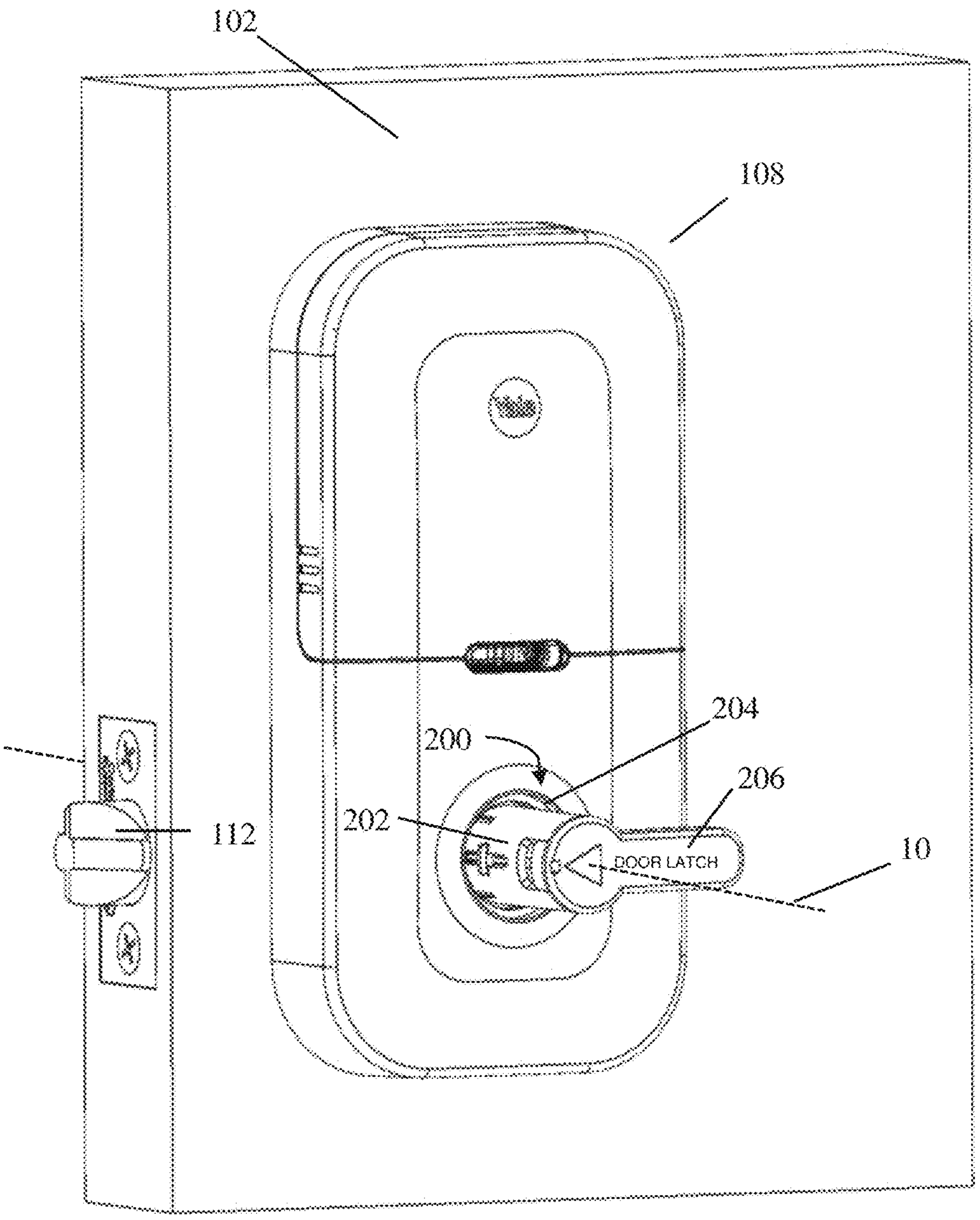
FIG. 3 is a perspective view of the interior lock portion of FIG. 2 attached to a door with the handing assembly set as left-handed.

As shown in FIG. 3, the handing assembly 200 of an interior lock portion 108 on an interior side of a door 102 may be set in a right home position (e.g., the handle sticks out to the right when viewing an exterior of the door) and may be ready to receive a handle. A handle (e.g., a lever or knob) may be any type of door hardware that may be attached to the first outer spindle 202. As shown in FIG. 3, the adjustment lever 206 and first outer spindle 202 have been rotated 90 degrees in a first (e.g., clockwise) direction relative to a plane of the door 102 about axis 10. In some embodiments, the door lock system 100 may be shipped without interior or exterior handles 110, 106. The separate interior and/or exterior handles may be attached to the first outer spindle 202 after setting the handing. The handing may be set as either left or right and may be reset as desired even after handles 106, 110 are attached. Although the interior lock portion is illustrated in the figures, the same concepts apply to the exterior lock portion 104 for handing the exterior handle 106.

Figure 4:
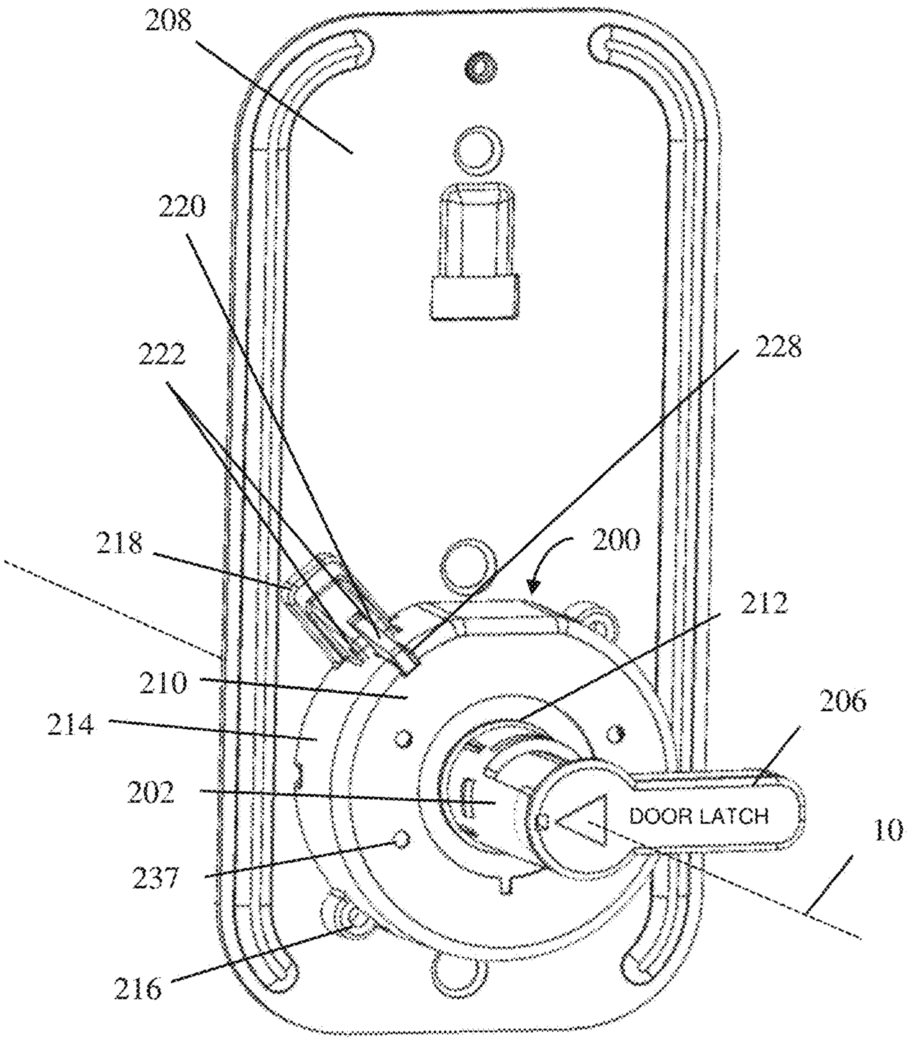
FIG. 4 is a perspective view of the interior lock portion of FIG. 2 with an outer cover of the interior lock portion removed to expose the handing assembly.

FIG. 4 illustrates the handing assembly 200 attached to a backplate 208 of the interior lock portion 108 shown in FIG. 3, according to some embodiments. As shown in FIG. 4, the adjustment tool 200 may include a housing 210 with an opening 212 through which the first outer spindle 202 extends. The opening 212 and first outer spindle 202 may have complementary circular shapes such that the first outer spindle 202 may rotate within opening 212 about axis 10. The housing 210 may be round and have a perimeter wall 214 that extends from the backplate 208 in a direction along axis 10. The housing 210 may also include screw holes 216 for attaching the adjustment tool to the backplate 208.

Figure 5:
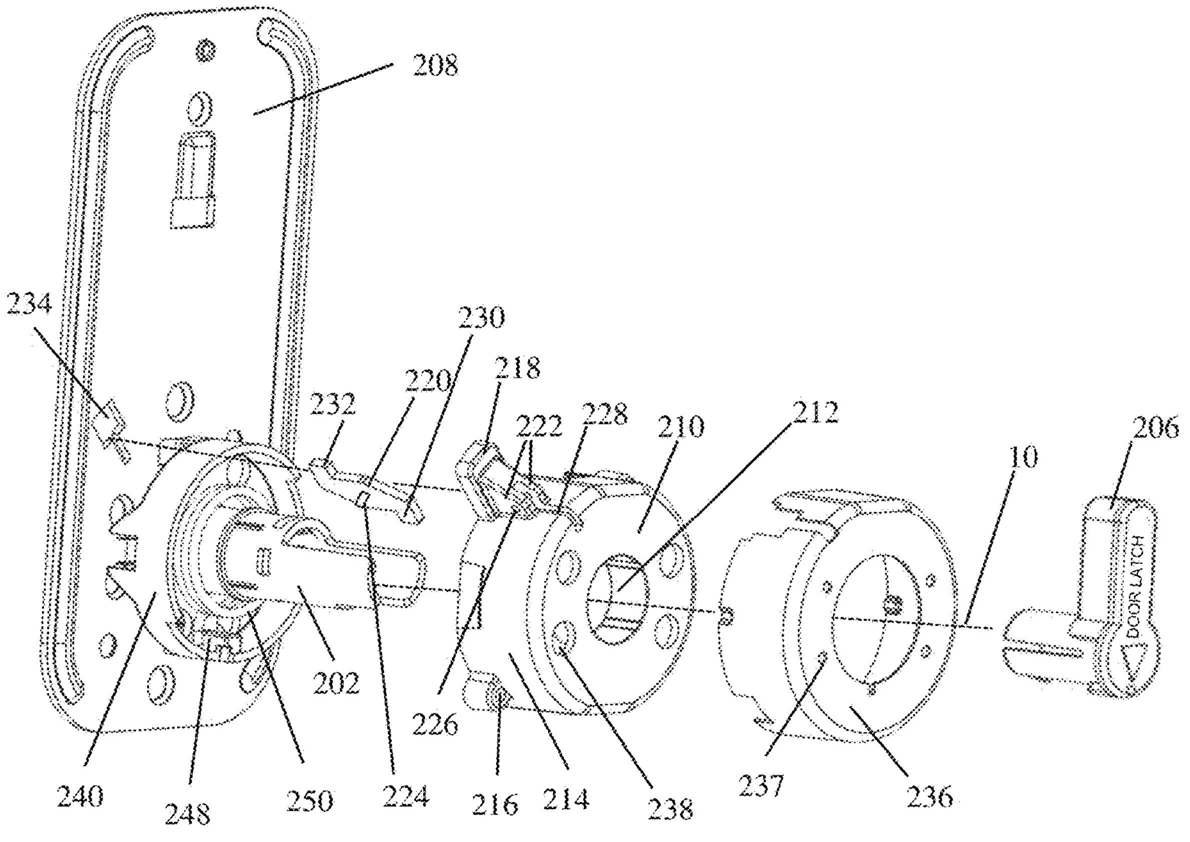
FIG. 5 is an exploded perspective view of the handing assembly of FIG. 2.

FIG. 5 is an exploded perspective view of a handing assembly 200 attached to a backplate 208 of the interior lock portion shown in FIG. 3. As shown in FIGS. 4 and 5, in accordance with some embodiments, the housing 210 may include a catch holder 218 for pivotally retaining a catch 220 that, as explained below, holds the adjustment tool 200 in the home position when the initial handing is set. The catch holder 218 may extend radially from the perimeter wall 214 of the housing 210 along backplate 208. The catch holder 218 may include two walls 222 that extend along the perimeter wall 214 with pin holes 226 for pivotally holding the catch 220 via pin 224. Pin 224 may be integrally formed with the catch 220 or may extend through an opening in the catch 220. As shown in the embodiment of FIG. 5, the perimeter wall 214 may have a slot 228 positioned between walls 222 for allowing a first end 230 of the catch 220 to pivot into the housing 210. In some embodiments, the catch holder 218 and catch 220 may be held completely within the housing 210 and not extend from the housing 210.

Figure 10:
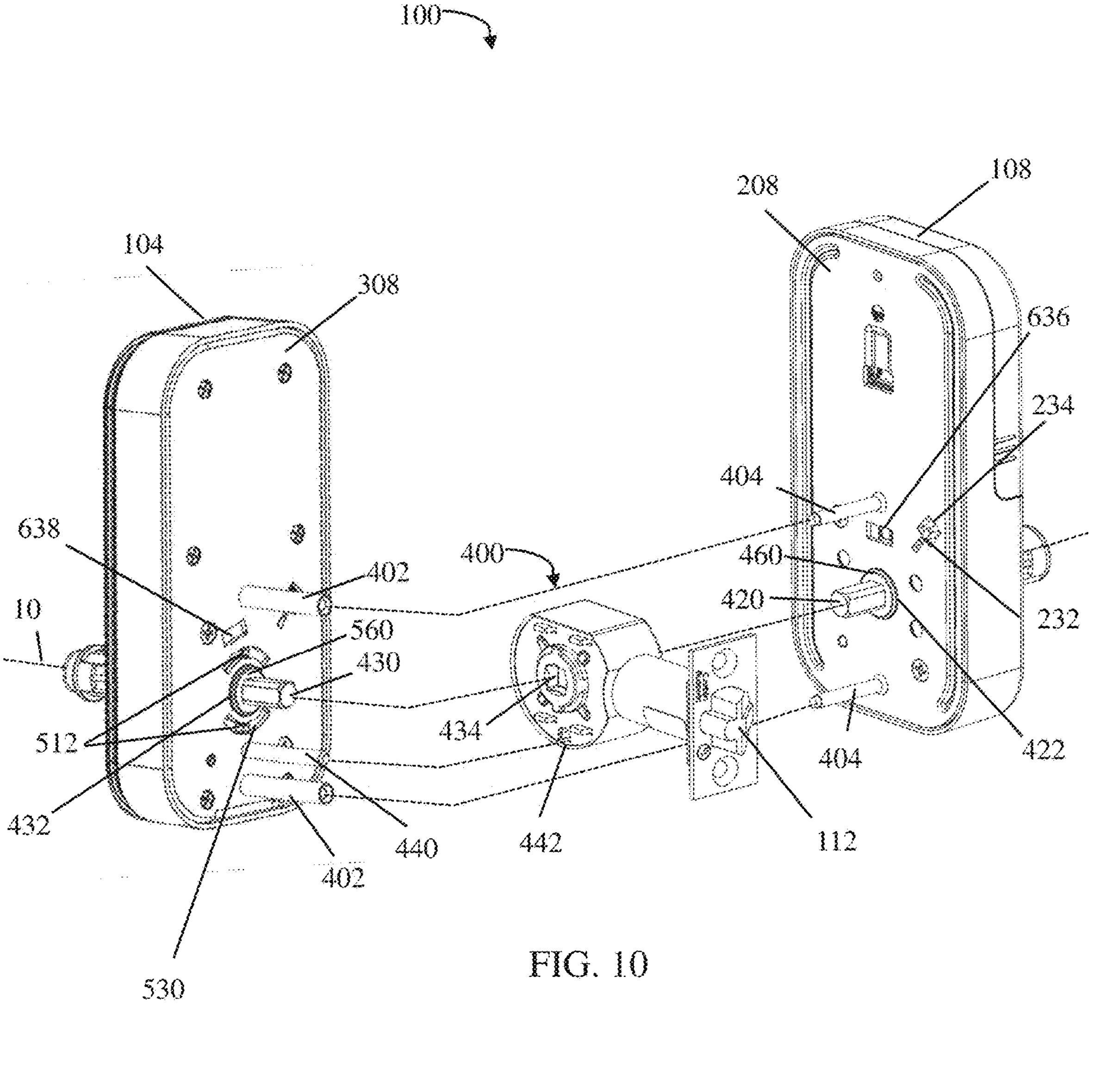
FIG. 10 is a perspective view of a door lock system according to one embodiment.

In some embodiments as shown in FIGS. 4 and 5, the backplate 208 may include an opening 234 that allows a second end 232 of the catch 220, opposite the first end 230, to extend through the back of the interior lock portion 108 (for example, see FIG. 10). In some embodiments, when the lock portion is installed on a door 102, a door surface may contact the catch and force the catch 220 to pivot away from the door surface such that the first end 230 of the catch 220 pivots into the housing slot 228 to engage a disc 240 (i.e., an engaged position), as discussed further below. In some embodiments, a spring (not shown) may bias the first end 230 of the catch 220 into the housing slot 228. That is, the spring may bias the catch from a disengaged position toward an engaged position.

FIG. 5 is an expanded perspective view of the handing assembly 200 of the interior lock portion 108. As shown in FIG. 5, the handing assembly 200 may include housing 210 attached to backplate 208 and outer cover 236. The handing assembly also includes an adjustment lever 206. The handing assembly cooperates with a first outer spindle 202 that extends through opening 212 in the housing. The adjustment lever 206 attaches to one end of the first outer spindle. A disc 240 is attached to the other end of first outer spindle 202, and a spring 250 is positioned between the first outer spindle 202 and disc 240. A catch 220 is operatively connected to the spindle 202. The outer cover 236 may be attached to a front face of interior lock portion 108 (not shown in FIG. 5) to provide structural integrity and alignment. The outer cover 236 may include screw holes 237 for screws to attach the outer cover 236 to the front face of the lock portion, and the housing 210 may have larger diameter holes 238 to accommodate screw heads of the screws to allow the outer cover 236 to lie flush on the housing 210. In some embodiments the handing assembly may not include an outer cover 236.

Figure 6:
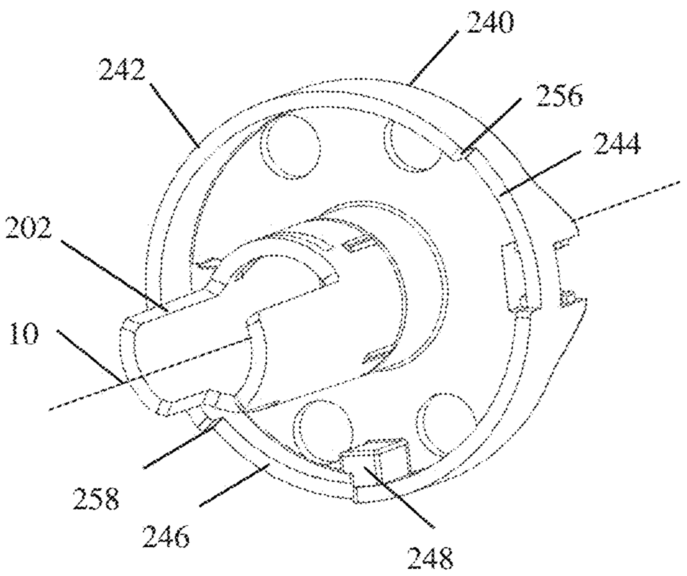
FIG. 6 is a perspective view of an embodiment of an outer spindle and a disc of the handing assembly of FIG. 5.

FIG. 6 shows a perspective view of the first outer spindle 202 and disc 240 shown in FIG. 5. As shown in FIGS. 5 and 6, in some embodiments, the first outer spindle 202 may include a disc 240 at one end that is perpendicular to the first outer spindle 202. The first outer spindle 202 and disc 240 may be integrally formed or may be two separate pieces directly connected together such that they rotate as one piece. The housing 210 may be positioned over disc 240 and the first outer spindle 202 may extend through opening 212 of the housing 210. First outer spindle 202 and disc 240 may be centered on axis 10 and rotate together about axis 10 within opening 212 of the housing 210. In some embodiments, disc 240 may include a perimeter wall 242 that extends toward first outer spindle 202 in a direction parallel to axis 10. The disc wall 242 may include elongated recesses 244 and 246 along its outer edge. As will be discussed further below, the elongated recesses 244 are configured to receive a catch to set the handing of a door lock system. The disc wall 242 may also include a ledge 248 attached or integrally formed on an inside edge of the wall.

In some embodiments, a torsion spring (see FIGS. 5 and 8A-8C) may be positioned around the first outer spindle 202 within disc wall 242. The torsion spring 250 may include ends 252, 254 that extend radially from a main circular body of the spring. The ends 252, 254 may contact the ledge 248 on disc wall 242. When the first outer spindle 202 and disc 240 rotate, as explained more fully below with reference to FIGS. 8A-8C, the ledge 248 may contact and force an end 252, 254 of the torsion spring 250 to rotate with the ledge 248.

Figure 7:
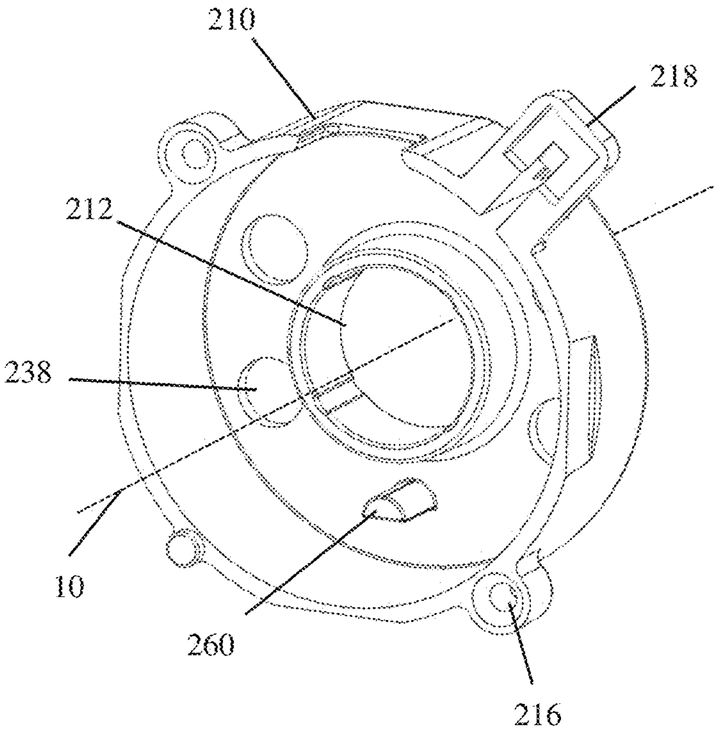
FIG. 7 is a rear perspective view of an embodiment of a housing of the handing assembly of FIG. 5.

As shown in the embodiment of FIG. 7, the housing 210 may include a protrusion 260 that extends from an inner surface of the housing 210. The inner surface of the housing 210 may be parallel to a plane of the door and the protrusion may extend perpendicular to the plane of the door. The protrusion 260 may extend a sufficient distance from the inner surface such that when the housing 210 is attached to the backplate 208, the protrusion 260 may contact and restrict rotation of an end 252, 254 of the torsion spring 250.

Figure 8A:
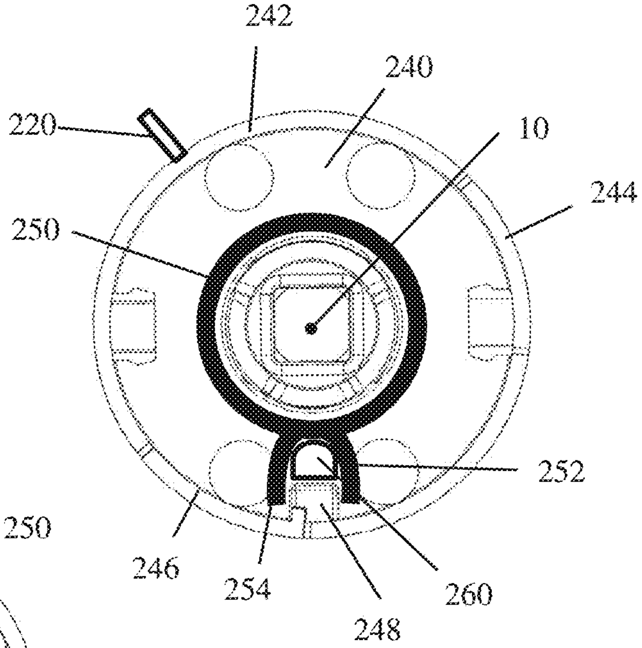
FIG. 8A is a front schematic view of an embodiment of the handing assembly in a default position.
Figure 8B:
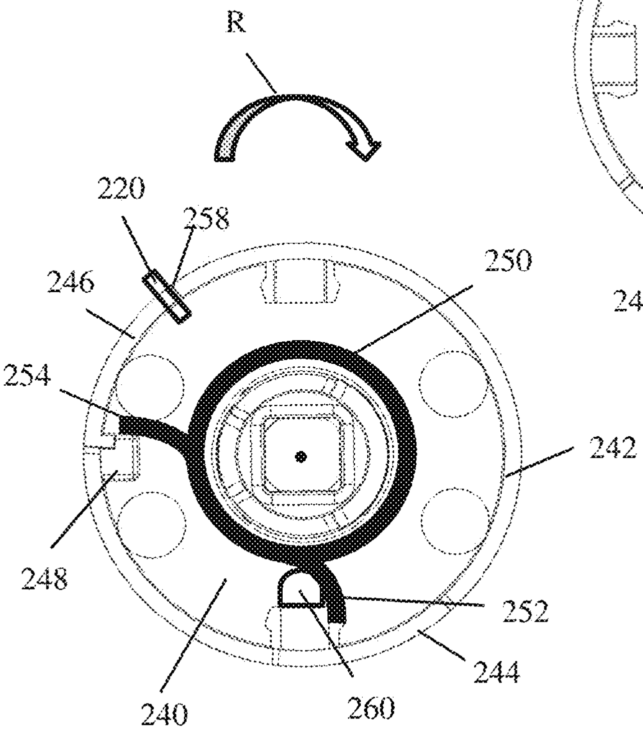
FIG. 8B is a front schematic view of an embodiment of the handing assembly in a left home position.
Figure 8C:
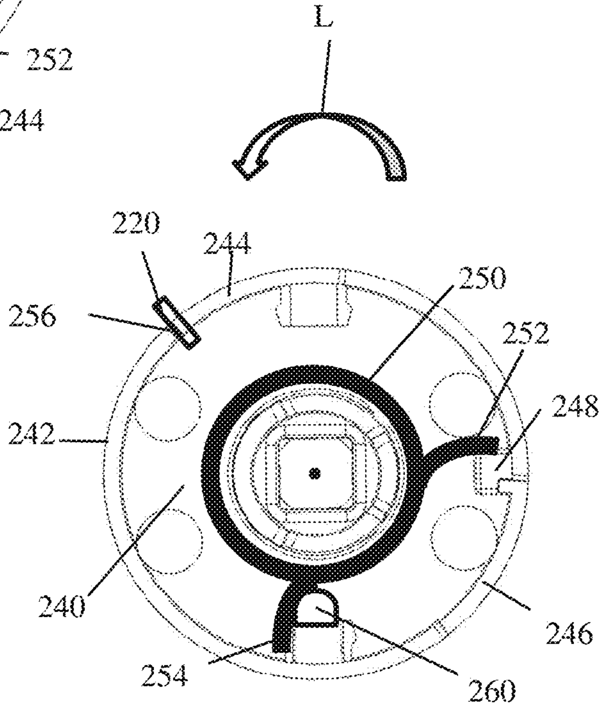
FIG. 8C is a front schematic view of an embodiment of the handing assembly in a right home position.

FIGS. 8A-8C illustrate how the handing assembly 200 sets the handing of handle 110 by rotating the first outer spindle 202 and disc 240. When the handing assembly 200 is in the default position, as shown in FIG. 8A, a ledge 248 of disc 240 may be located at a bottom position below the protrusion 260 of the housing 210. The ends 252, 254 of torsion spring 250 may be positioned on either side of ledge 248 and protrusion 260 and the torsion spring 250 may be unloaded. The catch 220 may be pivoted up and away from the disc 240 in a disengaged position. In some embodiments, the catch 220 may be biased toward the disc 240 (e.g., by a spring, door surface, etc.).

As shown in FIG. 8B, the handing assembly 200 may be set to a right home position (e.g., the handle points to the right when viewing an exterior of a door), according to some embodiments. The first outer spindle 202 and disc 240 may be rotated 90 degrees in a first direction (e.g., clockwise) relative to the position shown in FIG. 8A. Ledge 248, rotating with disc 240, may contact end 254 of torsion spring 250, forcing the end 254 to rotate with the ledge 248. The protrusion 260 on the housing 210 may restrain the other end 252 while ledge 248 rotates and pulls end 254 away from end 252, causing the torsion spring 250 to load. The loaded torsion spring 250 may bias the disc 240 in a second direction (e.g., counterclockwise), opposite the first direction, back to the initial default position.

As shown in FIG. 8B, once the disc 240 has been rotated to the right home position and spring 250 has been loaded (as shown by arrow "R"), catch 220 may pivot down and engage recess 246 at edge 258 in an engaged position to hold the disc 240 in the right home position against the torsional force of spring 250. The catch 220 may be urged forward toward the disc 240 due to a door surface applying force to a back end of the catch when the lock portion is installed on the door. In some embodiments, a spring may bias the catch 220 to engage edge 258, which may supplement or replace the force applied by the door surface. In some embodiments, once the handing is set to the right home position, a handle may then be attached to the first outer spindle 202. Turning the handle in the first direction (e.g., clockwise) may rotate the disc 240 and cause the lock body to release latch 112 and allow door 102 to open. While disc 240 rotates, the catch 220 may slide along the elongated recess 246. The spring 250 may cause the handle 110 to return to the home position after the handle is rotated and pressure is released.

In some embodiments, from the state shown in FIG. 8B the catch 220 may be lifted and pivoted away from disc 240 to a disengaged position to release the disc 240 and reset the handing assembly 200 to the default position. The spring 250 may return and maintain the disc 240 at the default position shown in FIG. 8A. In some embodiments, the handing assembly 200 may be reset even after a handle is installed on the first outer spindle.

As shown in FIG. 8C, the handing assembly 200 may be set to a left home position (e.g., handle points to the left when viewing an exterior of the door), in accordance with some embodiments. The first outer spindle 202 and disc 240 may be rotated 90 degrees in the second direction (e.g., counterclockwise, as shown by arrow "L") relative to the position shown in FIG. 8A. Ledge 248, rotating with disc 240, may contact end 252 of torsion spring 250, forcing the ends 252 to rotate with the ledge 248. The protrusion 260 on the housing 210 may restrain the other end 254 while ledge 248 rotates and pulls end 252 away from end 254, causing the torsion spring 250 to load. The loaded torsion spring 250 may bias the disc 240 in the first direction, opposite the second direction, back to the initial default position.

Once disc 240 has been rotated to the left home position and spring 250 has been loaded, catch 220 may pivot and engage recess 244 at ledge 256 in an engaged position to hold the disc 240 in the left home position against the torsional force of spring 250. A handle may be attached to the first outer spindle 202 if a handle has not already been attached. Turning the handle in the second direction relative to the position shown in FIG. 8A may rotate disc 240 and cause the lock body to release latch 112 and allow door 102 to open. While disc 240 rotates, the catch 220 may slide along the elongated recess 244. The spring 250 may cause the handle to return to the home position after the door has been opened and the handle is released.

It should be noted that the torsion spring 250 may bias the disc 240 to the default position from either the left or right home position. In addition, when in the left or right home positions (e.g., with the catch 220 engaged with a recess 244, 246 of disc 240), the same torsion spring 250 may also bias the disc 240 to the left and right home positions after the handle has been rotated to open the door. Thus, the torsion spring may bias the disc 240 to the default position (catch 220 not engaged) or to a home position (catch 220 engaged with disc) depending on whether the catch 220 is engaged with the disc.

Figure 9:
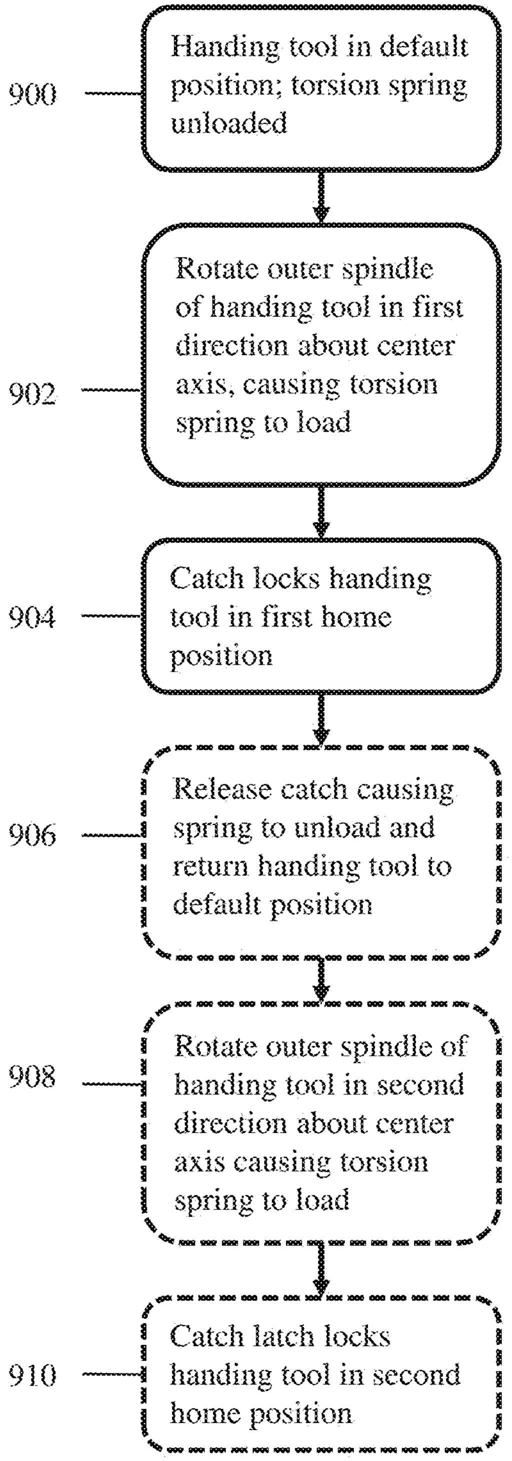
FIG. 9 is a flowchart of a method of operating the handing assembly according to one embodiment.

FIG. 9 is a flowchart for a method of setting and resetting a handing assembly in accordance with some embodiments. In step 900, the handing assembly is in the default position and the torsion spring is unloaded. In this default position, the adjustment lever or handle may be pointing in an upward position relative to the door. The handing assembly may be set as either left or right handed depending on the desired or required direction of door swing.

In step 902, the first outer spindle of handing assembly may be rotated in a first direction about a center axis until the handing assembly reaches a home position. In some embodiments, the first outer spindle is rotated 90 degrees, but the angular extent may vary depending on the desired handle and rotational motion required to release the latch. The first direction may be either clockwise or counterclockwise relative to a plane of the door. As the first outer spindle rotates, the disc attached to first outer spindle may also rotate and cause the torsion spring to load, as described above with reference to FIGS. 8A-8C. Once in the home position, in step 904, the catch may engage a recess within the disc to hold the disc in the rotated position against the torsional force of the torsion spring. The handing assembly may now be in a first home position. The first home position may be a right or left home position.

Optionally, the handing may be reset or reconfigured even after the handing assembly 200 has been set in the first home position. To reset the handing, in step 906, the catch may be released from the handing assembly. Without the catch countering the force of the loaded torsion spring, the spring may cause the handing assembly to rotate back to the default position. The catch may be released by lifting it out of the recess in the disc. In some embodiments, the catch automatically releases from the disc when the lock portion is removed from the door, as the door surface no longer pushes the catch forward into the disc recess.

When in the default position, the adjustment lever may again be pointing upwards. To reset the handing assembly, in step 908, the first outer spindle of the handing assembly may be rotated in a second direction about the center axis. The rotation of disc may cause the torsion spring to load, as described above with reference to FIGS. 8A-8C. In step 910, the catch may engage a recess in the disc and lock the handing assembly in the second home position. It should be noted that steps 906 through 910 are optional and not required to set the initial handing of the handing assembly.

Self-Adjusting Spindles & Waggle Reduction

FIG. 10 is an exploded view of an embodiment of a door lock system 100 including a lock body 400, an exterior lock portion 104, and an interior lock portion 108. According to the embodiment of FIG. 10, the door lock system is configured to fit a variety of door thicknesses. In particular, as discussed further below, the exterior lock portion and interior lock portion are configured to align and center the lock body over a range of door thicknesses while maintaining the ability to transmit torque to the lock body.

As shown in FIG. 10, a backplate 308 of the exterior lock portion 104 may include rods 402 that extend from the backplate 308 in a direction perpendicular to the backplate 308. A backplate 208 of the interior lock portion 108 may have pins 404 that extend from the backplate 208 in a direction perpendicular to the backplate 208 and aligned to mate with the rods 402 of the exterior lock portion 104 when the door lock system 100 is installed on a door. When installing the door lock system 100 on a door (see FIG. 11), the rods 402 and pins 404 may be connected through openings in the door (e.g., cylindrical holes perpendicular to a plane of the door). In the embodiment of FIG. 10, the pins 404 are received within the rods 402. The rods 402 and pins 404 may assist in aligning and stabilizing the exterior lock portion 104 and interior lock portion 108 on the door 102. In particular, the rods 402 and pins 404 may prevent relative movement of the interior lock portion 108 and exterior lock portion 104 in a plane parallel to a plane of a door. In other embodiments, an exterior lock portion 104 may have pins 404 that are received in rods 402 in an interior lock portion 108, as the present disclosure is not so limited. The pins 404 may slide within rods 402 to allow the interior lock portion 108 to move relative to the exterior lock portion 104 along axis 10 (e.g., perpendicular to a plane of a door) such that the door lock system 100 may be installed on doors of different thicknesses. In some embodiments, the pins 404 may be screws configured to threadedly engage the rods 402 to adjust the relative spacing between the interior lock portion 108 and the exterior lock portion 104.

In some embodiments, an exterior lock spindle 430 may extend through a first backplate opening 432 in backplate 308 of the exterior lock portion 104. The exterior lock spindle 430 may enter a first opening 434 in a first side of the lock body 400. The exterior lock spindle 430 and the first opening 434 may have complementary shapes and be sized to create a snug fit, such that torque may be transmitted between the exterior lock spindle and the first opening 434. In some embodiments as shown in FIG. 10, the exterior lock spindle 430 and the first opening 434 have complementary square shapes. Of course, any shape may be employed, including, but not limited to, a spline and a D-shape. Similar to the exterior lock spindle 430, an interior lock spindle 420 may extend through a second backplate opening 422 in a backplate 208 of the interior lock portion 108 and enter a second opening (not shown) in a second side of the lock body 400, opposite the first side of the lock body along axis 10 (e.g., perpendicular to a door). The second opening may also be shaped and sized to create a snug fit with the interior spindle 420, such that torque may be transmitted between the interior lock spindle 420 and the second opening. In some embodiments as shown in FIG. 10, the interior lock spindle 420 and the second opening in the lock body 400 have complementary square shapes. Of course, any shape may be employed, including, but not limited to, a spline and a D-shape. As will be discussed further below, the exterior lock spindle 430 and the interior lock spindle 420 may assist in supporting and centering the lock body in an opening in a door (not shown) when installed on the door. Additionally, the exterior spindle 430 and interior spindle 420 are configured to transmit torque to the lock body to selectively retract a latch 112.

In some embodiments, the backplate 308 of the exterior lock portion 104 may include a rail 440 that extends from the backplate 308 in a direction perpendicular to the backplate 308. A rail 440 may alternatively, or additionally, extend from the backplate 208 of the interior lock portion 108. The rail 440 may enter a channel 442 in the lock body 400. The channel 442 may be sized and shaped to create a snug fit while allowing the rail 440 to slide within channel 442. That is, the rail 440 may allow the lock body 400 to slide along the rail along axis 10 (e.g., perpendicular to a plane of a door) while inhibiting movement of the lock body in any other direction (e.g., parallel to a plane of a door). The rail 440 may extend a sufficient distance from the backplate 308 to enter the channel 442 while accommodating different door thicknesses. As shown in FIG. 10, the rail 440 and channel 442 are offset from the axis 10 and the first opening 434 and the second opening in the lock body 400, such that the rail 440 may resist rotation of the lock body 400 when torque is transmitted through the first opening 434 and second opening in the lock body. In some embodiments, the channel 442 may extend through an entire width of the lock body 400 along a direction parallel to axis 10. In such embodiments, the lock body 400 may be reversable (i.e., rotated 180 degrees about axis 10, perpendicular to the door). The lock body 400 may be symmetrical such that the first opening 434 on the first side of the lock body and the second opening on the second side of the lock body may receive either the exterior spindle 430 or the interior spindle 420. Thus, the door lock system 100 may provide a universal door lock system 100 that may be either right-handed or left-handed, simply by reversing the direction of the lock body 400 in the door, and by setting the adjustment tool for the exterior lock portion 104 and the interior lock portion 108 with the appropriate handing, as described above.

Figure 11:
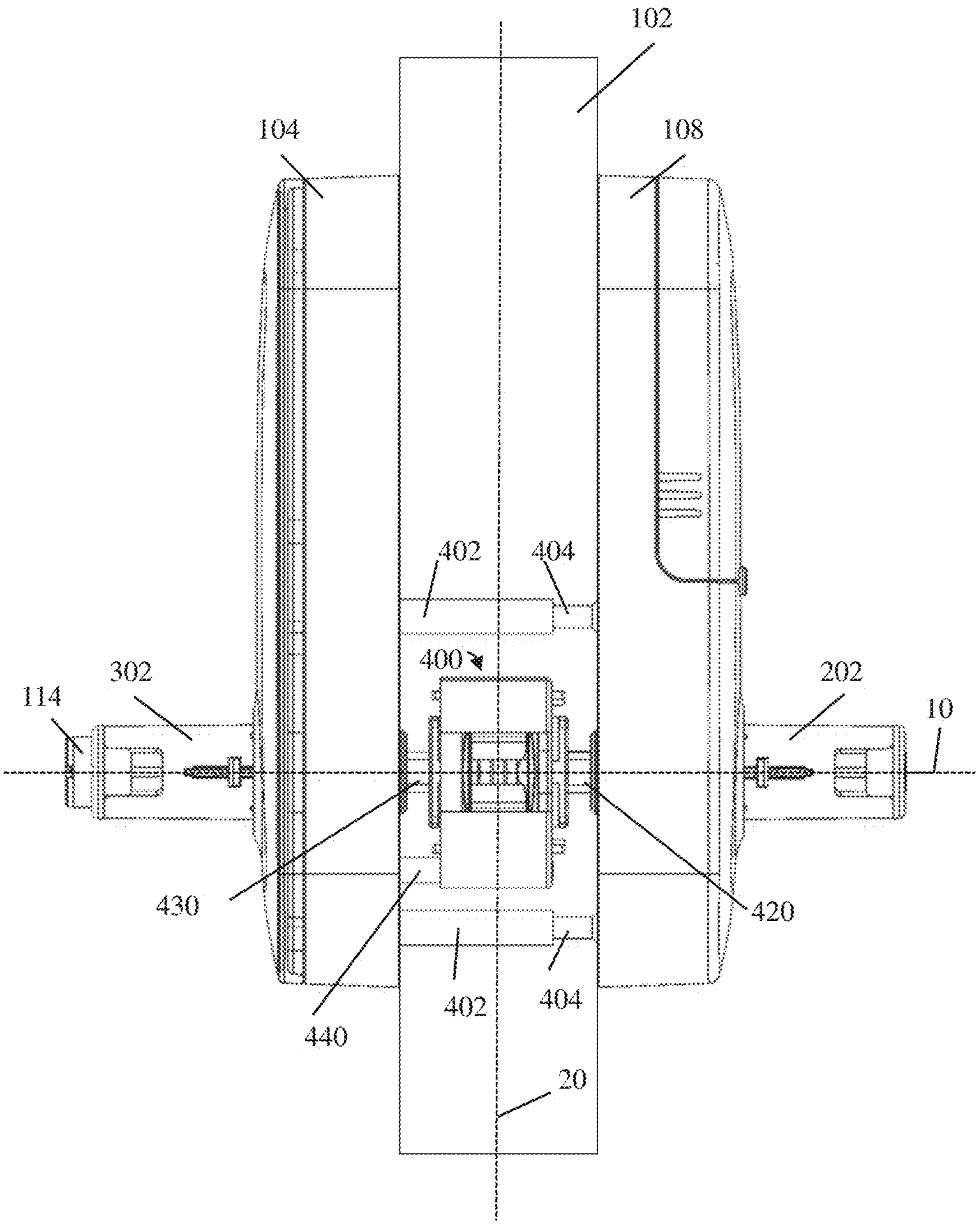
FIG. 11 is a side view of the door lock system of FIG. 10.

FIG. 11 illustrates a schematic of a door lock system 100 installed on a door 102. In some embodiments, the lock body 400 may be positioned in an opening (not shown) in the door 102 between the interior lock portion 104 and the interior lock portion 108 aligned along axis 10. As will be described below, an exterior spindle 430 and an interior spindle 420 may position and hold the lock body 400 in line with a center plane 20 of door 102, which is centered between an exterior and interior surface of the door 102. As shown in FIG. 11, pins 404 of the interior lock portion 108 are slidably received within rods 402 of the exterior lock portion 104. As shown in FIG. 11, a rail 440 may be slidably received in an opening in the lock body 400. In the arrangement of FIG. 11, the rail 440 may extend into a first side of the lock body and through an entire width of the lock body and out a second side of the lock body 400. In other arrangements, the rail may not extend through an entire width of the lock body. The rail 440 may stabilize and align the lock body 400 once the door lock system 100 is installed on the door, preventing the lock body 400 from rotating while still allowing the lock body 400 to slide in a direction parallel to axis 10 to accommodate different door thicknesses.

In some embodiments, the door lock system 100 may be installed on doors of various thicknesses. In some embodiments, the door may have a thickness that is greater than or equal to 1⅜, 1¾, or 2 inches. In some embodiments, a door may have a thickness that is less than or equal to 2¾, 2¼, or 2 inches. Any suitable thickness of the above-references ranges is possible (e.g., the door may have a thickness greater than or equal to 1⅜ and less than or equal to 2¼). In some embodiments, rods 402 may be equal to or less than 1⅜ inches in length. When installed on doors that are 1⅜ inch thick, the rods may extend across the entire thickness of the door and pins 404 will be received entirely within rods 402. Similarly, rail 440 may also be equal to or less than 1⅜ inches and may extend through the entire width of the lock body 400. To accommodate thicker doors, the rods 402 and pins 404 may slide apart along axis 10, exposing a section of the pins 404, as shown in FIG. 11.

According to the embodiment of FIG. 11 and as described further below, the interior spindle 420 and the exterior spindle 430 may be spring loaded and extend into the lock body. In particular, the springs urge the exterior spindle and the interior spindle into engagement with the lock body 400 regardless of the thickness of the door. The springs associated with the interior spindle 430 and the exterior spindle 420 may have equal spring constants, such that the force applied by the exterior spindle and interior spindle to the lock body centers the lock body in the door 102 (e.g., aligns the lock body with plane 20). Thus, the door lock system 100 may be installed on doors of varying thicknesses and handing requirements. Of course, it should be noted that features related to the universal fit of the door lock system on doors of different thicknesses may be employed in some embodiments without features related to the universal fit of the door lock system on doors of different handing. Likewise, in some embodiments a door lock system including universal handing features as described herein may be employed without features related to features for universal thickness fit, as the present disclosure is not so limited Once installed, the door lock system 100 may be operated by rotating the first outer spindle 202 on either the exterior lock portion 104 to rotate exterior spindle 430 or by rotating first outer spindle 202 on the interior lock portion 108 to rotate interior spindle 420. The lock body 400 may translate the rotational motion of the exterior spindle 430 or the interior spindle 420 into linear motion to retract a lock latch 112 (see FIG. 10) and allow the door 102 to open.

The components within the interior lock portion 108 between the first outer spindle 202 and an interior lock spindle 420 according to some embodiments will be described with reference to FIGS. 12-14 below. The components within the exterior lock portion 104 between the second outer spindle 302 and an exterior lock spindle 430 according to some embodiments will be described with reference to FIGS. 15-19 below. It should be noted that the interior lock portion 108 may not include all of the components of the exterior lock portion 104 (e.g., in some embodiments, the interior lock portion may not include components required to prevent the interior handle 110 from rotating). It should also be noted that the components described below in FIGS. 12-19, although described specific to an interior or exterior lock portion, may be included in either the interior or exterior lock portion, and are not limited to a specific lock portion.

Figure 12:
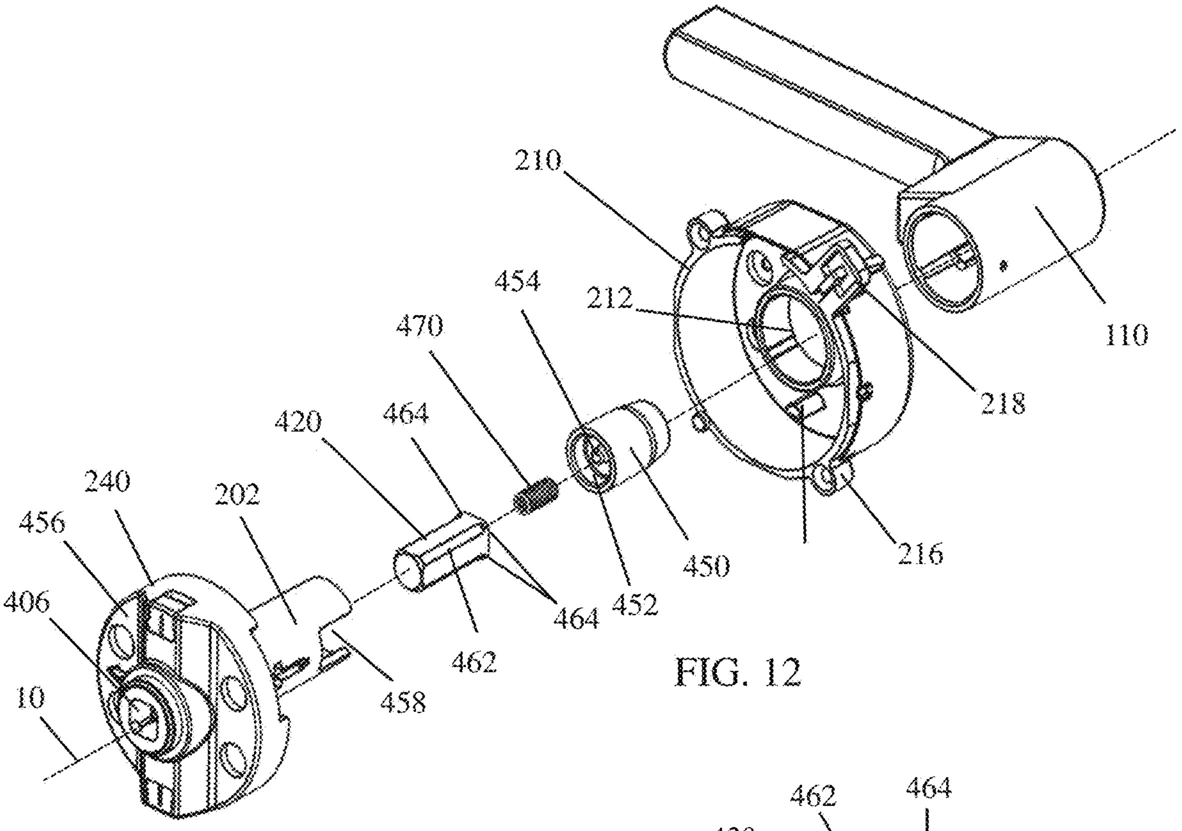
FIG. 12 is an exploded rear perspective view of components in an interior lock portion according to one embodiment.

FIG. 12 is an expanded rear perspective view of transmission components in an interior lock portion aligned along axis 10 and that allow a handle to be employed to retract a latch of a lock body. In some embodiments as shown in FIG. 12, the transmission components include a handle 110, a housing 210, and a first outer spindle 202 attached to a disc 240. The first outer spindle 202 may extend through an opening 212 in the housing 210 and receive the handle 110. In some embodiments, an optional adjustment lever 206 may be attached to the first outer spindle 202 see FIGS. 3-5). The adjustment lever 206 may be removed after the handing of the handing assembly has been set and the handle 110 attached, as described above.

In some embodiments as shown in FIG. 12, the transmission components include a spindle holder 450, a spring 470, and an interior lock spindle 420. The interior lock spindle 420 may be received within opening 452 of the spindle holder 450. As further described below, the spring 470 may bias the interior lock spindle 420 out of the opening 452 along axis 10 into a through hole 406 of the disc 240. In some embodiments as shown in FIG. 12, the spring 470 may be positioned on a protrusion 454 in opening 452 that also centers and stabilizes the spring 470. The spindle holder 450 may be received in an opening 458 of the second outer spindle 302. The opening 458 may extend through the first outer spindle 202 to the through hole 406 in the disc 240, creating an elongated channel though the first outer spindle 202 and disc 240.

Figure 13:
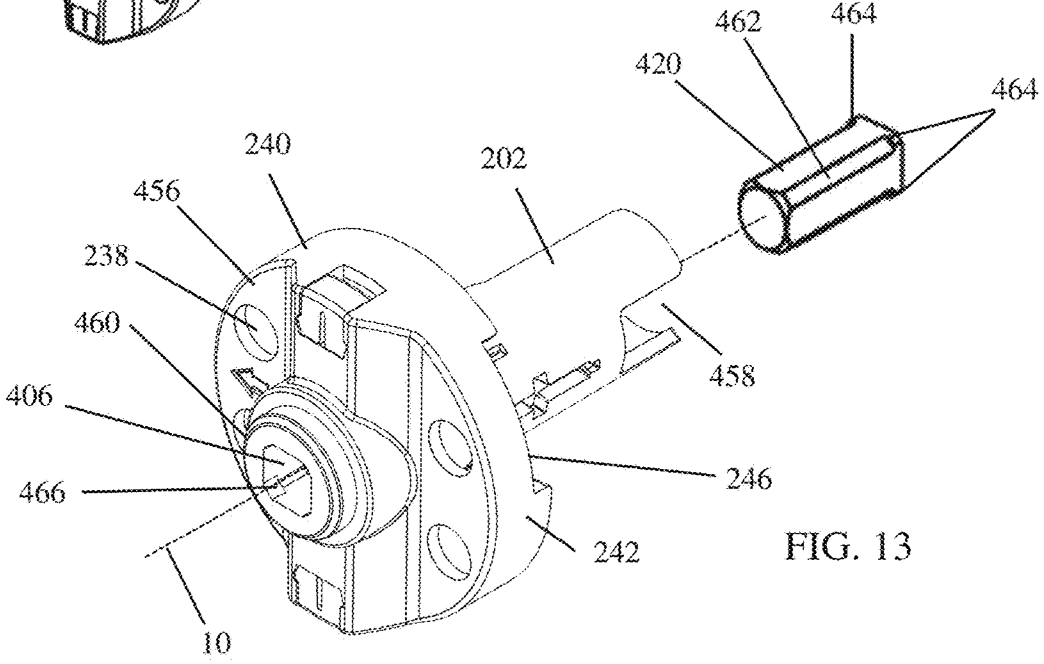
FIG. 13 is an exploded rear view of the components of FIG. 12.

FIG. 13 is an exploded, rear perspective view of the interior lock spindle 420, the first outer spindle 202, and the disc 240 of FIG. 12. As noted above, the spring 470 and interior lock spindle 420 may be received within opening 452 the of the spindle holder 450 and the spring 470 may bias the interior lock spindle 420 out of the opening 452 into the through hole 406 of the disc 240. The through hole 406 may have a depth along axis 10 and extend from a rear surface 456 of the disc 240, forming a round edge 460 around through hole 406. The through hole 406 may be sized and shaped to complement the size and shape of the exterior spindle 420. The disc 240 may stabilize the interior lock spindle 420 (e.g., prevent rotation about axis 10 relative to the disc 240) while allowing the interior lock spindle 420 to slide horizontally within the through hole 406 along axis 10. In some embodiments, the exterior spindle 420 may have a cross-section, parallel to a plane of disc 240, that is square, or square with tapered corners, or otherwise shaped to engage the through hole 406 to apply a torque to the disc 240.

In some embodiments, a front surface of the interior lock spindle 420 may include one or more ledges 464. As shown in FIG. 13, in some embodiments a ledge 464 may be extend radially from each tapered corner 462 of the interior lock spindle 420, when viewing a cross section of the front surface of the interior lock spindle 420. An outside circumference of the ledges 464 may complement an inside circumference of the opening 452 of the spindle holder 450, and the ledges 464 may contact and slide along the inside circumference of opening 452, helping position and stabilize the interior lock spindle 420 in the spindle holder 450.

In some embodiments, the spring 470 may be compressed between a surface of the opening 452 in the spindle holder 450 and a front surface of the interior lock spindle 420. The spring 470 may bias the interior lock spindle 420 out of the opening 452 and through the through hole 406 of the disc 240. To prevent the interior lock spindle 420 from being pushed completely though the through hole 406, the through hole 406 may include one or more ribs 466 positioned around the circumference of the through hole 406 to catch the ledges 464 on the interior lock spindle 420. As shown in FIG. 13, the ribs 466 may be positioned at each corner, when viewing a cross section of a rear surface of the through hole 406. It should be noted that the ledge 464 and rib 466 may extend in varying angular extents around a circumference of the interior lock spindle 420 and/or through hole 406.

Figure 14:
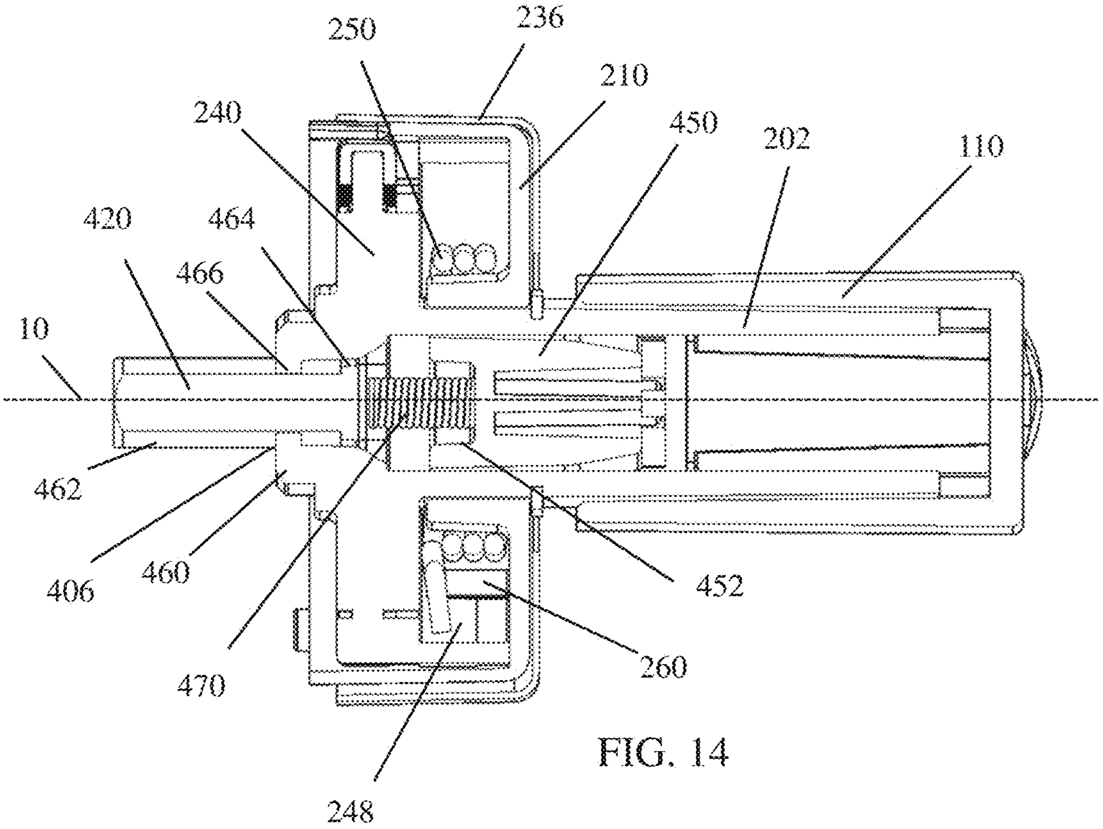
FIG. 14 is a side schematic view of the components of FIG. 12.

FIG. 14 shows a side cross-sectional view of the components of FIGS. 12-13 taken along axis 10. In some embodiments, the disc 240 may be positioned adjacent to a backplate (not shown in FIG. 14) of the interior lock portion. As shown in FIG. 14, the disc 240 may hold and stabilize an interior lock spindle 420 along a length of axis 10.

In some embodiments, a housing 210 may be attached to the backplate 208 (e.g., using screws) and the housing 210 and the backplate may hold and support the first outer spindle 202 and disc 240, spindle holder 450, spring 470, and interior lock spindle 430. In some embodiments, the first outer spindle 202, disc 240, spindle holder 450, spring 470, and interior lock spindle 420 may be at least partially contained between the housing 210 and the backplate 208.

As shown in FIG. 14, the handle 110 may be installed on the first outer spindle 202 and the first outer spindle 202 may be held within the handle 110. Rotating the handle 110 may rotate the first outer spindle 202 and correspondingly the disc 240. Torque applied to the handle 110 may be directly translated to the disc 240 through the first outer spindle 202. The disc 240 may torque the lock spindle 420 directly to turn the lock spindle 420 in the second opening (opposite opening 434) of the lock body 400 to release the latch 112 (see FIG. 10). The disc 240 may have a larger diameter than a diameter of the first outer spindle 202. In some embodiments, a ratio of the diameter of the disc 240 to the diameter of the first outer spindle may be at least 1.5, 1.75, 2, or 2.5.

As shown in FIG. 14, the spring 470 may compress against a surface of an opening 452 in the spindle holder 450 on one end and against a front surface of the interior lock spindle 420 on a second end opposite the first end, biasing the interior lock spindle 420 out of the opening 452 and through the through hole 406 of the disc 240. Ribs 466 of the disc 240 may catch ledges 464 on the front surface of the interior lock spindle 420 to prevent the spring 470 from pushing the interior lock spindle 420 completely through the through hole 406. A rear side of the interior lock spindle 420, opposite the spring 470, may enter an opening in a lock body and exert a force against the lock body in a direction along axis 10.

Figure 15:
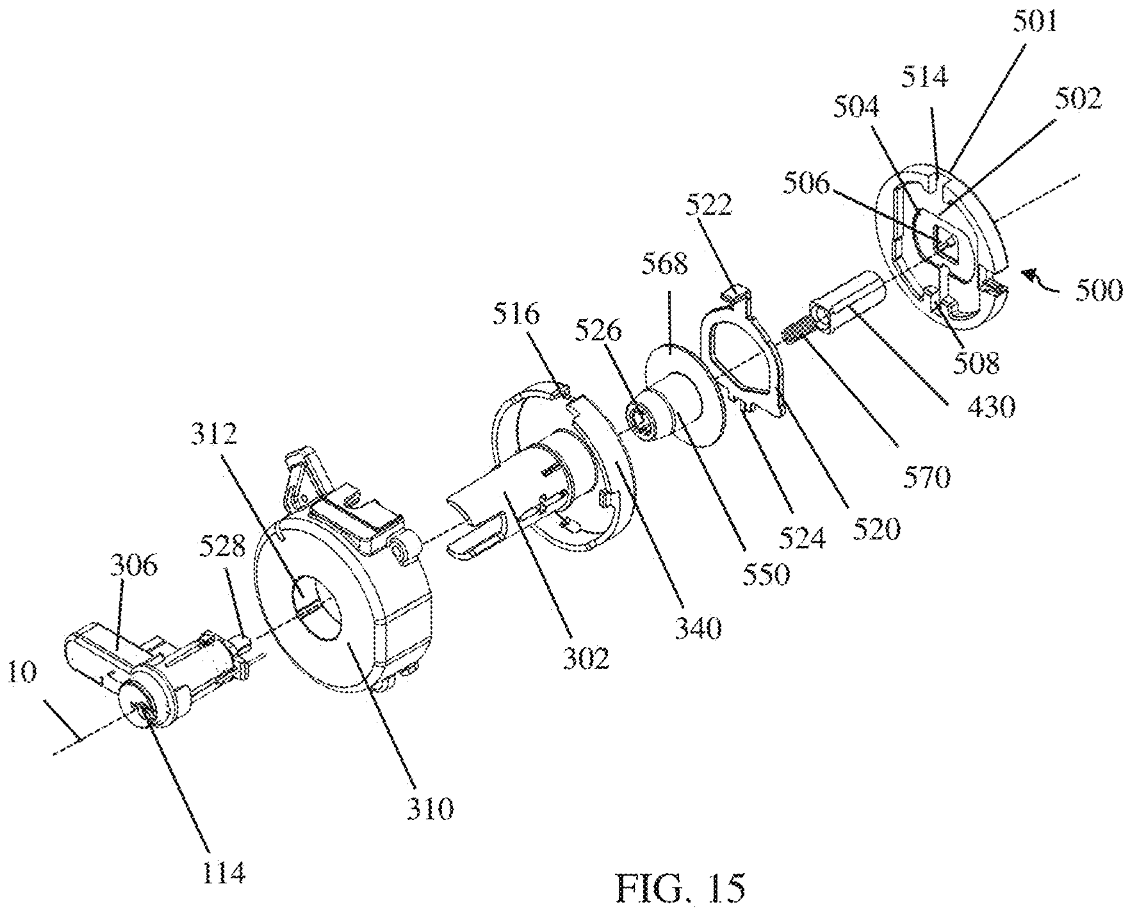
FIG. 15 is an exploded view of an embodiment of components in an exterior lock portion.

FIG. 15 is an expanded perspective view of transmission components in an exterior lock portion aligned along axis 10 and that allow a handle to selectively retract a latch of a lock body. In some embodiments as shown in FIG. 15, the transmission components include an adjustment lever 306, a housing 310, and a second outer spindle 302 attached to a disc 340. The second outer spindle 302 may extend through an opening 312 in the housing 310 and receive the adjustment lever 306. In some embodiments, the adjustment lever 306 may be attached to a lock cylinder 114, and the lock cylinder 114 may be received in the second outer spindle 302. In some embodiments, the adjustment lever 306 may be optional, or may be removed after the handing of the handing assembly has been set, as described above. In some embodiments, when the adjustment lever 306 is removed another handle (e.g., a lever) may be attached to the second outer spindle 302. The lock cylinder 114 may include a driver 528 extending from a rear end of the lock cylinder 114 that may be received in a front opening 526 of a spindle holder 550. The driver 528 may be rotated about axis 10 when a key (not shown) is inserted into the lock cylinder and rotated. As described further below, according to some embodiments, the driver 528 may rotate the spindle holder 550 to lock and unlock the door lock system 100.

Figure 16:
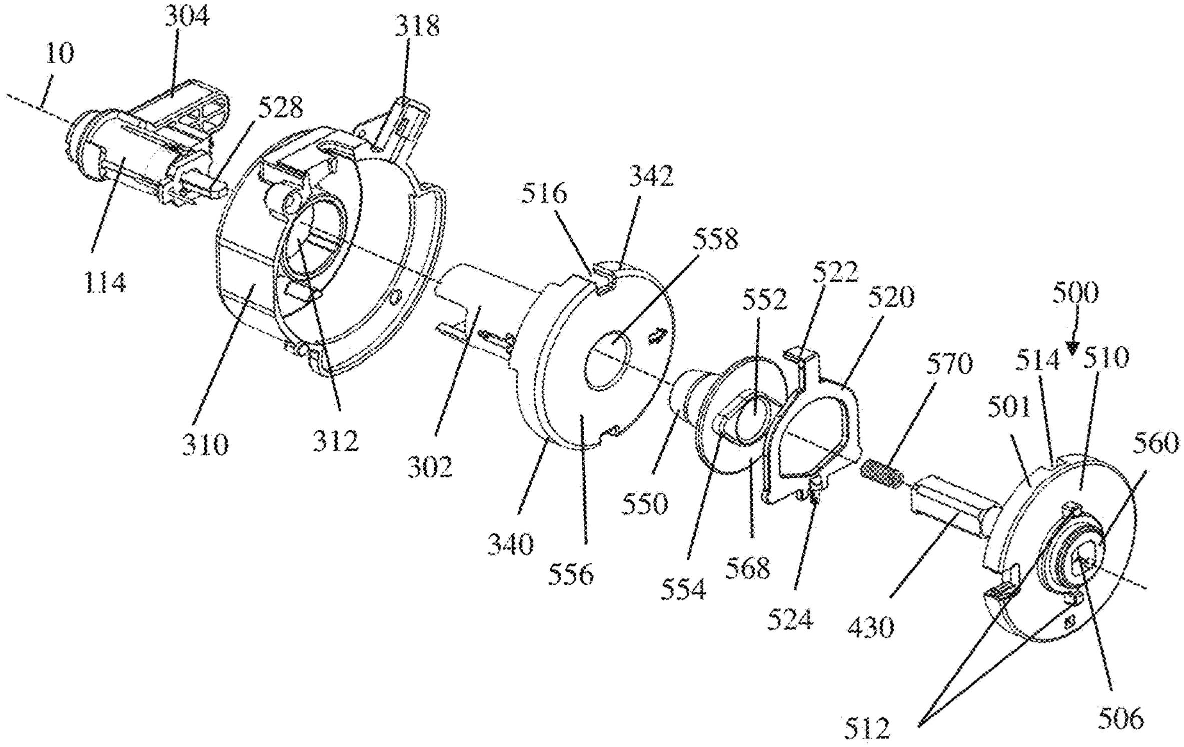
FIG. 16 is an exploded rear perspective view of the components of FIG. 15.

FIG. 16 is an exploded rear perspective view of the components shown in FIG. 15. As shown in FIG. 16, the spindle holder 550 may be inserted into an opening 558 in a rear surface 556 of disc 340 opposite the second outer spindle 302. The opening 558 may extend through the disc 340 to the second outer spindle 302, creating an elongated channel though the second outer spindle 302 and disc 340. In such an embodiment, the lock cylinder 114 may be inserted into a front side of the second outer spindle 302 and the spindle holder 550 may be inserted into the opening 558 on the rear side of disc 340 such that the driver 528 of the lock cylinder 114 may be inserted into the opening 526 of the spindle holder 550 (see FIG. 15). In some embodiments, the spindle holder 550 may include a plate 568 that extends radially from a rear end of the spindle holder 550 parallel to a plane of disc 340. The plate 568 may be round as shown in FIG. 16. The spindle holder 550 may be inserted into opening 558 of disc 340 such that plate 568 may lie flush against the rear surface of disc 340. The spindle holder 550 may include an opening 552 in a surface opposite the disc 340. In some embodiments the spindle holder opening 552 may extend only partially within spindle holder 550 and may not connect with the opening 526 (see FIG. 15) on the opposite side of the spindle holder 550.

In some embodiments as shown in FIGS. 15-16, the transmission components include a spring 570 and an exterior lock spindle 430 that may be received within opening 552 of the spindle holder 550. As further described below, the spring 570 may bias the exterior spindle 430 out of the opening 552 along axis 10 into a through hole 506 of a spindle coupler 500. The spindle coupler 500 may be round and positioned parallel to a plane of disc 340. In some embodiments the spindle coupler may be a disc 501.

In some embodiments, a slider 520 may be positioned between the spindle holder 550 and the spindle coupler 500, on a rear side of the spindle holder 550 against a surface of plate 568 opposite disc 340. The slider may move in a downward and upward direction parallel to a plane of the door to put the door lock system in a locked or unlocked state. The slider 520 may include a projection 522 that extends from a top portion of the slider 520. The projection 522 may be positioned within a groove 514 on a top portion of a front surface 502 of the spindle coupler 500, such that rotation of the spindle coupler correspondingly rotates the slider 520. In a downward position, projection 522 may engage a notch 516 in the perimeter wall 342 of disc 340. Accordingly, in the downward position, the slider 520 may transmit torque between the disc 340 and the spindle coupler 500. In an upward position, the projection 522 does not engage the disc 340 and clears the notch 516, such that no torque may be transmitted between the disc and the spindle coupler 500. Accordingly, in such a position, the slider mechanically isolates the spindle coupler from the disc 340 and an exterior handle. If a user turns the exterior handle when the slider is in the upward position, the exterior handle may turn without driving the spindle coupler 500, thereby ensuring the door lock system remains locked. In some embodiments as shown in FIG. 16, the slider 520 may include one or more tabs 524 on a bottom portion of the slider to engage in the insert 508 (see FIG. 15) on a front surface 502 of the spindle coupler 500 when the slider 520 is in the downward position. Such an embodiment may balance torque applied by the projection 522, as torque is applied from the spindle coupler 500 to the slider 520 in two locations opposite one another relative to axis 10.

In some embodiments, an actuator (for example, see FIGS. 22A-22B) above the projection 522 may actuate a rod to exert a force against the projection 522 and move the slider 520 within the groove 514 to the downward position. When the actuator is not exerting any force on projection 522, a spring (not shown) may bias the slider 520 upwards toward the upward position such that the projection 522 does not engage the notch 516 such that the disc 340 and the spindle coupler 500 are not rotationally fixed together and the door lock system is locked.

Figure 17:
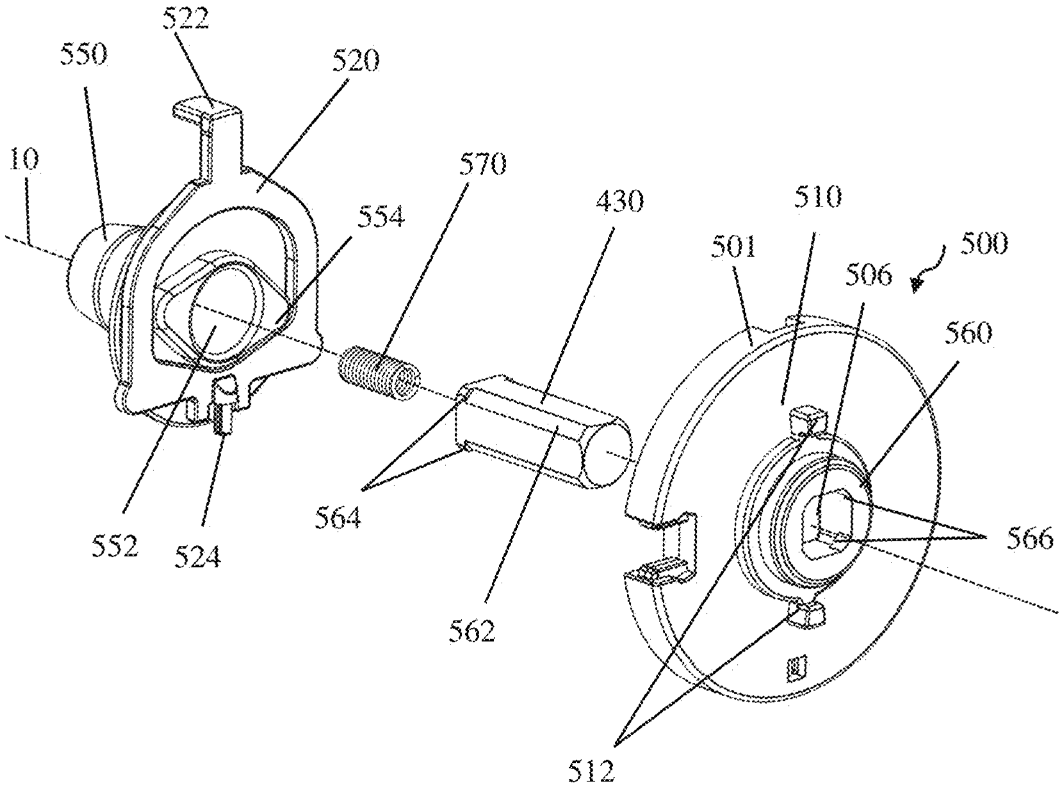
FIG. 17 is an exploded rear perspective view of the components of FIG. 15.

In some embodiments as shown in FIGS. 15-17, the lock cylinder 114 may move the slider 520 between the unlocked (e.g., downward) position and locked (e.g., upward) positions. In some embodiments, the slider 520 may have an internal perimeter that surrounds the opening 552 on the spindle holder 550. The opening 552 may include symmetrical cams 554 that extend from a rear surface of the plate 568 in a direction along axis 10. The cams 554 may match a shape of the internal perimeter of slider 520 (see FIG. 17). Of course, while a particular arrangement is shown in the present embodiment, in other embodiments the internal perimeter and cams may have any suitable shape, as the present disclosure is not so limited. As noted above, the slider 520 may be spring loaded and biased toward an upward, locked position (e.g., when cams are aligned horizontally, as shown in FIG. 17). When the lock cylinder 114 is rotated to an unlocked position, the spindle holder may also be rotated (e.g., by the driver 528) and the cams 554 on the spindle holder 550 may cam the slider 520 to the downward, unlocked position. The lock cylinder 114 may hold the slider 520 in the downward or upward position until the handle 304 rotates the spindle coupler 500. In some embodiments, the driver 528 of the lock cylinder may be used to drive the spindle coupler 500 with the cams 554 of the spindle holder 550 once the slider 520 is in the downward position.

FIG. 17 is an enlarged, exploded rear perspective view of the spindle holder 550, slider 520, spring 570, exterior lock spindle 430, and spindle coupler 500 of FIG. 16. As noted above, the spring 570 and exterior spindle 430 may be received within opening 552 the of the spindle holder 550 and the spring 570 may bias the exterior spindle 430 out of the opening 552 into the through hole 506 of the spindle coupler 500. The through hole 506 may have a depth along axis 10 and extend from a rear surface 510 of the spindle coupler 500, forming a round edge 560 around through hole 506. The through hole 506 may be sized and shaped to complement the size and shape of the exterior spindle 430. The spindle coupler 500 may stabilize the exterior lock spindle 430 (i.e., prevent rotation about or relative to axis 10) while allowing the exterior spindle 430 to slide horizontally within the through hole 506 along axis 10. In some embodiments, the exterior spindle 430 may have a cross-section, parallel to a plane of disc 340, that is square, or square with tapered corners, or otherwise shaped to engage the through hole 506 to apply a rotational force to the spindle coupler 500. Of course, any suitable shape for the cross-section of the spindle may be employed that allows the spindle to transmit torque to the spindle coupler 500, as the present disclosure is not so limited.

In some embodiments, a front surface of the exterior spindle 430 may include one or more ledges 564. As shown in FIG. 17, in some embodiments a ledge 564 may extend radially from each tapered corner 562 of the exterior spindle 430, when viewing a cross section of the front surface of the exterior spindle 430. An outside circumference of the ledges 564 may complement an inside circumference of the opening 552 of the spindle holder 550, and the ledges 564 may contact and slide along the inside circumference of opening 552, helping position and stabilize the exterior lock spindle 430 in the spindle holder 550.

In some embodiments, the spring 570 may be compressed between a surface of the opening 552 in the spindle holder 550 and a front surface of the exterior spindle 430. The spring may bias the exterior spindle 430 out of the opening 552 and through the through hole 506 of the spindle coupler 500. To prevent the exterior spindle 430 from being pushed completely though the through hole 506, the through hole 506 may include one or more ribs 566 positioned around the circumference of the through hole 506 to catch the ledges 564 on the exterior spindle 430. As shown in FIG. 17, the ribs 566 may be positioned at each corner, when viewing a cross section of a rear surface of the through hole 506. It should be noted that the ledge 564 and rib 566 may extend in varying angular extents around a circumference of the exterior spindle 430 and/or through hole 506.

In some embodiments, the spindle coupler 500 may include one or more tabs 512 extending from a rear surface 510 that are spaced a radial distance from axis 10. The tabs 512 may extend through elongated slots 530 in a backplate 308 (for example, see FIG. 10). The elongated slots 530 may be round and have an angular extent sufficient to allow the tabs 512 to slide within the slots 530 when the spindle coupler 500 rotates. The tabs 512 may be positioned in a center of the elongated slots 530 and may move along the slots 530 in either direction when someone rotates a handle attached to the lock portion (i.e., to open a door). The circular edge 560 may also extend through an opening in the backplate 308.

Figure 18:
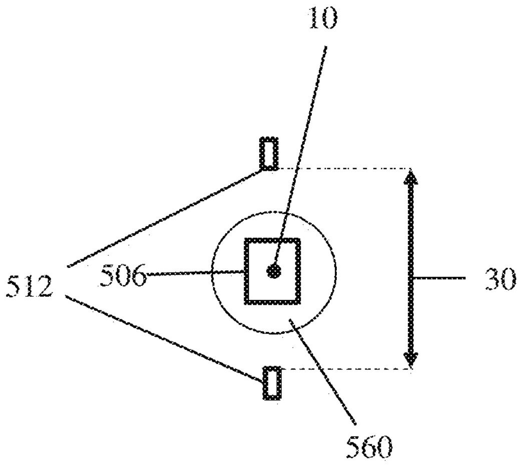
FIG. 18 is a front schematic view of an embodiment of a spindle coupler.

FIG. 18 is a schematic of a plane view of rear surface 510 of the spindle coupler 500. The tabs 512 and the circular edge 560 around through hole 506 may extend through complementary shaped openings in a backplate 308. By extending through the backplate 308, the tabs 512 and circular edge 560 may stabilize the components in FIGS. 15-16 and prevent “waggle,” or unwanted movement of the handle, or movement other than rotation about axis 10, giving the effect that the handle may be loose. The tabs 512 may be spaced a distance from axis 10 and may have a greater diameter 30 than a diameter of the circular edge 560. Positioning the tabs 512 a distance from axis 10 may help to stabilize the spindle coupler 500 and the exterior lock spindle 430 as it rotates, preventing unwanted waggle.

Figure 19:
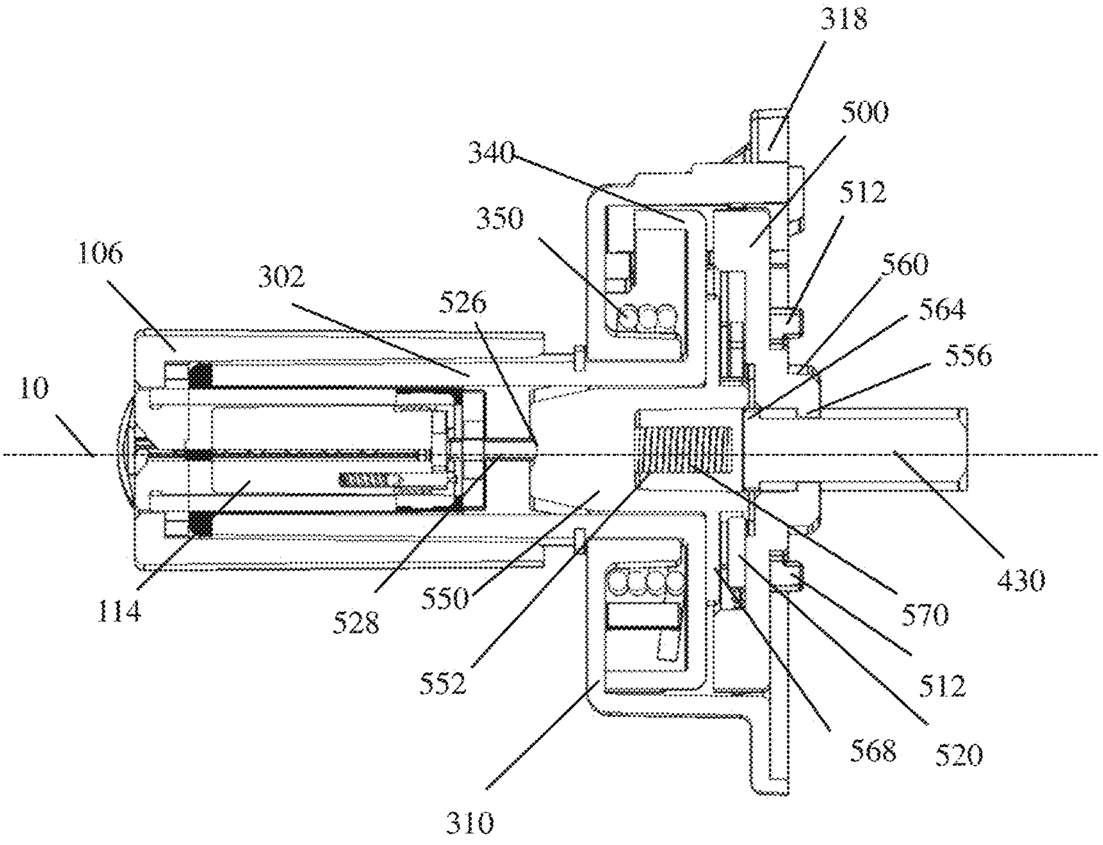
FIG. 19 is a side schematic view of the components of FIG. 15.

FIG. 19 shows a side cross-sectional view of the components of FIGS. 15-16 taken along axis 10. In some embodiments, a spindle coupler 500 may be positioned adjacent to a backplate (not shown in FIG. 18) of the exterior lock portion. As shown in FIG. 19, the spindle coupler 500 may hold and stabilize an exterior spindle 430 along a length of axis 10. Tabs 512 and circular edge 560 may extend from a rear surface of the spindle coupler 500 to engage openings in the backplate, to further stabilize the spindle coupler 500 and exterior spindle 430, as described above.

In some embodiments, a housing 310 may be attached to the backplate 308 (e.g., using screws) and the housing 310 and the backplate may hold and support the second outer spindle 302 and disc 340, spindle holder 550, slider 520, spring 570, exterior spindle 430, and spindle coupler 500. In some embodiments, the second outer spindle 302, disc 340, spindle holder 550, slider 520, spring 570, exterior spindle 430, and spindle coupler 500 may be at least partially contained between the housing 310 and the backplate 308. A torsion spring 350 may be disposed around the second outer spindle 302.

As shown in FIG. 19, the exterior handle 106 may be installed on the second outer spindle 302 and the second outer spindle 302 may be held within the handle 106. Rotating the exterior handle 106 may rotate the second outer spindle 302 and the disc 340. The disc 340 may be coupled to the spindle coupler 500 when the slider 520 is in the downward, unlocked position. In this unlocked position, the torque applied to the exterior handle 106 may be directly translated to the spindle coupler 500 through the second outer spindle 302 and disc 340. The spindle coupler 500 may apply torque to the exterior spindle 430 directly to turn the lock spindle 430 in the first opening 434 of the lock body 400 to release the latch 112 (see FIG. 10).

In some embodiments, the disc 340 may have a larger diameter than a diameter of the second outer spindle 302. In some embodiments, a ratio of the diameter of the disc 340 to the diameter of the second outer spindle 302 may be at least 1.5, 1.75, 2, or 2.5. In some embodiments, the spindle coupler 500 may have a larger diameter than a diameter of the second outer spindle 302. In some embodiments, a ratio of the diameter of the spindle coupler 500 to the diameter of the second outer spindle 302 may be at least 1.5, 1.75, 2, or 2.5. In other embodiments, the diameter of the disc 340 may be approximately the same as the diameter of the spindle coupler 500.

As shown in FIG. 19, the spring 570 may compress against a surface of an opening 552 in the spindle holder 550 on one end and against a front surface of the exterior spindle 430 on a second end opposite the first end, biasing the exterior spindle 430 out of the opening 552 and through the through hole 506 of the spindle coupler 500. Ribs 566 of the spindle coupler 500 may catch ledges 564 on the front surface of the exterior spindle 430 to prevent the spring 570 from pushing the exterior spindle 430 completely through the spindle coupler 500. A rear side of the exterior lock spindle 430, opposite the spring 570, may enter an opening in a lock body and exert a force against the lock body in a direction along axis 10.

Figure 20A:
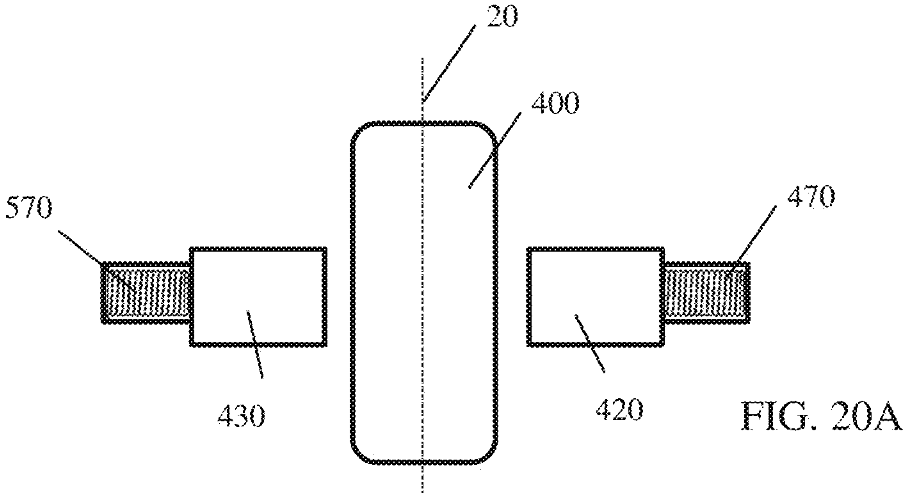
FIG. 20A is a side schematic view of an embodiment of a lock body positioned in a door prior to installation of an exterior lock portion and an interior lock portion on the door.
Figure 20B:
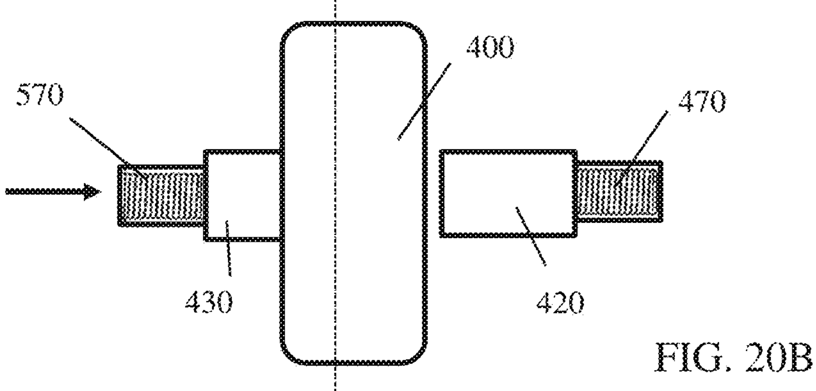
FIG. 20B is a side schematic view of the lock body of FIG. 20A positioned in a door with an exterior lock portion installed on the door.
Figure 20C:
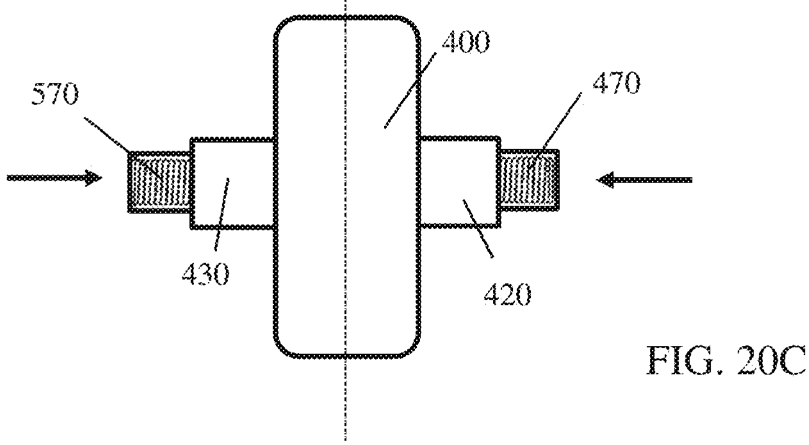
FIG. 20C is a side schematic view of the lock body of FIG. 20A positioned in a door with an exterior lock portion and an interior lock portion installed on the door.

FIGS. 20A-20C is a schematic illustrating an embodiment of a method for installing a door lock system. As shown in FIGS. 20A-20C, the door lock system includes a lock body 400 disposed between an exterior spindle 430 and an interior spindle 420. The exterior spindle 430 is biased toward the lock body by an exterior spindle spring 570 and the interior spindle 420 is biased toward the lock body by an interior spindle spring 470. Springs 570, 470 and spindles 430, 420 may automatically center a lock body 400 with a plane 20, which is parallel to a plane of a door on which the door lock system may be installed. As shown in FIG. 20A, the spring 570 and spindle 430 may be components in an exterior lock portion and the spring 470 and spindle 420 may be components in an interior lock portion. In FIG. 20A, the exterior lock portion and the interior lock portion may not be installed on a door and the spindles 430, 420 may not contact the lock body 400.

In FIG. 20B, the exterior lock portion may be installed on the door first and the exterior spindle 430 may engage the lock body (e.g., by entering an opening in the lock body). In some embodiments, the spring 570 may exert a force on the exterior spindle 430, which in turn may exert a force on the lock body 400, pushing the lock body away from the exterior spindle 430 in a direction perpendicular to plane 20.

In FIG. 20C, the interior lock portion may be installed on the door and the interior spindle 420 may engage the lock body 400 (e.g., by entering an opening in the lock body) on a side of the lock body 400 opposite the side of the exterior spindle 420. The springs 570, 470, and spindles 430, 420 may be aligned on an axis perpendicular to plane 20. In some embodiments, the spring 470 may exert a force on the interior spindle 420, which in turn may exert a force on the lock body 400, pushing the lock body away from the interior spindle 420 in a direction perpendicular to plane 20. The force of spring 570 and the force of spring 470 may be equal (e.g., the springs may have equal spring constants), such that the spindles 430, 420 exert equal, opposing forces on the lock body 400, causing the lock body 400 to automatically center within the door along plane 20, regardless of the thickness of the door. Thus, the door lock system 100, as described above, may be a universal door lock system that may be installed on doors of varying thicknesses. Although the lock body 400 is shown in FIG. 20C as centered in the door 20, in other embodiments the springs 570, 470 may have unequal spring constants such that the springs exert unequal, opposing forces on the lock body 400 to maintain the lock body in an off-centered position in the door, as the disclosure is not so limited.

It should be noted that while the exterior lock portion components are shown being installed on a door first in the embodiment of FIGS. 20A-20C, in other embodiments the interior lock portion components may be installed first, as the present disclosure is not so limited. In some embodiments, the interior and exterior lock portion components may be installed simultaneously. Regardless of order of installation, opposing springs associated with the opposing spindles may bias the lock body 400 toward alignment with plane 20, equidistant from opposing door surfaces. Accordingly, any suitable order of installation may be employed, as the present disclosure is not so limited.

Security

In some embodiments, the door lock systems may be an electronic door lock system that includes data wires and power wires interconnecting various electrical components. As described below, an exterior lock portion may include a second housing to protect the power wires from an attempted data breach.

Figure 21:
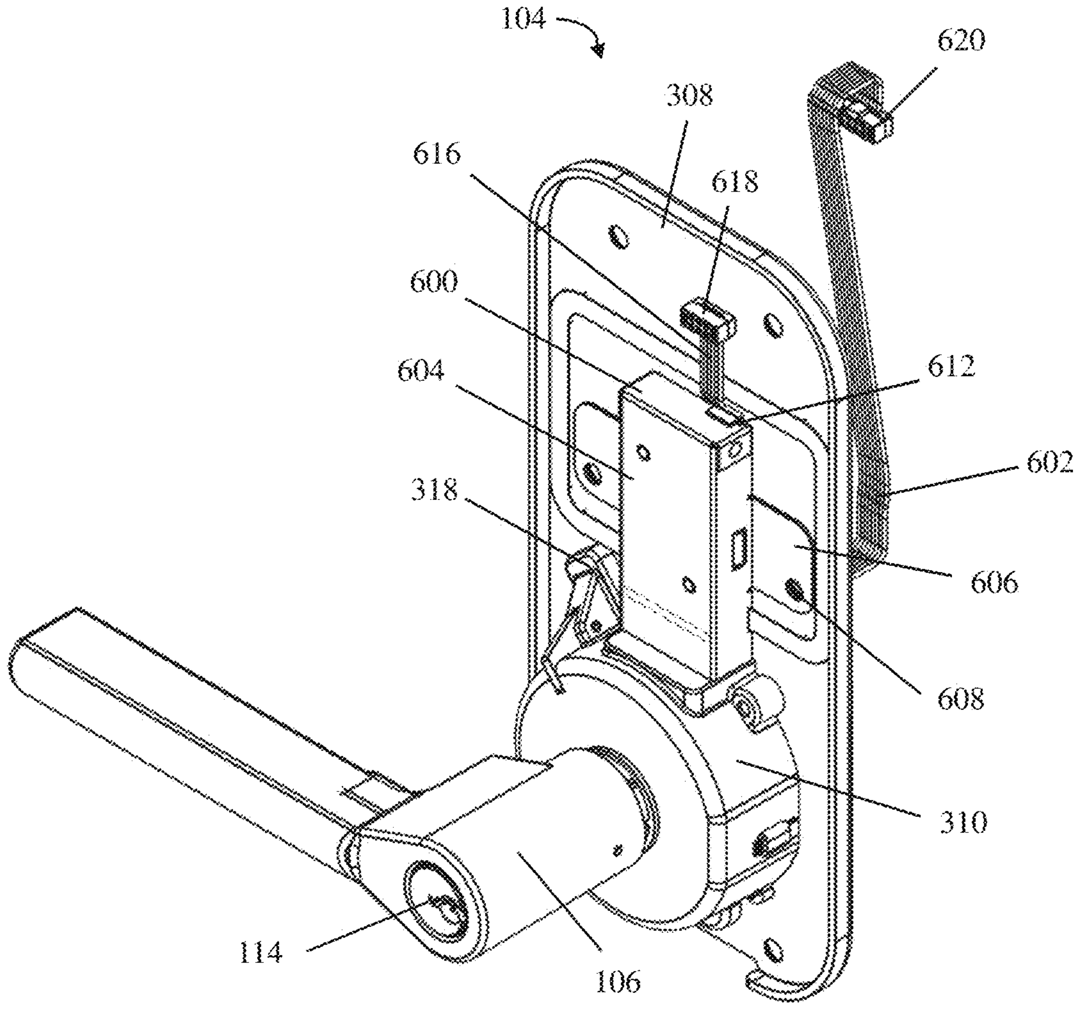
FIG. 21 is a perspective view of an embodiment of an exterior lock portion with an outer cover of the lock portion removed to expose a secondary housing.

FIG. 21 is a perspective view of an exterior lock portion 104 with parts of the lock portion removed to reveal a backplate 308. In some embodiments, the door lock system may be an electronic door lock system. As shown in FIG. 21, wiring 602 may electronically connect an interior lock portion to the exterior lock portion. For example, wiring 602 may connect an electronic component 618 in the exterior lock portion to an electronic component 620 in the interior lock portion. The wiring 602 may travel from the electronic component 620 in the interior lock portion, out through a slit 636 in a backplate 208 of the interior lock portion, through an opening in a door, and in through a slit 638 in the backplate 308 of the exterior lock portion to the electronic component 618 in the exterior lock portion (see FIG. 10).

In some embodiments, the exterior lock portion 104 may include a secondary housing 600 to enclose and protect operating components of the exterior lock portion 104, including the wiring 602. The secondary housing 600 may include a cover 604 with wings 606 that have screw holes 608 for attaching the cover 604 to the backplate 308 from the rear side (i.e., side facing the door) of the exterior lock portion. In some embodiments, the backplate 308, the secondary housing 600, and/or the cover 604 may be made of a durable material such as metal (e.g., stainless steel). By being back-screwed to the backplate 308, the secondary housing may only be removed by accessing the rear side of the backplate 308. If someone were to remove parts of the exterior lock portion in an attempt to access the wiring and circumvent the lock system, the cover 604 may not be removed from the backplate 308 without removing the exterior lock portion 104 from the door in order to access the rear side of the backplate 308. In some embodiments, the exterior lock portion 104 and the interior lock portion 108 may be secured to the door via rods 402 and pins 404 extending from the backplates of each lock portion (see FIGS. 10-11). The pins 404 may be screws that screw into threads on the interior surface of the rods 402 to clamp the exterior lock portion onto an exterior of the door. In this manner, the exterior lock portion 104 may only be non-destructively removed from the door from an interior side of the door via the interior lock portion.

Figure 22A:
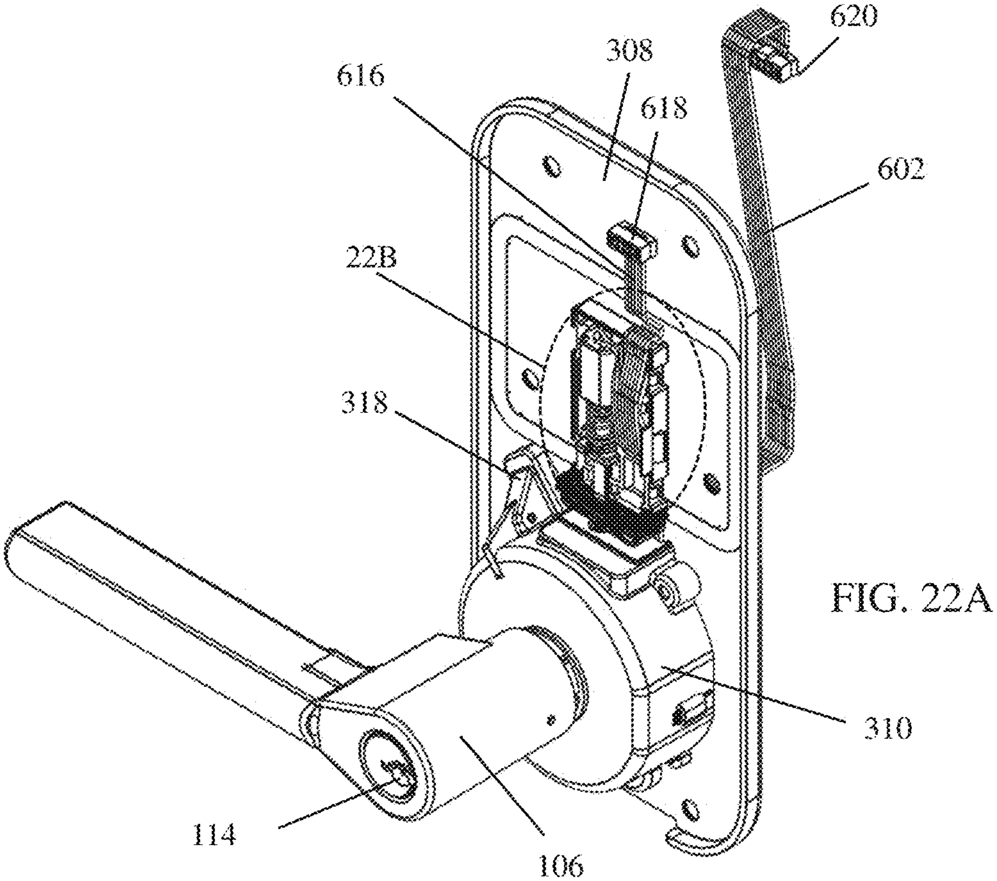
FIG. 22A is a perspective view of the exterior lock portion of FIG. 21 with the cover removed to expose components in the secondary housing.
Figure 22B:
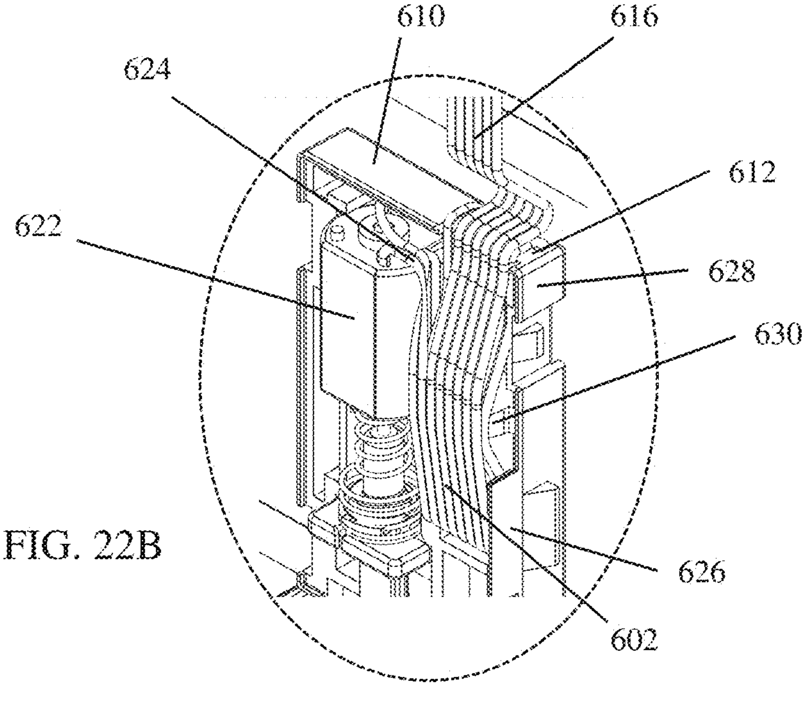
FIG. 22B is an enlarged view of section 22B of FIG. 22A.

FIGS. 22A-22B show the embodiment of the door lock system of FIG. 21 with a cover 604 removed, showing a rear housing 610 of the secondary housing 600. The rear housing 610 may be made of a durable material such as metal. As shown in FIG. 22B, the operating components within the secondary housing 600 may include an actuator 622 and wiring 602. The wiring 602 may include data wires and/or power wires. The data wires 616 may pass through an opening 612 in the secondary housing 600 to connect to an electrical component 618 in an exterior lock portion 104. The data wires 616 may only be reader wires and are not electrically related to the physical locking function of the door lock system. The power wires 624 may be contained entirely within and protected by the secondary housing 600. The power wires 624 may connect to the actuator 622 that controls the locking state of the door lock system (e.g., by moving a projection 522 of a slider 520 into locked and unlocked positions, as described above with reference to FIGS. 15-17).

Figure 23A:
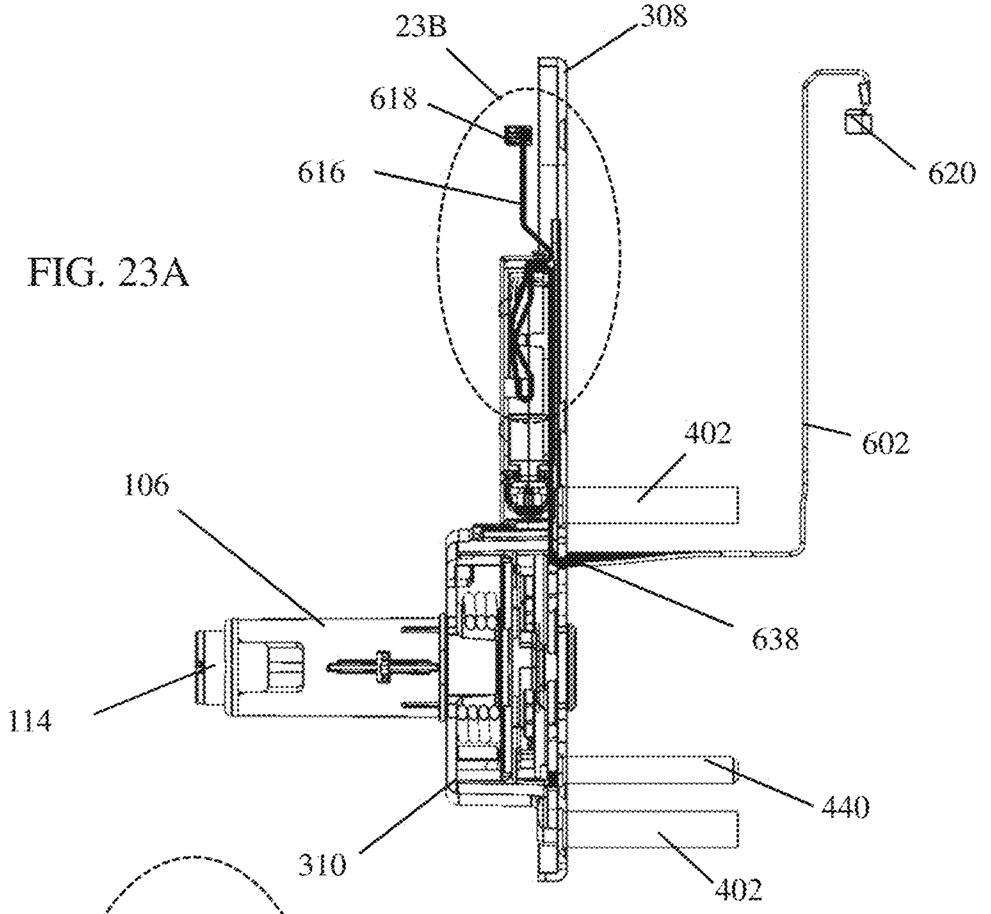
FIG. 23A is a side schematic view of the exterior lock portion of FIG. 21.
Figure 23B:
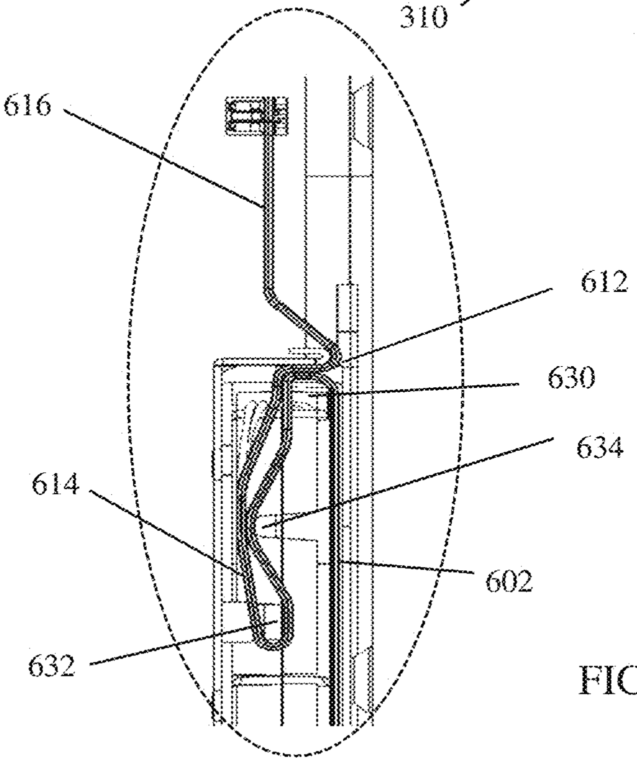
FIG. 23B is an enlarged view of section 23B of FIG. 23A.

FIGS. 23A-23B depict cross-sectional views of the door lock system shown in FIG. 21, where the cross-section is taken perpendicular to a plane defined by the backplate 308. FIGS. 23A-23B illustrate a path of the wiring 602 from the interior electrical component 620 to the exterior electronic component 618. The wiring 602 may enter the exterior lock portion through a slit 638 in a backplate 308 of the exterior lock portion. The slit 638 may be positioned below the rear housing 610. The wires 602 may then travel up between a rear surface of the secondary housing 600 and the backplate 308. The rear housing 610 may have an elongated channel (not shown) within the rear surface for the wires to pass between the rear housing 610 and the backplate 308. The wires 602 may be compressed within the elongated channel between the rear housing 610 and the backplate to secure the wires 602 in the exterior lock portion. The wires 602 may then travel over a ridge 630 at a top surface of the rear housing 610 that extends from a portion 628 (see FIG. 22B) of the rear housing 610. The wires 602 may then travel back down and loop under a looping ledge 632. The looping ledge may have a square cross-section and may extend from a portion 626 (see FIG. 22B) of the rear housing 610 or it may extend from an inside surface of the cover 604. The wiring 602 may then travel back and form a wire loop 614 in the secondary housing 600. In some embodiments, a projection 634 may extend from a back surface of the rear housing 610 that may pinch the wires above the looping ledge 632 against the cover 604.

After the projection 634 secures the wires against the cover 604, the power wires 624 may split from wire loop 614 and terminate at the actuator 622 (see FIG. 22B). The data wires 616 may travel back up over ridge 630 and pass through an opening 612 in the cover 604 and connect to the electronic component 618. The ridge 630 may compress the wires 602 against the cover 604, further securing the wires 602 in the secondary housing 600.

According to the embodiment of FIGS. 23A-23B, the secondary housing 600 and wire loop 614 may serve to protect the power wires 624 from being pulled from the secondary housing 600. If someone were to pull on the data wires 616, the ridge 630, projection 634, and looping ledge 632 would prevent the wires 602 from being pulled from the secondary housing, and specifically may prevent the power wires from being pulled out with the data wires. In this manner, an unauthorized user may be inhibited from accessing the power wires that control the actuator disposed in the exterior lock portion.

Figure 24:
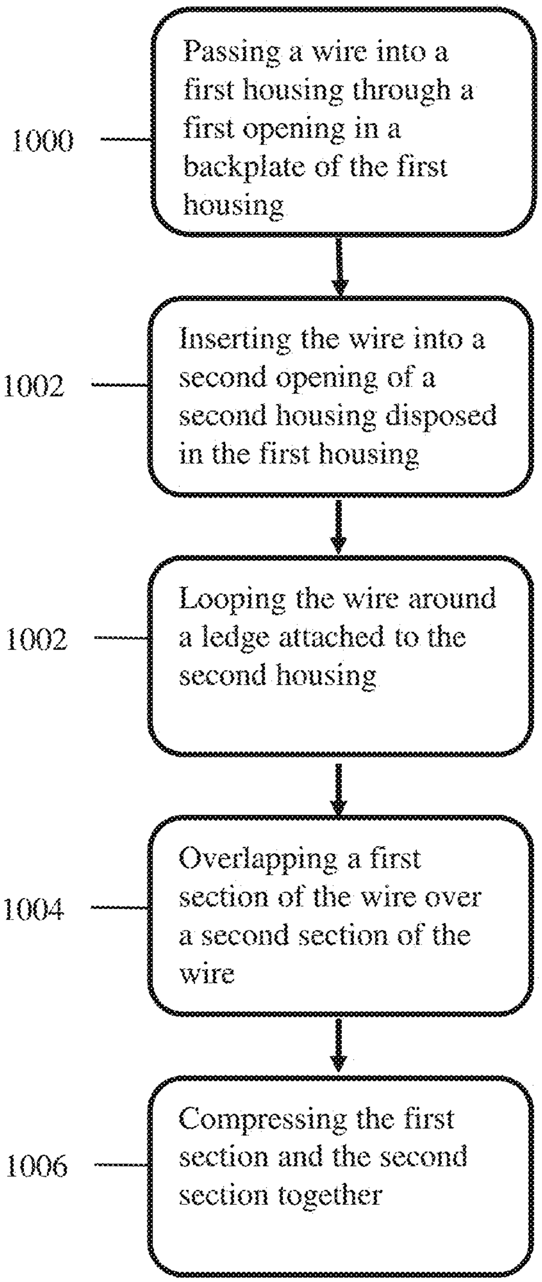
FIG. 24 is a flowchart of a method for running wiring between an interior lock portion and an exterior lock portion of a door lock system according to one embodiment.

FIG. 24 is a flowchart for a method of running and securing a wire in a first housing of a door lock system in accordance with some embodiments. In step 1000, a wire may be passed into a first housing through a first opening in a backplate of the first housing. In some embodiments the first housing may be an exterior lock portion and the wire may electrically connect one or more electrical components in an interior lock portion to one or more electrical components in the exterior lock portion.

In step 1002, the wire may be inserted into a second opening of a second housing disposed in the first housing. In some embodiments, the second housing may be a metal housing that is secured to a first side of the backplate of the first housing from a second side of the backplate, opposite the first side. The second housing may only be non-destructively removed from the first housing by accessing the second side of the backplate. In some embodiments, the second side of the backplate may be secured to an exterior side of a door and non-destructively removable only from an interior side of the door.

In some embodiments, the second housing may be positioned above the first opening and the second opening may be positioned at an upper surface of the second housing. In this manner, the wire may travel upwards (e.g., in a direction parallel to a plane of the door) between the first opening and the second opening before being entering the second housing though the second opening. The wire may be compressed and secured between the first side of the backplate and the second housing. In some embodiments a ridge may be positioned at an upper surface of the second housing adjacent to the second opening. The wire may enter the second opening after traveling upward to the second opening and wrap around the ridge to reverse direction and continue downward (e.g., in a direction parallel to a plane of the door).

In step 1002, the wire may be looped around a ledge attached to the second housing. In some embodiments, the wire may enter the second opening and initially travel in one direction (e.g., parallel to a plane of the door). The wire may then loop around the ledge to reverse direction and continue in an opposite direction within the second housing. In some embodiments the wire may enter an opening at the top of the second housing, travel downwards, loop around the ledge, and then travel back in an upwards direction to form a wire loop.

In step 1004, a first section of the wire may overlap a second section of the wire after looping the wire around the ledge. The first section of the wire may be a length of the wire between the second opening and the ledge, and the second section of the wire may be a length of the wire after the ledge. The first section and the second section may form the wire loop.

In step 1006, the first section of the wire and the second section of the wire may be compressed together within the second housing to secure the wire loop in the second housing. A projection may extend from a first surface in the second housing to clamp the wire loop between the projection and a second surface of the second housing.

In some embodiments, the wire may connect to an operating component positioned in the second housing. In some embodiments, the wire may travel out of the second opening and connect to an electrical component in the first housing. The second opening may be sized to compress the wire in the opening to secure the wire in the second housing. The wire may connect electrical components in the interior lock portion and the exterior lock portion. The second housing and the wire loop may protect the wires in the exterior lock portion that control a locking state of the door lock system in the event of an attempted breach.

Keyless Option

Figure 25:
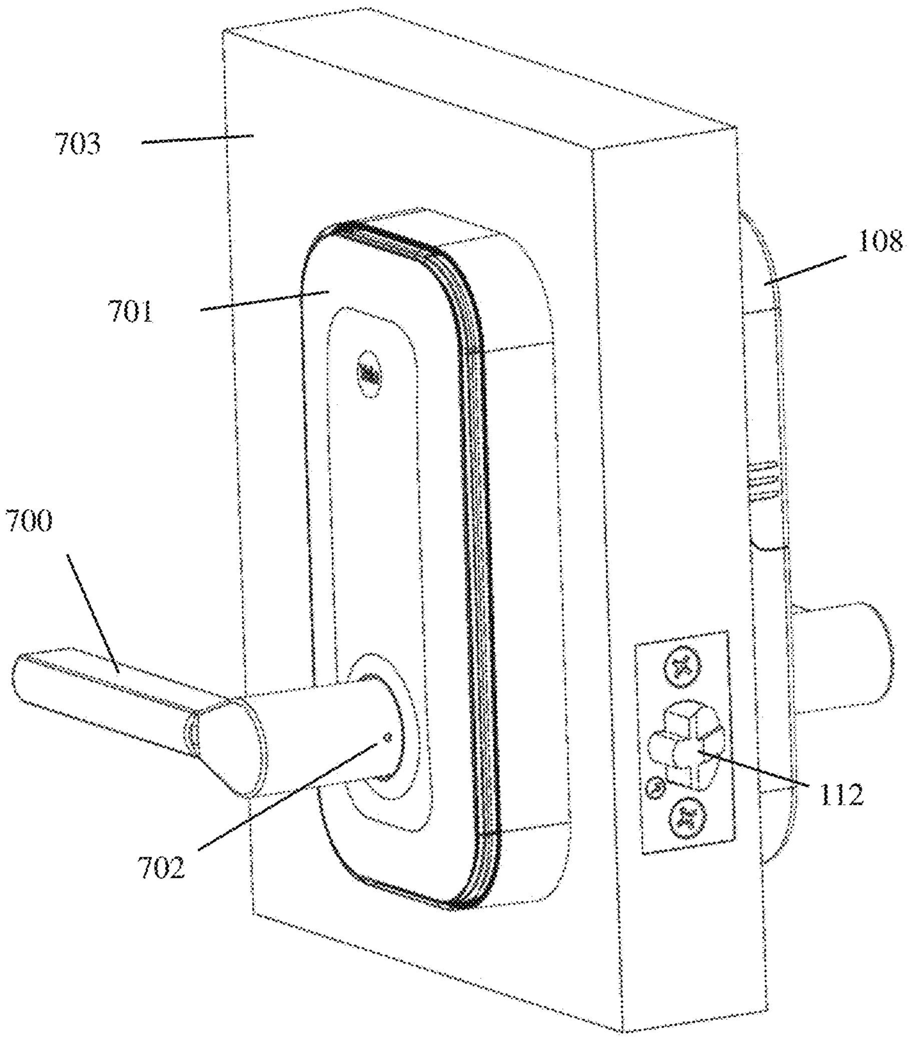
FIG. 25 is a perspective view of an embodiment of a door lock assembly with an exterior lock portion with a keyless handle.

Some embodiments of a door lock system may include a handle with a keyless cylinder, i.e., a handle without a key cylinder. As shown in FIG. 25, an exterior lock portion 701 attached to a door 703 includes a handle 700 with a keyless cylinder. The handle 700 includes an opening 702 to access a handle catch disposed inside the handle that secures the handle 700 to the door lock. Although described with respect to an exterior handle, it should be appreciated that an interior handle may also include a keyless cylinder, as the disclosure is not so limited.

Figure 26:
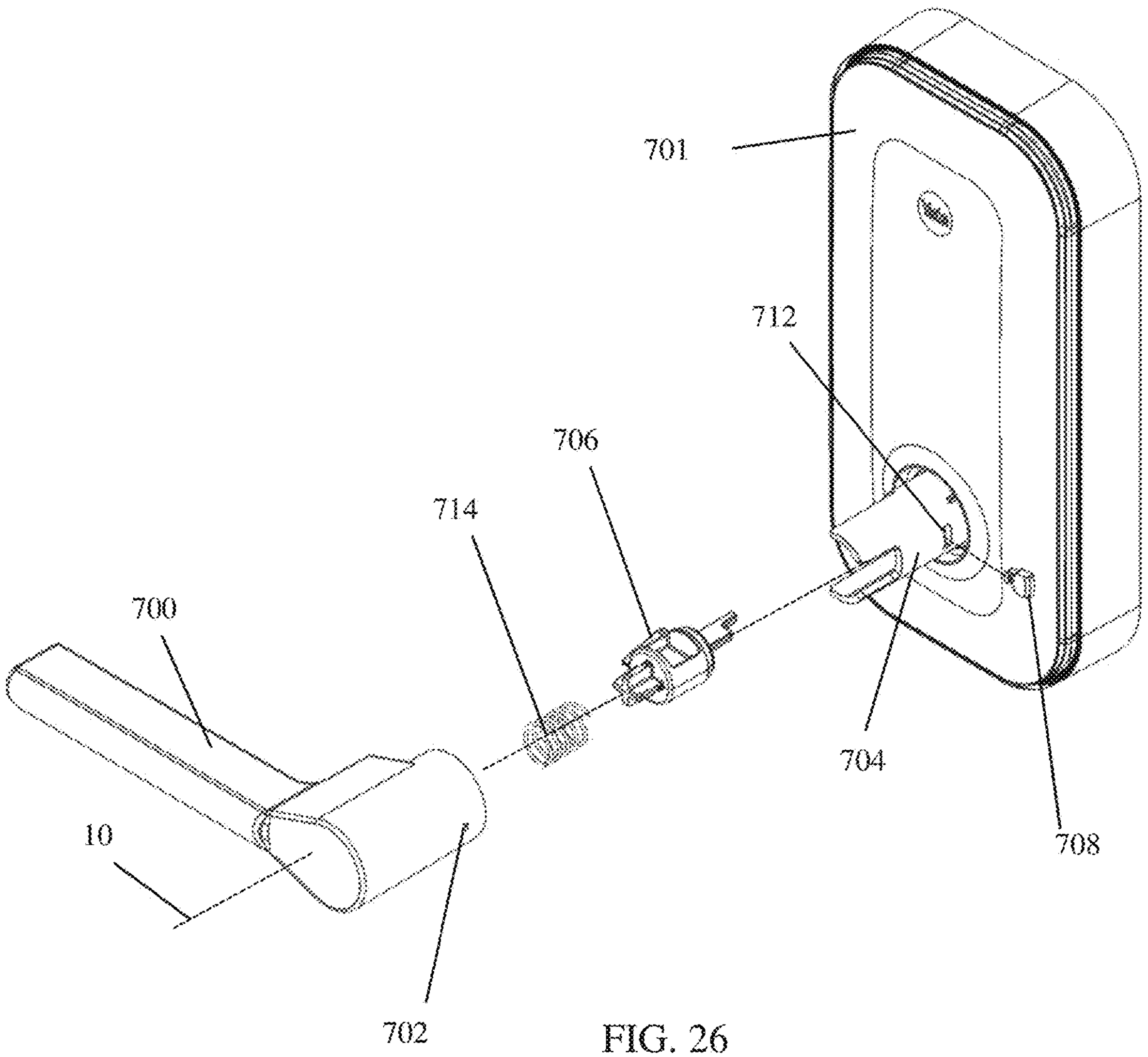
FIG. 26 is an exploded view of the exterior lock portion of FIG. 25.

FIG. 26 shows an exploded view of the exterior keyless handle 700 according to some embodiments. As illustrated in FIG. 26, an outer spindle 704 extends through an opening in the exterior lock portion 701. The outer spindle 704 and exterior lock portion 701 may be similar to and may include similar components as those described above in other embodiments. In this embodiment, a handle 700 is attached and secured to the outer spindle 704 via a handle catch 708. One end of the handle catch 708 extends through an opening 712 in the outer spindle 704 and an opposite end of the handle catch 708 is disposed in a groove 713 on an interior side of handle 700 (see FIGS. 29A-29B) in an engaged position to secure the handle to the outer spindle. To remove the handle 700 from the outer spindle 704, an object may be inserted into opening 702 on the handle to push the handle catch 708 radially inward out of the groove 713 to a disengaged position.

A locking block 706 is slidably disposed in the outer spindle 702 along a lock axis 10. The locking block 706 may be installed in the outer spindle 704 by a customer before a handle is attached. The locking block 706 may be made of metal or other durable material with a high melting point that cannot be deformed or otherwise compromised by someone trying to breach the lock system. When installed, the locking block 706 may be moveable in a direction along the lock axis 10 between a first, locked position and a second, unlocked position. As will be discussed further below, the locking block 706 is shaped and sized such that when the locking block 706 is in the locked position, the locking block 706 prevents the handle catch 708 from being moved radially inward from the engaged position to the disengaged position. A spring 714 disposed in the handle between the handle and the locking block 706 biases the locking block 706 in a first direction toward the door to the first, locked position.

Figure 27:
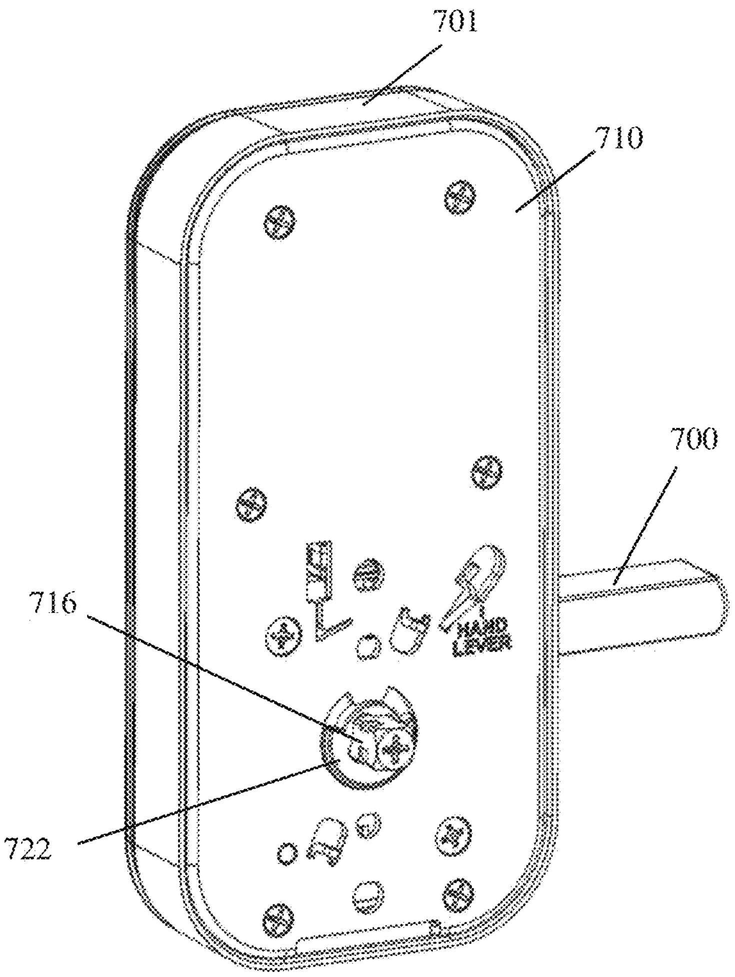
FIG. 27 is a rear perspective view of the exterior lock portion of FIG. 25.

The locking block 708 may only be moved in a second direction, opposite the first direction, to the second, unlocked position, by accessing components from an inner side of the lock portion (i.e., a side facing the door 102 when installed). As shown in FIG. 27, a lock spindle 716 extends through an opening in a backplate 710 of the exterior lock portion 701. The lock spindle engages a lock body (not shown) when installed on a door. As will be discussed in more detail below, pushing the lock spindle 716 in a direction into the exterior lock portion 701 may cause the lock spindle to contact a portion of the locking block 706 in the outer spindle and exert a force in the second direction on the locking block. The force in the second direction may overcome the force of the spring 714 and cause the locking block 706 to move to the second, unlocked position. In this unlocked position, the handle catch 708 may then be moved to the disengaged position and the handle may be removed.

As discussed above, an exterior lock portion 701 is installed on an exterior side of a door such that the exterior lock portion may only be removed from an interior side of the door. Accordingly, to remove the handle, someone must have access to the interior side of the door to first remove the exterior lock portion 701 from the door and then access the exterior lock spindle 716 on an inner side of the exterior lock portion. As such, the door lock system provides security from someone on an exterior side of a door who may try to remove a keyless cylinder handle to breach the lock.

Figure 28:
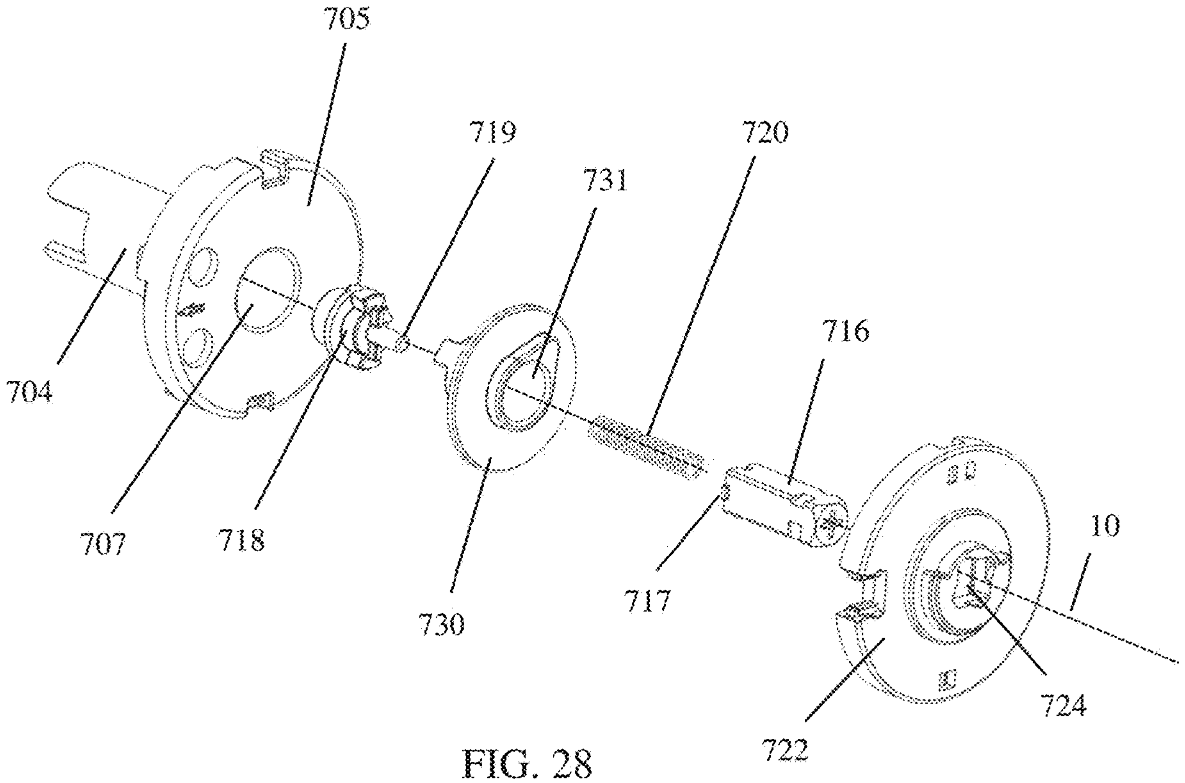
FIG. 28 is an exploded rear perspective view of locking components in the exterior lock portion of FIG. 25.

FIG. 28 is an exploded rear view of components in the exterior lock portion disposed along lock axis 10, according to some embodiments. As shown in FIG. 28, a first end of the lock spindle 716 extends through an opening 724 of a spindle coupler 722. A second end of the lock spindle 716 extends into an opening 731 on a first side of a spindle holder 730. The opening 731 extends through the spindle holder 730 in a direction along lock axis 10 from the first side to a second side, opposite the first side. The lock spindle is configured to slide in the spindle holder along the lock axis 10.

The second side of the spindle holder 730 is disposed in an opening 707 on a disc 705 coupled to the outer spindle 704. In some embodiments, the disc 705 may be integrally formed with the outer spindle 704 and the opening 707 may extend completely through the outer spindle 704. A piece 718 is disposed in the opening 707 between the outer spindle 704 and the spindle holder 730. A projection 719 extends from the piece 718 in a direction along the lock axis 10 into the opening 731 of the spindle holder. A spring 720 is disposed on the projection 719 that extends through opening 731 and contacts the second end of the lock spindle 716 to bias the lock spindle 716 in a direction toward the spindle coupler 722. As mentioned above, the lock spindle 716 may include tabs 717 extending radially from the second end of the lock spindle to prevent the lock spindle from extending completely through the opening 724 of the spindle coupler.

Figure 29A:
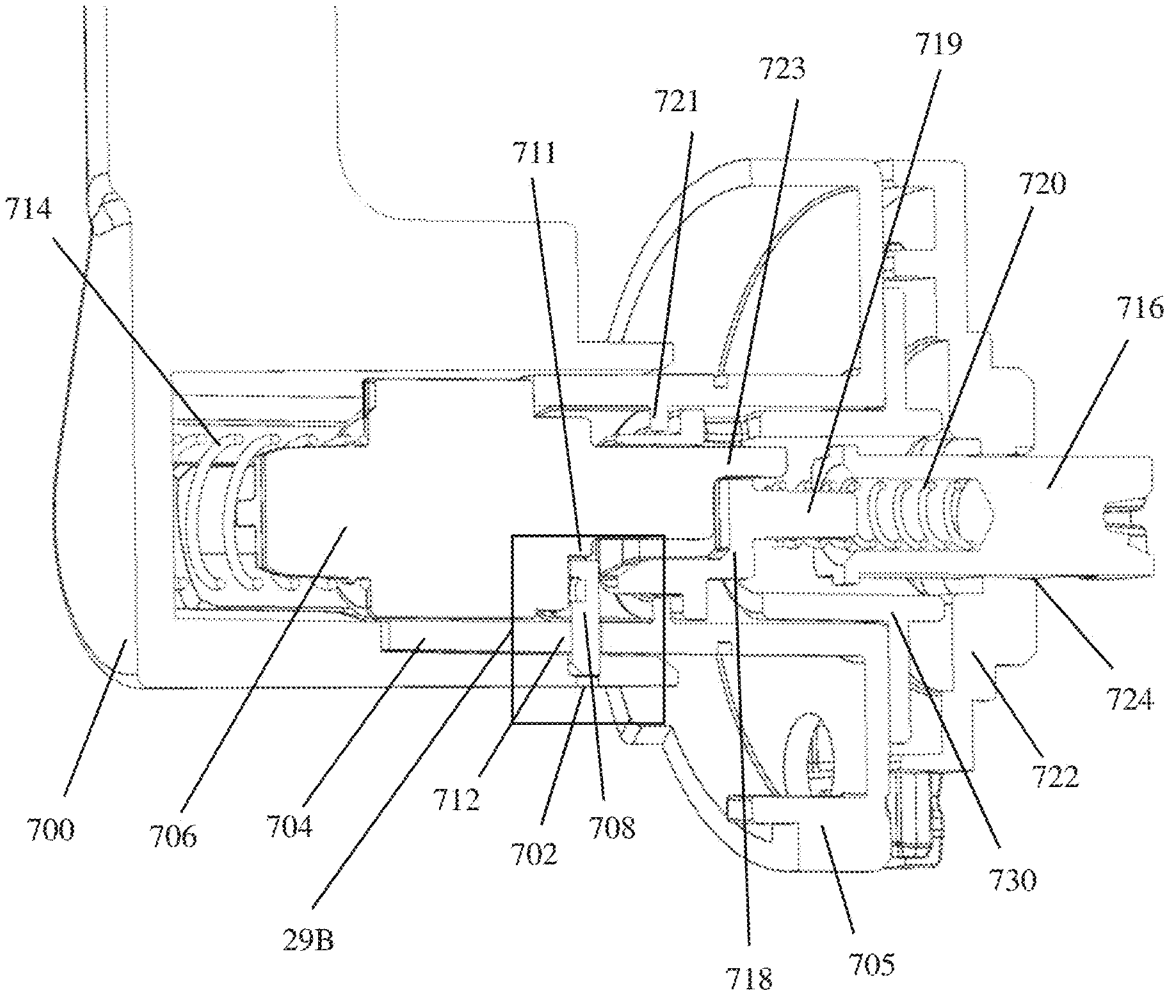
FIG. 29A is a top schematic view of components in the exterior lock portion of FIG. 25.
Figure 29B:
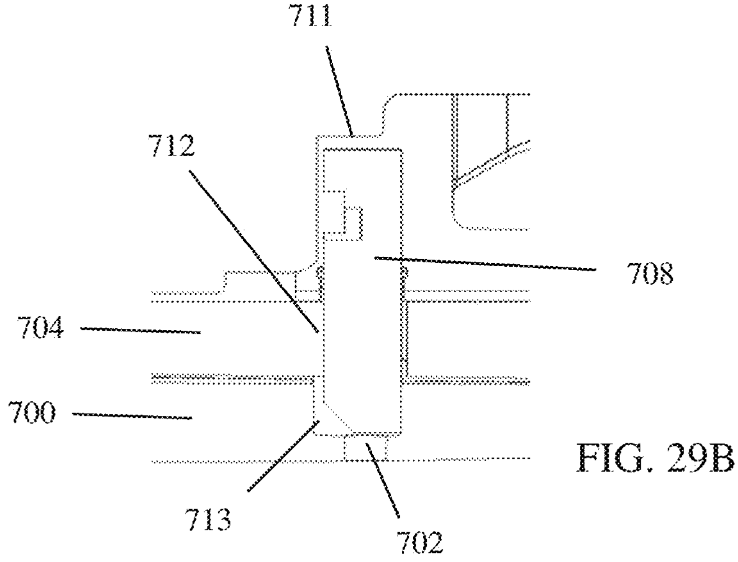
FIG. 29B is an enlarged view of section 29B of FIG. 29A.

FIG. 29A is a top perspective cross-sectional view of the keyless cylinder handle when the locking block is in the first, locked position, according to some embodiments. As shown, the locking block 706 is biased to the first, locked position via spring 714. As shown in FIG. 29B, the handle catch 708 is disposed in a groove 713 on the internal surface of the handle 700 to secure the handle to the outer spindle. In this locked position, a surface 711 of the locking block 706 is positioned over the opening 702 to prevent the handle catch 708 from moving radially inward out of groove 713 to the disengaged position. If someone attempted to insert an object into opening 702 of the handle 700, the locking block 706 would prevent the handle catch 708 from being moved to the disengaged position to release the handle.

As shown in FIG. 29A, the piece 718 is disposed in opening 707 of the outer spindle 704. The piece is shaped such that the piece 718 may not occupy the entire cross-sectional area of the opening 707, allowing a portion 723 of the locking block 706 to extend inwardly within the opening 707 past the piece 718. Spring 720 is disposed on projection 719 of the piece 718 and extends into an opening on the second side of the exterior lock spindle 716. Spring 720 biases the lock spindle 716 through opening 724 of the spindle coupler in a direction away from the piece 718. In some embodiments, an internal surface of the opening 707 of the outer spindle may include a ledge 721 to engage a portion of the piece 718 to position the piece 718 in the outer spindle and prevent the piece from moving outward past a certain point toward the locking block 706. As such, spring 720 may not exert any forces on the locking block in the second direction.

Figure 30A:
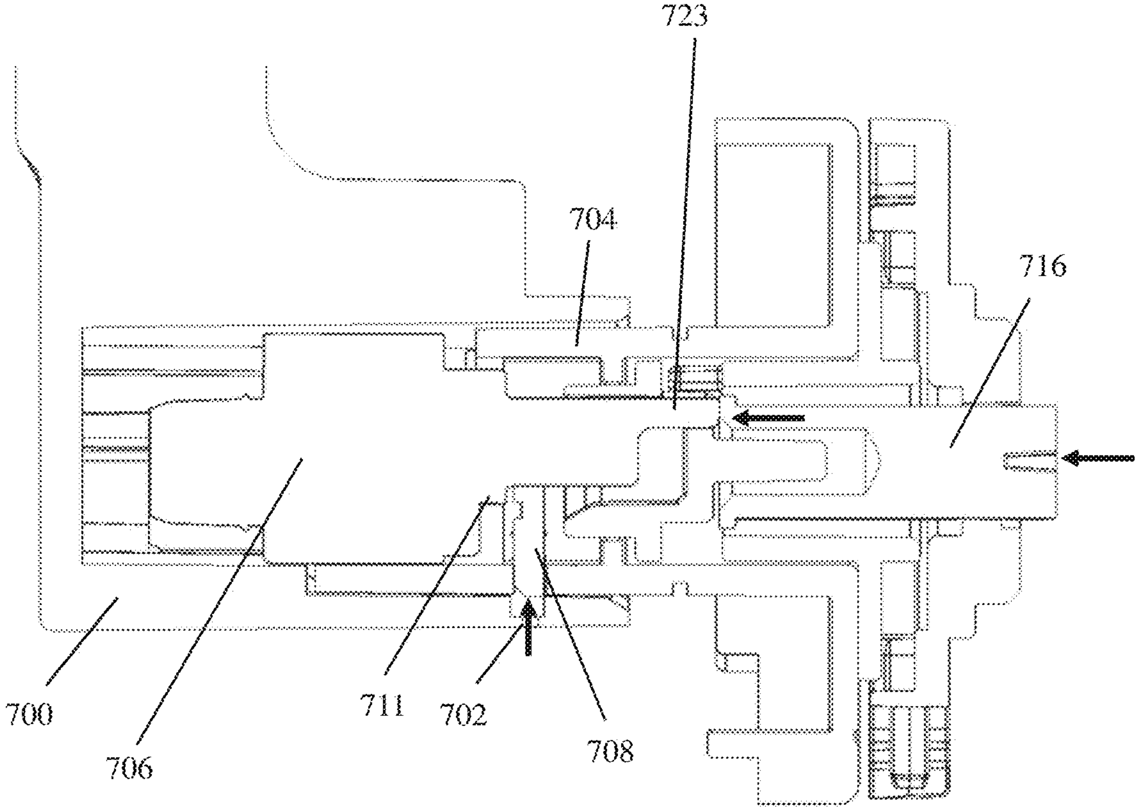
FIG. 30A is a top schematic view of the components in FIG. 29A in an unlocked position.
Figure 30B:
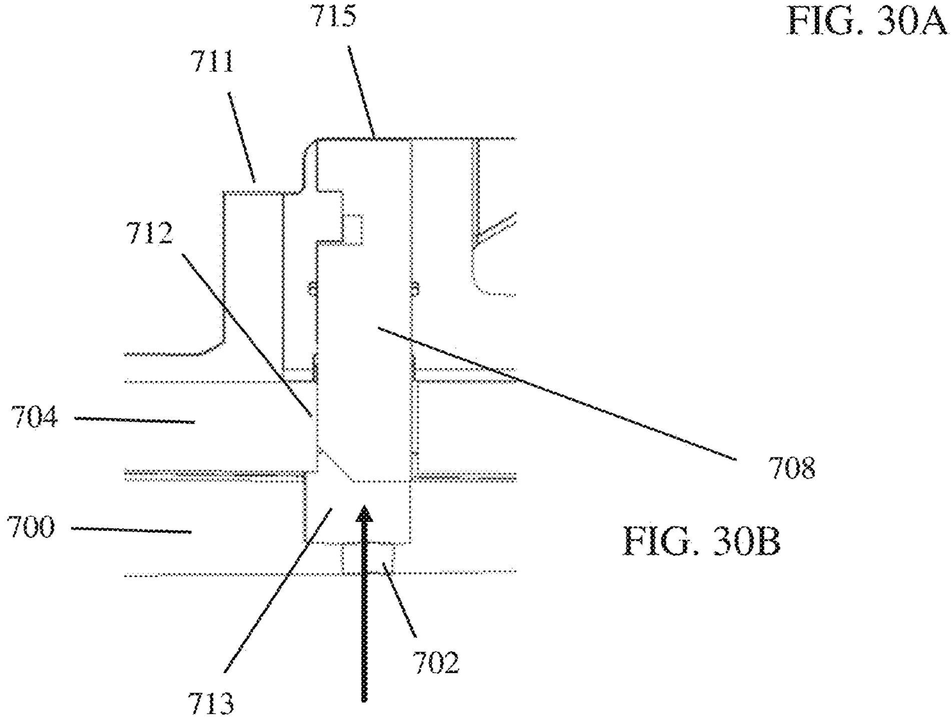
FIG. 30B is an enlarged view of section 30B of FIG. 30A.

FIG. 30A is a top cross-sectional view of the keyless cylinder handle when the locking block 706 has been moved to the second, unlocked position, according to some embodiments. As shown in FIG. 30A, a force has been exerted on lock spindle 716 in the second direction sufficient to overcome a force of the spring 720 (not shown) and cause the exterior lock spindle 716 to move in the second direction. The second end of the lock spindle 716 then contacts the portion 723 of the locking block 706 and exerts a force on the locking block 716 to cause the locking block to move in the second direction. As shown in FIG. 30B, surface 711 of the locking block 706 is no longer positioned over opening 702 nor aligned with handle catch 708. A surface 715 of the locking block is now positioned over the handle catch. Surface 715 is on a portion of the locking block having a smaller diameter than a portion of the locking block with surface 711, and as such, surface 715 is spaced radially inward from the internal surface of the outer spindle. Someone may now insert an object into opening 702 to move the handle catch 708 toward surface 715 out of the groove 713 in the handle 700. With the handle catch in the disengaged position, the handle may now be removed. In some embodiments, surface 715 may act like a stop to prevent the handle catch 708 from being pushed radially inward too far into the outer spindle 704.

Figure 31:
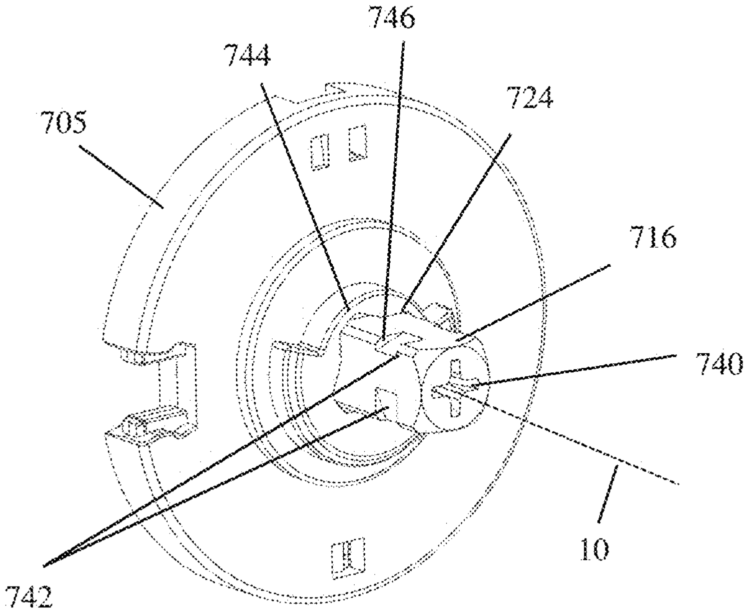
FIG. 31 is a rear perspective view of an exterior lock spindle disposed in a spindle coupler of the exterior lock portion of FIG. 25.
Figure 32:
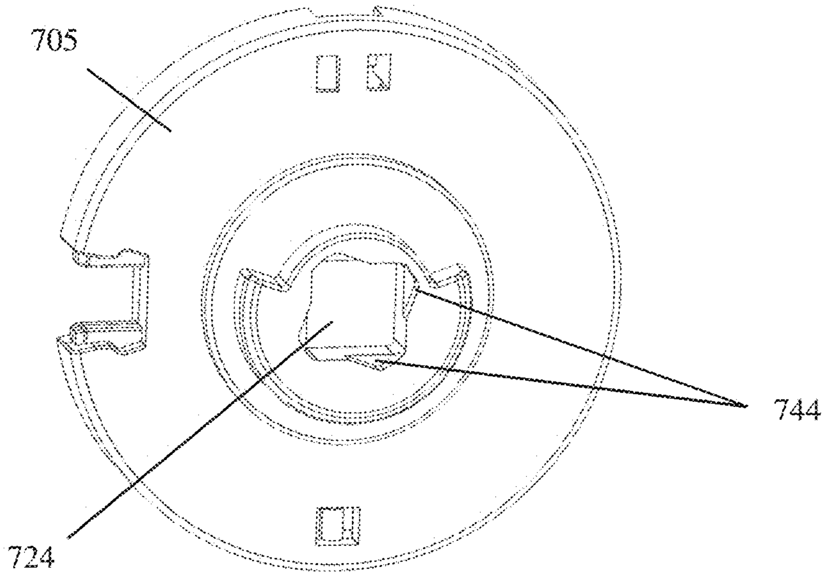
FIG. 32 is a rear perspective view of the spindle coupled of FIG. 31.

FIG. 31 shows a perspective view of the lock spindle 716 in the spindle coupler 705. In some embodiments, a first end of the lock spindle 716 includes indents 740. The indents 740 may be shaped to correspond to a screwdriver head or other object that may be inserted into the indents to push in and rotate the lock spindle in the opening 724 of the spindle coupler 705. The lock spindle 716 may also include notches 742 near the first end on each corner that extend along a longitudinal length of the lock spindle. The notches 742 may correspond to ridges 744 arranged around opening 724 of the spindle coupler 705, shown in FIG. 32. The lock spindle may be pushed inwards along the lock axis 10 (i.e., in the second direction) until the notches 724 line up with ridges 744 such that the ridges 744 allow the lock spindle 716 to be rotated about lock axis 10. In the rotated state, ledges 746 of notches 742 engage a rear surface of the spindle coupler 705 to hold the lock spindle 716 in the pushed-in position along lock axis 10.

Figure 33:
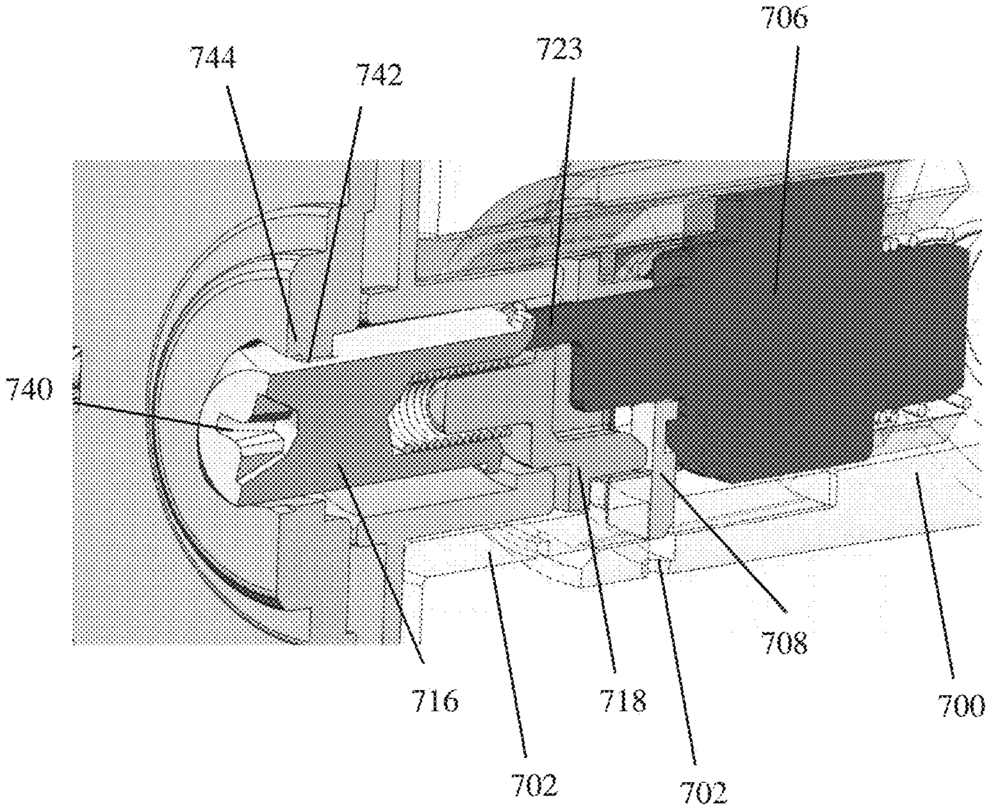
FIG. 33 is a side schematic view of the locking components of the exterior lock portion of FIG. 25 with the exterior lock spindle in a pushed in and rotated position.

FIG. 33 is a side cross-sectional perspective view of the lock spindle 716 pushed in and rotated about lock axis 10. In this position, the second end of the lock spindle may press against portion 723 of the locking block to move the locking block to the second, unlocked position. With the lock spindle 716 retained in this position and holding the locking block in the unlocked position, a user attempting to remove the handle may have two free hands to remove the handle. For example, the user may use one hand to insert an object into opening 702 to disengage the handle catch 708 and may use the other hand to grasp the handle 700 and remove the handle from the outer spindle 702.

Weatherization

Figure 34:
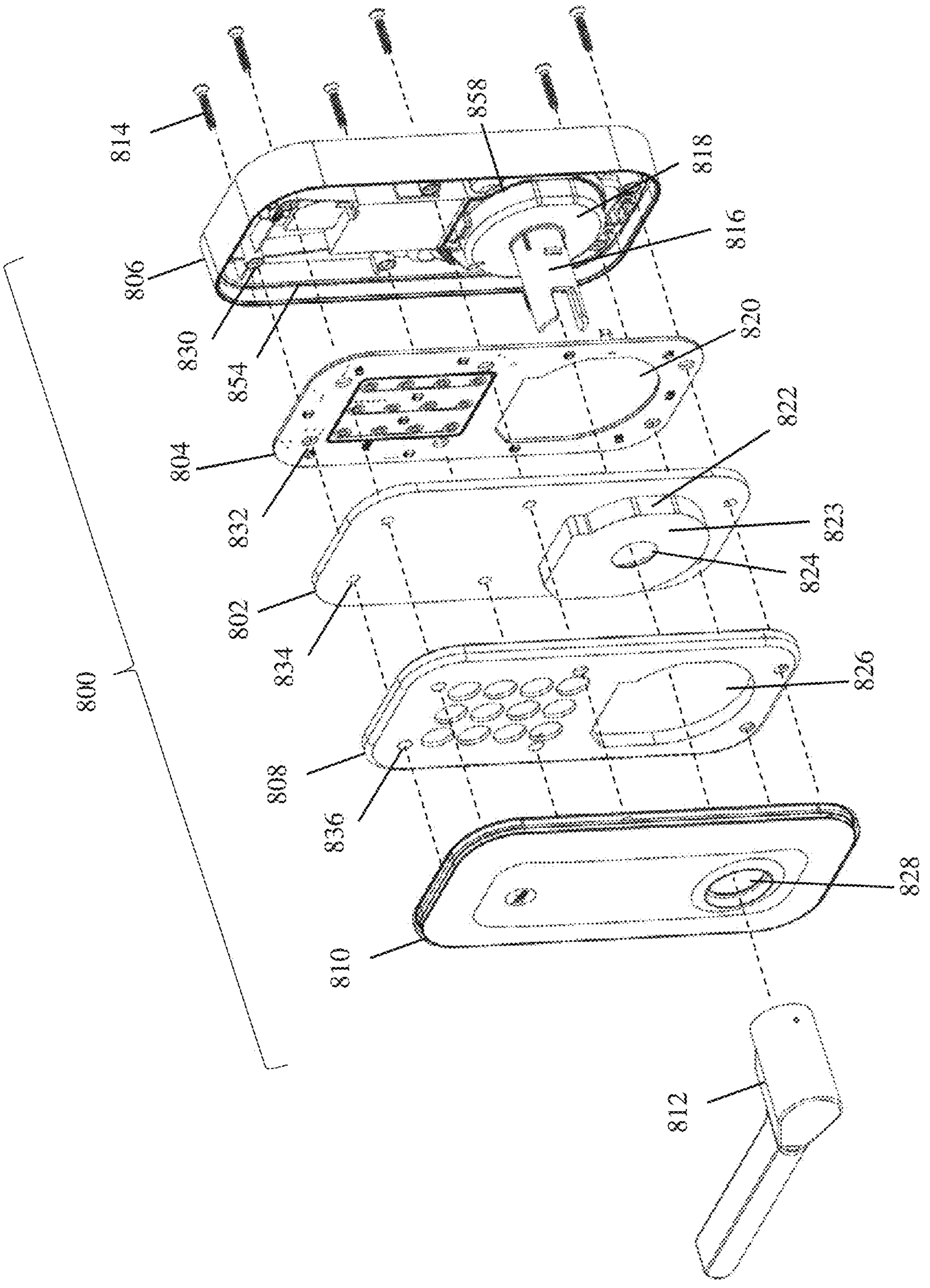
FIG. 34 is an exploded front perspective view of an exterior lock portion, according to an embodiment.
Figure 35:
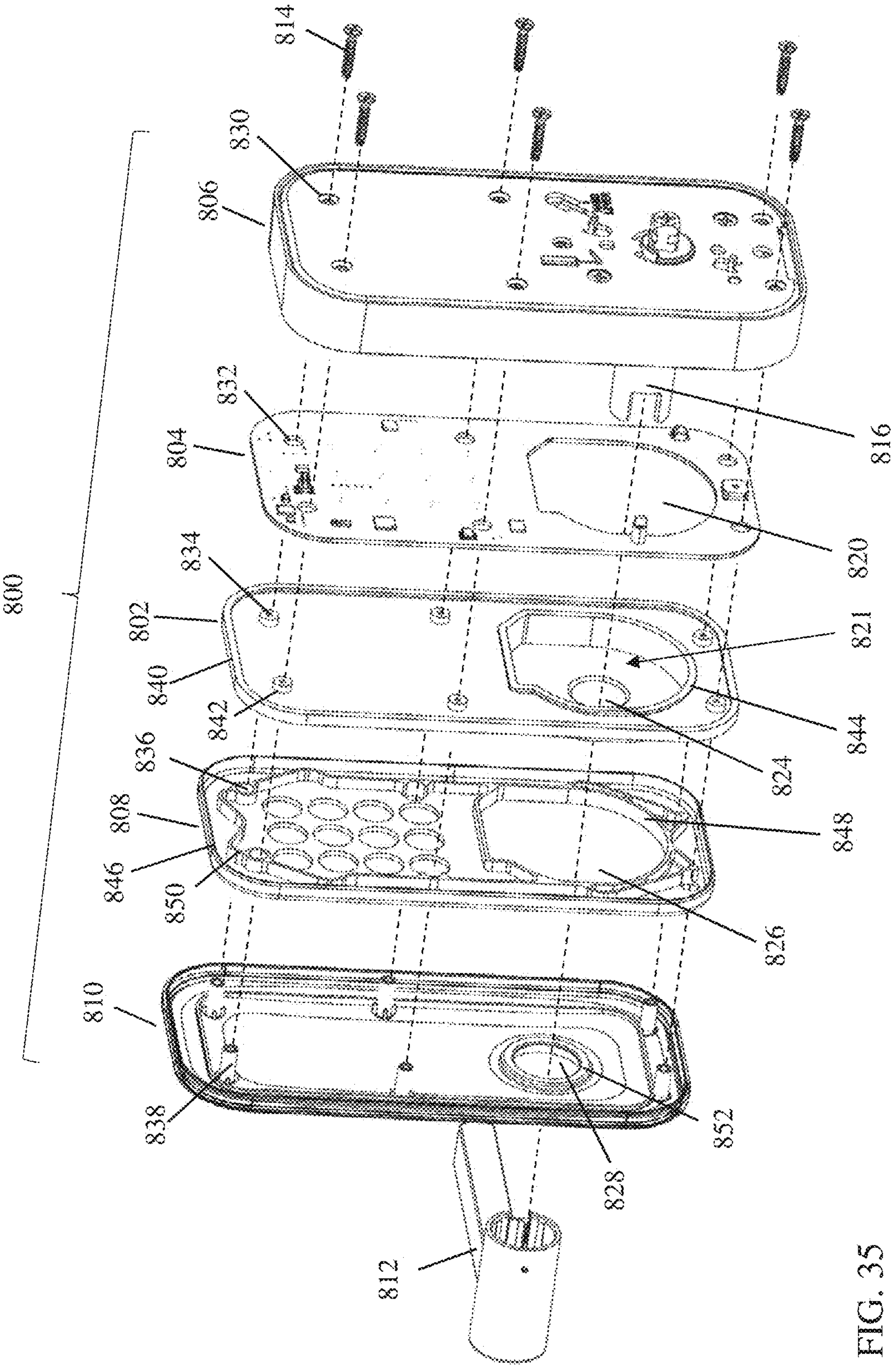
FIG. 35 is an exploded rear perspective view of the exterior lock portion of FIG. 34.

According to some embodiments, the door lock system described herein may include various gaskets and sealing methods to protect internal electrical components from external humidity. FIGS. 34 and 35 show an exterior lock portion 800 of the door lock system. In this embodiment, the external lock portion 800 includes a printed circuit board 804, a gasket 802, and a plate 808 disposed between an exterior housing 806 and an exterior escutcheon 810. The exterior housing 806 is configured to be installed on an exterior surface of a door (not shown) and has an open front for receiving the printed circuit board 804, the gasket 802, and the plate 808. Screws 814 disposed around a circumference of the lock portion secure and uniformly compress together these components between the exterior housing 806 and the escutcheon 810 to form a moisture barrier seal, as will be described below. The exterior housing 806 also includes lock and housing components, such as an outer spindle 816 and cover 818, described in embodiments above. The circuit board 804, gasket 802, plate 808, and escutcheon 810 include openings 820, 824, 826, 828, respectively, through which the outer spindle 816 extends to receive a handle 812 on the outer side of the escutcheon 810.

In this embodiment, the printed circuit board 804 is formed of a substantially elongate and planar body and is sized and shaped to be slightly smaller than the open front of the exterior housing such that it fits within and substantially covers the open front of the exterior housing 806. It should be noted that the printed circuit board 804 can be other shapes and sizes that fit within exterior housing 806, as the disclosure is not so limited. The opening 820 in the printed circuit board 804 is sized and shaped to allow the cover 818 to extend through the opening. The printed circuit board 804 also includes screw holes 832 aligned with screw holes 830 of the exterior housing for screws 814 to pass through.

Figure 36A:
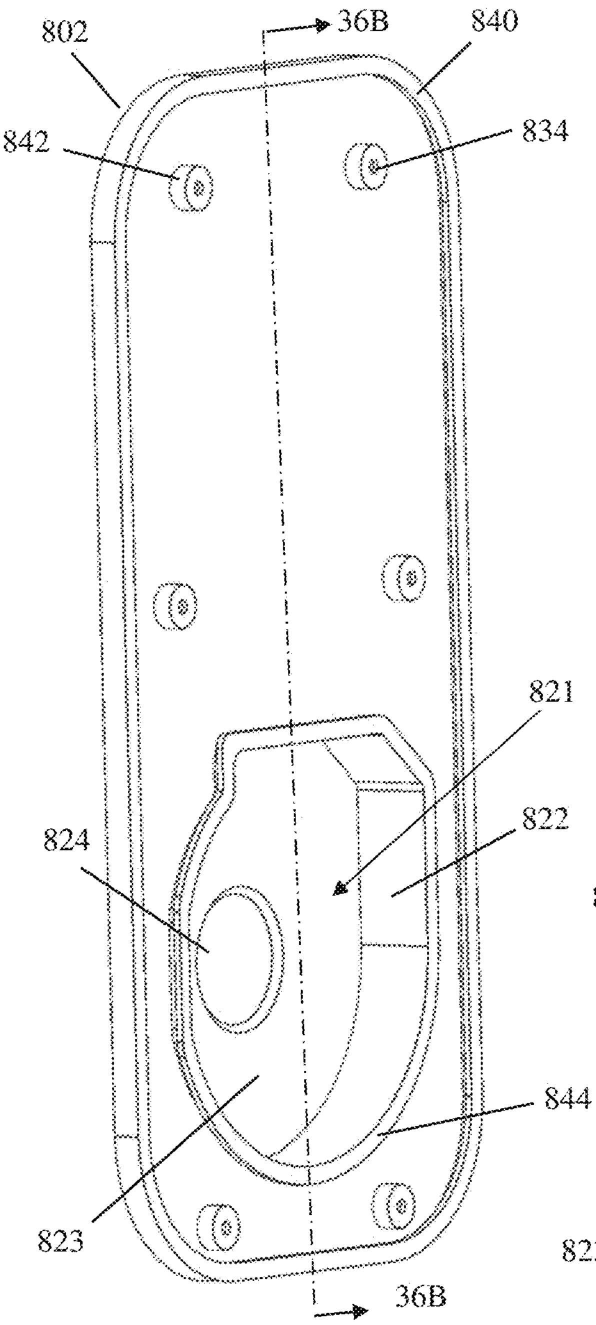
FIG. 36A is a rear perspective view of a gasket of the exterior lock portion of FIG. 34.
Figure 36B:
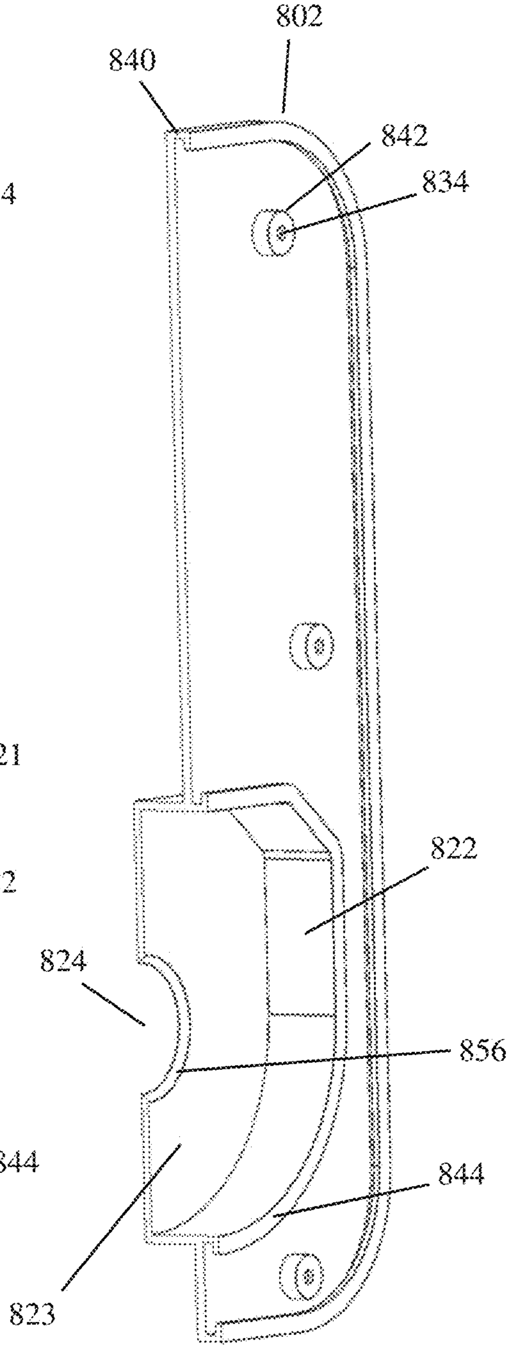
FIG. 36B is a cross-sectional view of the gasket of FIG. 36A taken along line 36B.

In this embodiment, a gasket 802 is disposed on the outer side of the printed circuit board 804. The gasket 802 is formed of a substantially elongate and planar body and is shaped to match the circuit board and the open front of the exterior housing. As shown in FIGS. 36A-36B, the gasket includes a first L-shaped perimeter 840 that extends around the entire gasket 802 and wraps around a perimeter edge of the circuit board. The L-shape first extends in a direction perpendicular to the body of the gasket inwardly toward the printed circuit board and then in a direction parallel to the body of the gasket radially inwardly. The gasket is shaped to match the printed circuit board and is slightly larger in size than the printed circuit board such that the first L-shaped perimeter 840 extends over a perimeter edge of the printed circuit board and onto an inner side of the printed circuit board around the entire perimeter of the circuit board (see FIG. 38A-38B).

The gasket 802 includes screw holes 834 that align with screw holes 804 of the printed circuit board 804 and the screw holes 830 of the exterior housing. The screw holes 834 extend through protrusions 842 that protrude from an inner side of the gasket toward the printed circuit board. The protrusions 842 are sized and shaped to match the screw holes 832 and 830 such that when the exterior lock portion is assembled, the protrusions 842 extend through screw holes 832 of the printed circuit board and into screw holes 830 of the exterior housing. A first end of the protrusions 842 abuts an inner ledge 843 of screw holes 830 (see FIG. 38B).

In this embodiment, the gasket 802 includes a recess 821 that extends from an outer side of the gasket that is shaped and sized to receive cover 818 disposed on the exterior housing. As shown in FIGS. 36A-36B, the recess 821 includes walls 822 that extend in a direction perpendicular to the body of the gasket to a surface 823 that is parallel to the body of the gasket. Surface 823 includes opening 824 through which the outer spindle 816 extends. As will be discussed further below, the opening 824 includes a beveled perimeter 856 that compresses against the surface of the outer spindle to create a seal around the outer spindle while still allowing the outer spindle to rotate within the opening 824.

Similar to the first L-shaped perimeter 840 of the gasket 802, the recess 821 includes a second L-shaped perimeter 844 that extends from the inner side of the gasket. The L-shape first extends in a direction perpendicular to the body of the gasket inwardly toward the printed circuit board and then in a direction parallel to the body of the gasket radially outward. The perimeter of opening 820 in the printed circuit board is received in the L-shaped perimeter of the recess 821 such that the L-shape wraps around the perimeter of opening 820 and extends partially onto the inner side of the circuit board (see FIGS. 38A and 38C).

Returning to FIGS. 34 and 35, in this embodiment, the plate 808 is formed of a substantially elongate and planar body and is shaped and sized to match the gasket 802 and the open front of the exterior housing 806. The opening 826 in plate 808 is sized and shaped to match the recess 821 such that the recess 821 fits into and extends through the opening 821. The plate 808 includes screw holes 836 that align with the screw holes 834 of the gasket and screw holes 838 of the exterior escutcheon 810. The screw holes 838 include protrusions that extend toward the plate 808 and through screw holes 836 and into a second end of the protrusions 842 of the gasket (see FIG. 38B).

In this embodiment, plate 808 includes a plate perimeter 846 that extends inwardly in a direction perpendicular to the body of the plate toward the gasket 802. As discussed below, an end of the plate perimeter 846 includes a beveled edge configured to compress against the outer side of the perimeter of gasket 802 (see FIG. 38B). The plate also includes first and second ribs 848 and 850 that extend inwardly in a direction perpendicular to the body of the plate and are configured to contact the outer side of the gasket. The first rib 848 is disposed around opening 826 and aligns with the second L-shaped perimeter 844 of the gasket 802. The second rib 850 is disposed radially inward from the plate perimeter 846. As shown, the second rib 850 may surround screw holes 836 such that the second rib 850 contacts the gasket around protrusions 842 of gasket 802. When the exterior lock portion is assembled, the plate perimeter 846 and first and second ribs 848 and 850 of the plate 808 compress against the outer side of the gasket 802, compressing the gasket against the exterior housing 806 with uniform compression around the perimeters 840, 844 of the gasket and creating an air and watertight seal around the printed circuit board 804.

Figure 37C:
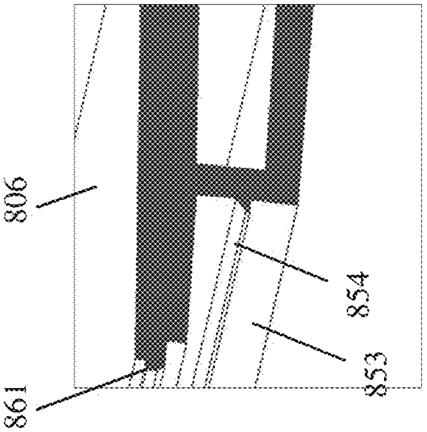
FIG. 37C is an enlarged view of section 37C of FIG. 37B.
Figure 37B:
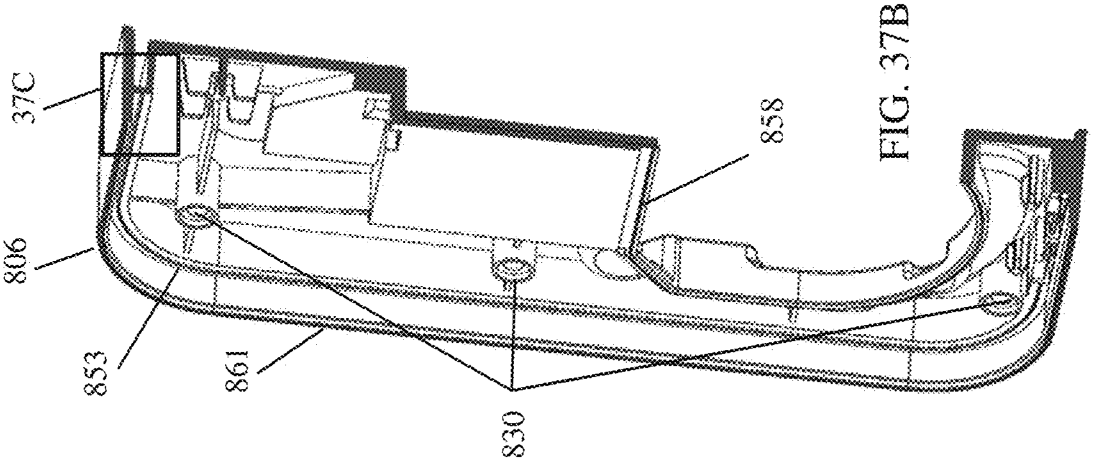
FIG. 37B is a perspective cross sectional view of the exterior housing of FIG. 37A taken along line 37B.
Figure 37A:
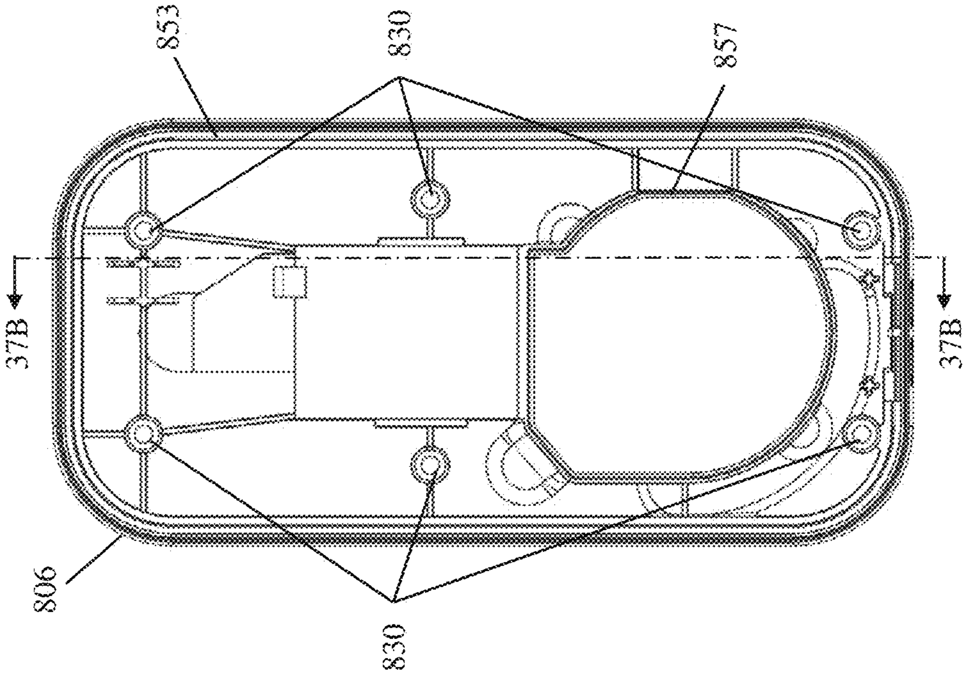
FIG. 37A is a front view of an exterior housing of the exterior lock portion of FIG. 34.

FIGS. 37A-37C show the outer side of the exterior housing 806. The exterior housing includes a first ledge 853 disposed around the perimeter of the exterior housing. The first ledge is set inward from an outermost portion 861 of the exterior housing perimeter. When the exterior lock portion is assembled, the gasket 802, printed circuit board 804, and plate 806 are disposed and compressed between the ledge 853 and the exterior escutcheon 810 and the first ledge 853 is aligned with the first L-shaped perimeter 840 of the gasket 802. The first ledge 853 extends almost entirely around the perimeter of the exterior housing. In other embodiments, the ledge may extend entirely around the perimeter of the exterior housing. As shown in FIG. 37C, the first ledge 853 includes a first ridge 854 that protrudes from the ledge in a direction toward the gasket 802. The first ridge 854 may have a triangular shape or a tapered end that is configured to compress into the first L-shaped perimeter 840 of the gasket 802 when the lock portion is assembled (see FIG. 38B).

In this embodiment, as shown in FIG. 37A, the exterior housing 806 also includes a second ledge 857 disposed around an opening for the lock components (e.g., cover 818) in the exterior housing that is aligned with the second L-shaped perimeter 844 of the gasket 802 when the exterior lock portion is assembled. The second ledge 857 extends entirely around the opening for the lock components. The second ledge 857 includes a second ridge 858 that protrudes from the ledge in a direction toward the gasket 802. The second ridge 858 may have a triangular shape or a tapered end that is configured to compress into the second L-shaped perimeter 844 of the gasket 802 when the lock portion is assembled (see FIG. 38C).

Figure 38A:
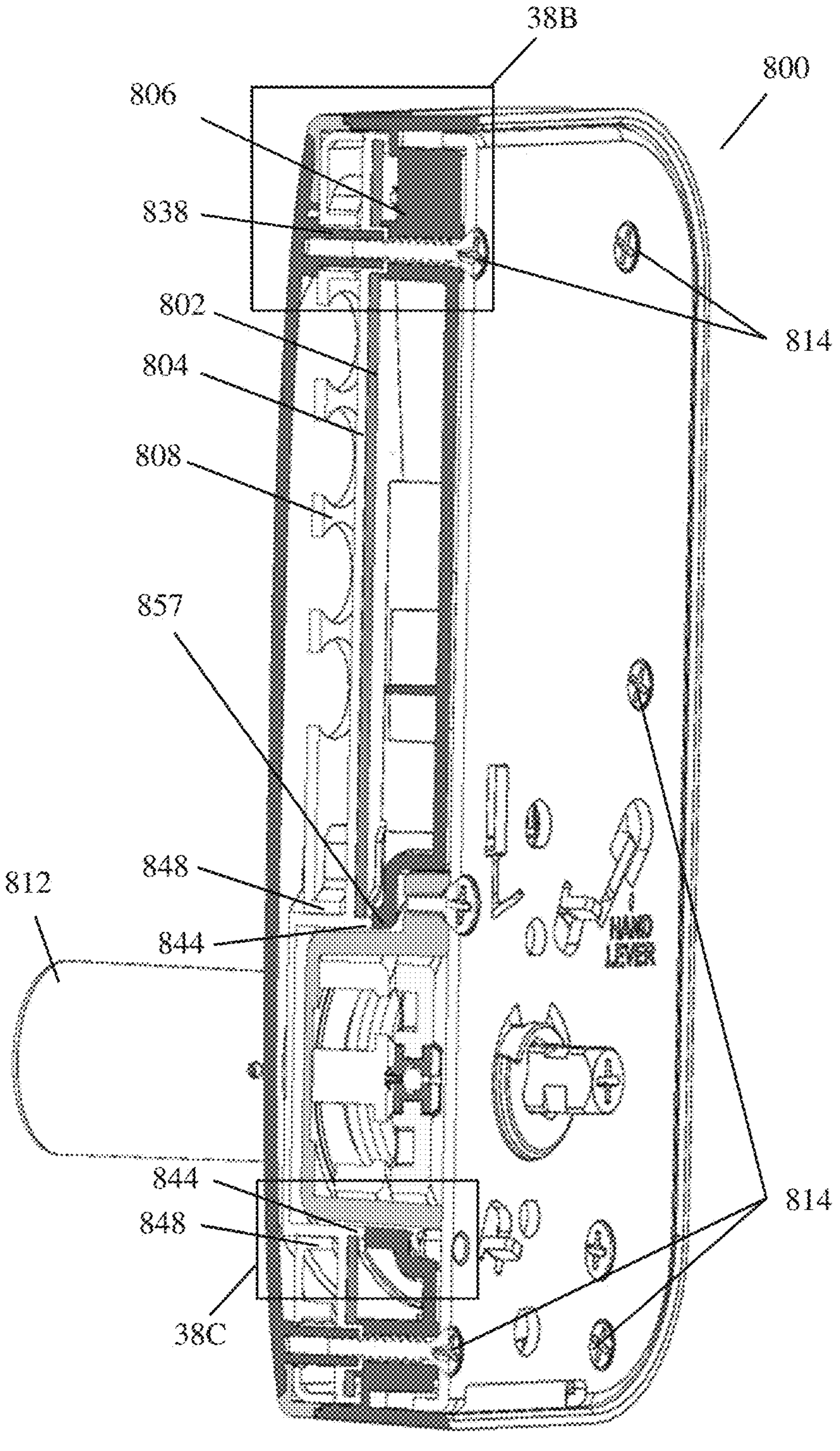
FIG. 38A is a side schematic view of the exterior lock portion of FIG. 34.
Figure 38B:
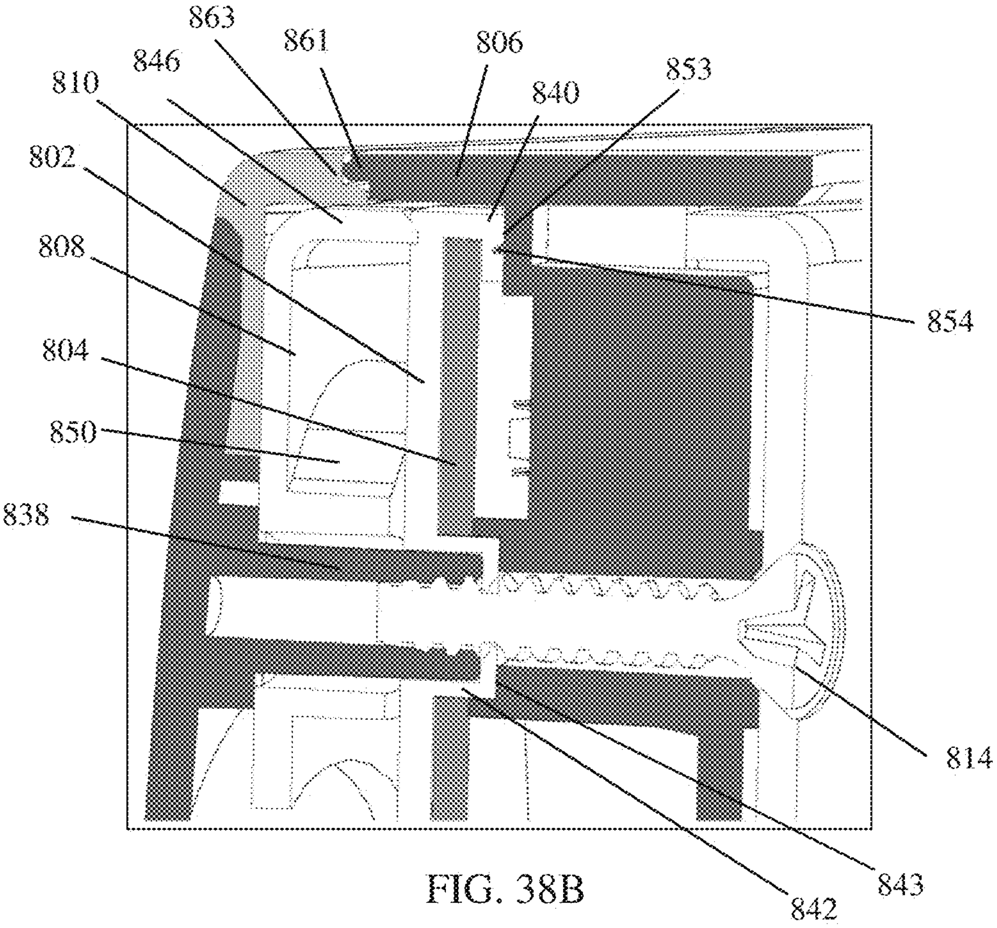
FIG. 38B is an enlarged view of section 38B of FIG. 38A.
Figure 38C:
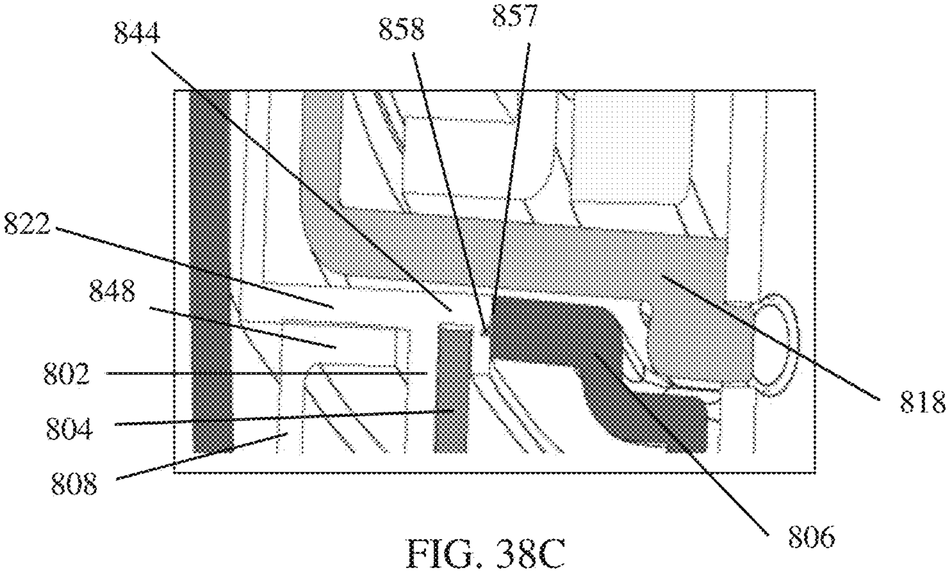
FIG. 38C is an enlarged view of section 38C of FIG. 38A.

FIGS. 38A-38C show side perspective schematic views of the exterior lock portion when assembled. The screws 814 pass through screw holes 830 from the inner side of the exterior housing, through screw holes 832 of the printed circuit board, 834 of the gasket, and 836 of the plate, and into screw holes 838 of the exterior escutcheon 810. The screw holes 838 include internal threads such that when the screws 814 are screwed into holes 838, the screws grip the threads and cause the exterior escutcheon to move toward the exterior housing until an innermost portion 863 of the exterior escutcheon perimeter contacts the outermost portion 861 of the exterior housing perimeter. When the exterior escutcheon and the exterior housing are brought together, the plate, gasket, and printed circuit board are uniformly compressed between the exterior housing and the exterior escutcheon.

As shown in FIGS. 38A-38C, the exterior escutcheon 810 presses the plate 808 against the gasket 802, pressing the plate perimeter 846, the first rib 848, and the second rib 850 against the gasket 802. As best shown in FIG. 38B, the plate perimeter 846 presses against the outer side of the gasket 802 at the first L-shaped perimeter 840. The first L-shaped perimeter 840 wraps around the perimeter edge of the printed circuit board 804 and compresses against the ledge 853 of the exterior housing 806. The first ridge 854 presses into the first L-shaped perimeter 840, creating a seal between the gasket 802 and the exterior housing 806 to protect the printed circuit board 804 from water and air that may leak in through seams in the housing.

Also shown in FIG. 38B, the screw holes 838 extends into the protrusions 842 of the gasket 802, compressing the protrusions 842 between an innermost end of the screw holes 838 and an inner ledge 843 of screw holes 830 to seal against entry of water and air. The screw holes 834 of the gasket may also be sized to fit tightly around screws 814 to further seal against water and air entry around the screws 814.

As shown in FIGS. 38A and 38C, the second L-shaped perimeter 844 around recess 821 in the gasket is sized and shaped such that the second L-shaped perimeter 844 wraps around perimeter of opening 820 in the printed circuit board 820. The second L-shaped perimeter 844 extends fully around opening 820. When the exterior lock portion 800 is assembled and screws 814 are tightened, recess 821 of the gasket extends through opening 826 of the plate 808 and the second rib 848 of the plate 808 compresses against the outer side of the gasket. The second rib 848 is positioned such that it compresses the second L-shaped perimeter 844, which is wrapped around the edge of the opening 820 of the printed circuit board 804, against the second ledge 857 of the exterior housing 806. The second ridge 858 presses into the second L-shaped perimeter 844 creating a seal between the gasket 802 and the exterior housing 806 to protect the printer circuit board 804 from water and air that may leak in through the handle or lock components in the exterior lock portion.

Figure 39A:
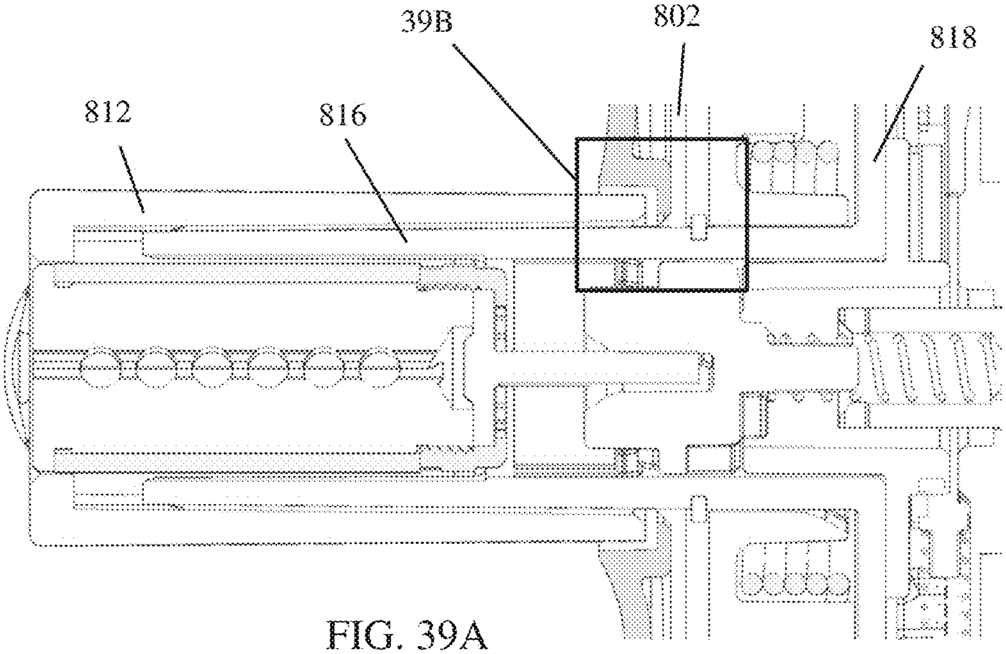
FIG. 39A is a top schematic view of components of the exterior lock portion of FIG. 34.
Figure 39B:
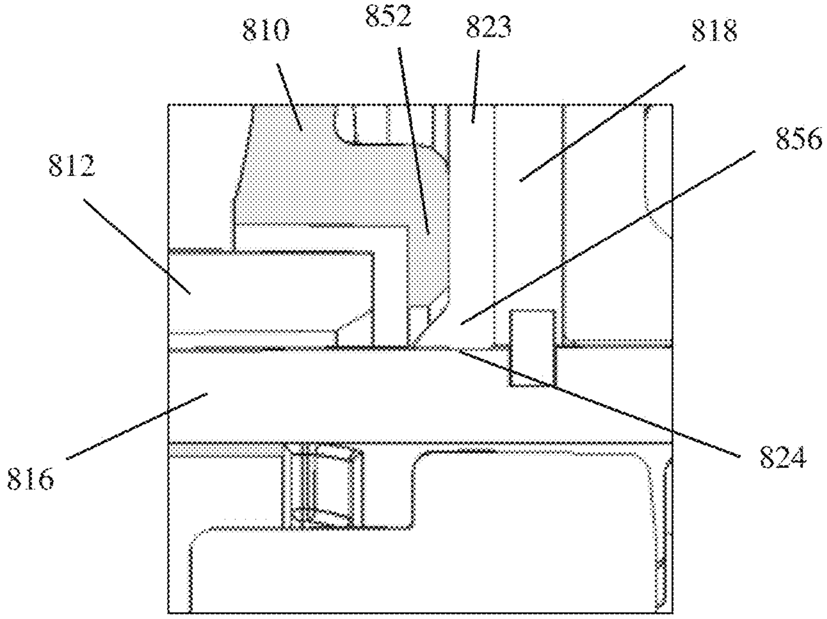
FIG. 39B is an enlarged view of section 39B of FIG. 39A.

As shown in FIGS. 39A-38B, the outer spindle 816 extends through openings 820, 824, 826, 828, of a circuit board 804, gasket 802, plate 808, and exterior escutcheon 810, respectively, and receives a handle 812. The opening 824 of surface 823 of gasket 802 includes a beveled perimeter 856 such that the opening has a smaller diameter on an outer side of the surface 823 than an inner side of surface 823 (see FIG. 36B). A diameter of the outer spindle 816 matches the size of the larger diameter of the beveled perimeter on the inner side of surface 823 and thus is larger than the smaller diameter of beveled perimeter 856. When the exterior lock portion is assembled, rim 852 surrounding opening 828 of the exterior escutcheon 810 (see FIG. 35) compresses a portion of the surface 823 around opening 824 against the cover 818 in the exterior housing 806. The outer spindle 816 extends through opening 824, and the smaller diameter of the beveled perimeter 856 deforms in an outward direction and compresses against the outer spindle 816, as best shown in FIG. 39B. The rim 852 has a diameter sufficiently larger than the diameter of the outer spindle to provide space for the beveled perimeter to deform around the outer spindle without compressing the perimeter 856 between the rim and the outer spindle. Accordingly, the beveled perimeter forms a seal around the outer spindle to prevent entry of water and air through the handle while still allowing the outer spindle to rotate when a handle is rotated to release a door latch and open the door.

Accordingly, the gasket 802 entirely seals the printed circuit board 804 against entry of water and air in the exterior lock portion due to the first L-shaped perimeter 840, the second L-shaped perimeter 844, beveled perimeter 856, and the protrusions 842 being compressed between the respective components.

Figure 40:
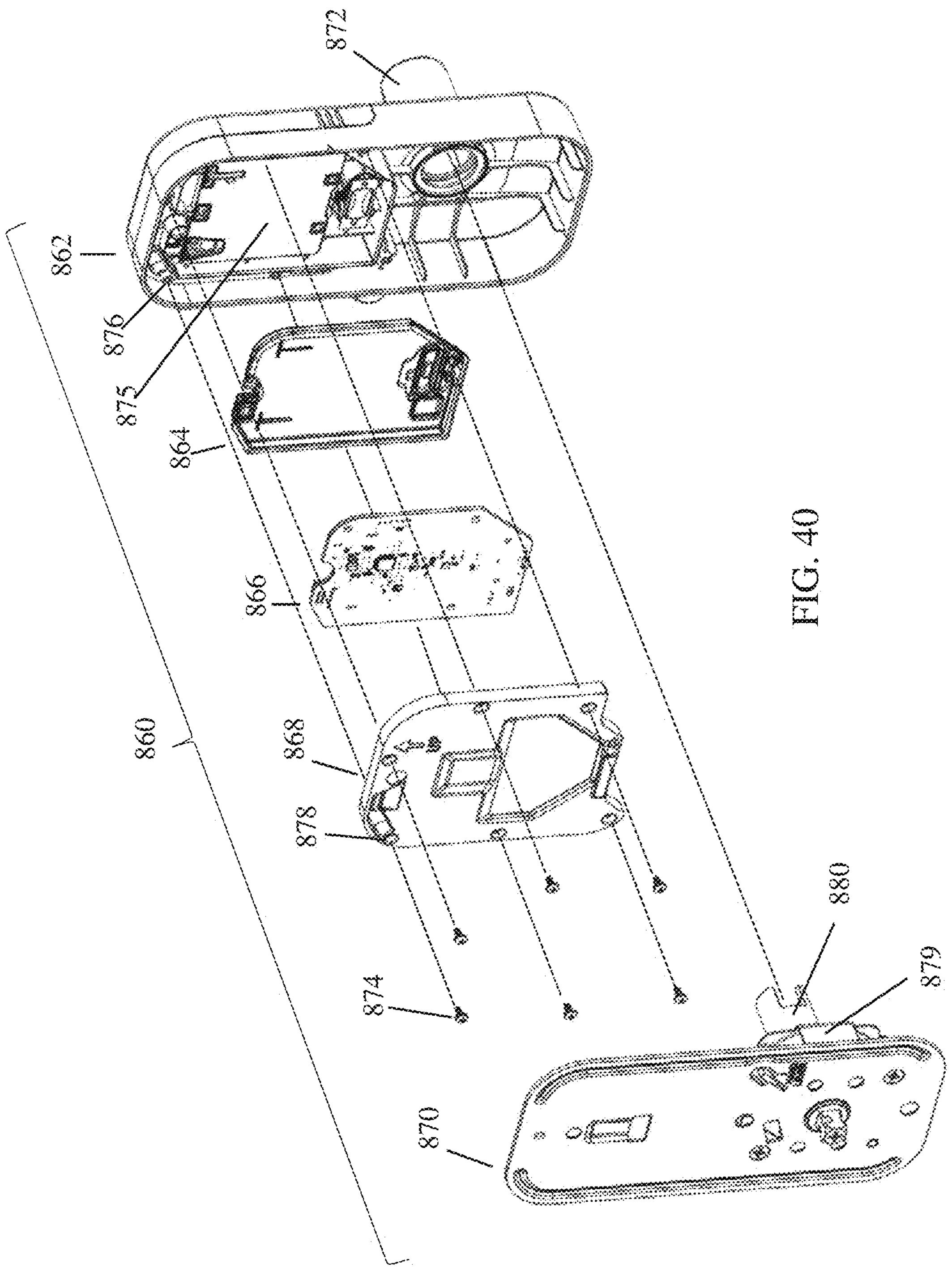
FIG. 40 is an exploded rear perspective view of an interior lock portion, according to an embodiment.
Figure 41:
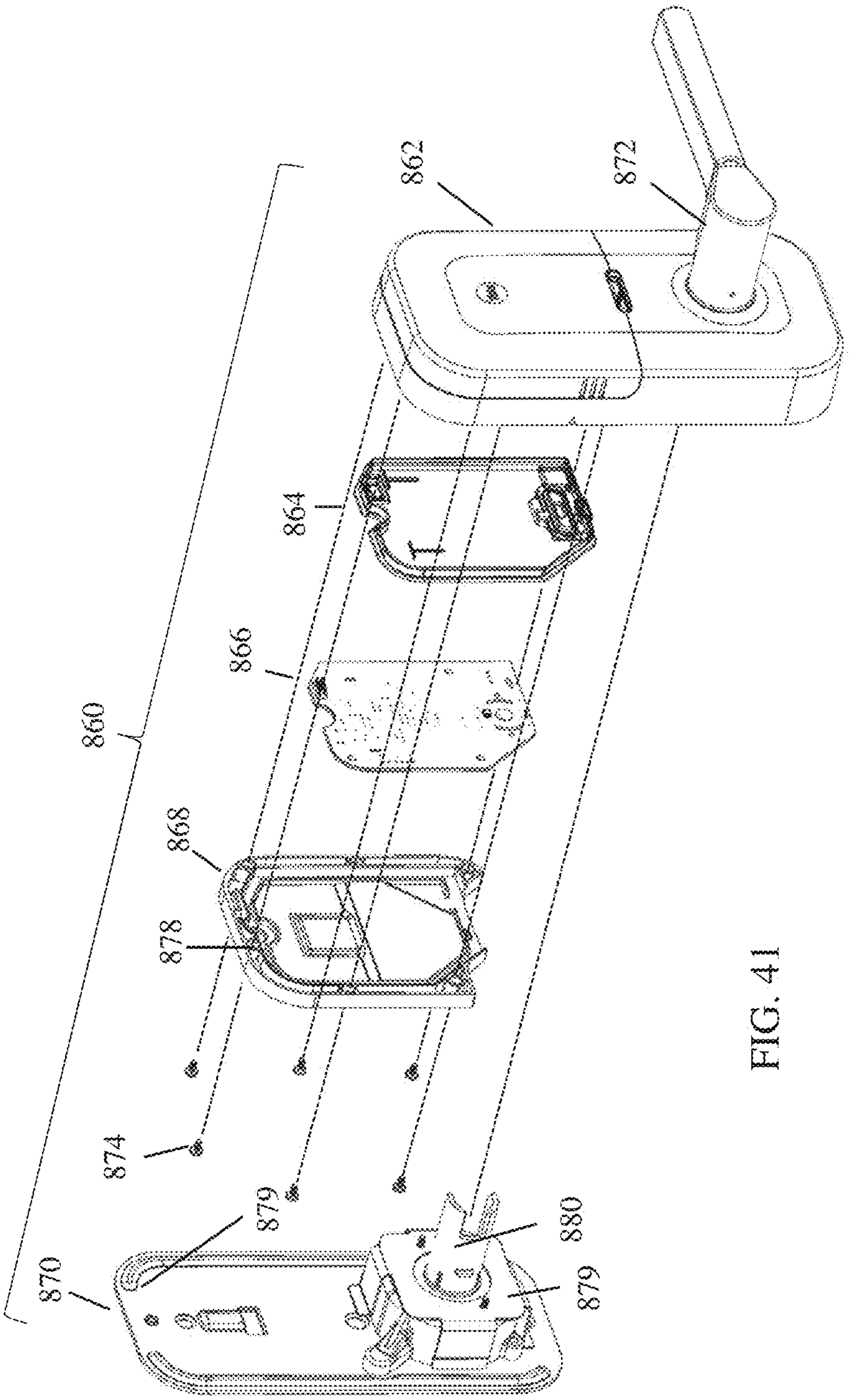
FIG. 41 is an exploded front perspective view of the interior lock portion of FIG. 40.

Now turning to an interior side of a door, FIGS. 40 and 41 show an interior lock portion 860 of the door lock system. In this embodiment, the interior lock portion 860 includes a printed circuit board 866, a gasket 864, and a plate 868 disposed between a back plate 870 and an interior escutcheon 862. The back plate 870 is configured to be installed on an interior surface of a door (not shown). The gasket 864, the printed circuit board 866, and the plate 868 are disposed within a top portion of the interior housing 862. Screws 874 extend through screw holes 878 in the plate 868 from an inner side of the plate in an outward direction to screw holes 876 in the interior housing 862 to compress the circuit board 866 and the gasket 864 between the plate 868 and the interior housing 862 to form a water and airtight seal around the circuit board 866, as will be described below. The interior housing 862 may be attached to the back plate 870 via screws (not shown) or other attachment means (e.g., press or snap fit). The back plate 870 also includes lock and housing components, such as an outer spindle 880 and cover 879. The outer spindle 880 extends through an opening in the interior housing 862 to receive a handle 872 on the outer side of the interior housing 862. It should be noted that although components are described herein specific to the interior lock portion and the exterior lock portion, any components may be included in either the interior or exterior lock portions, as the disclosure is not so limited.

Figure 42A:
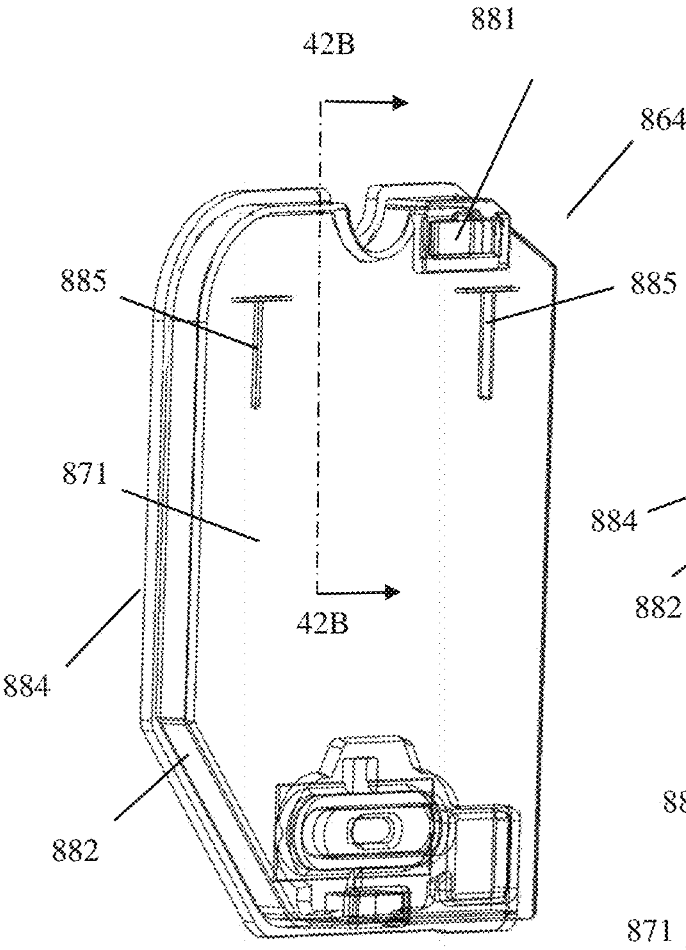
FIG. 42A is a front perspective view of a gasket of the interior lock portion of FIG. 40.
Figure 42B:
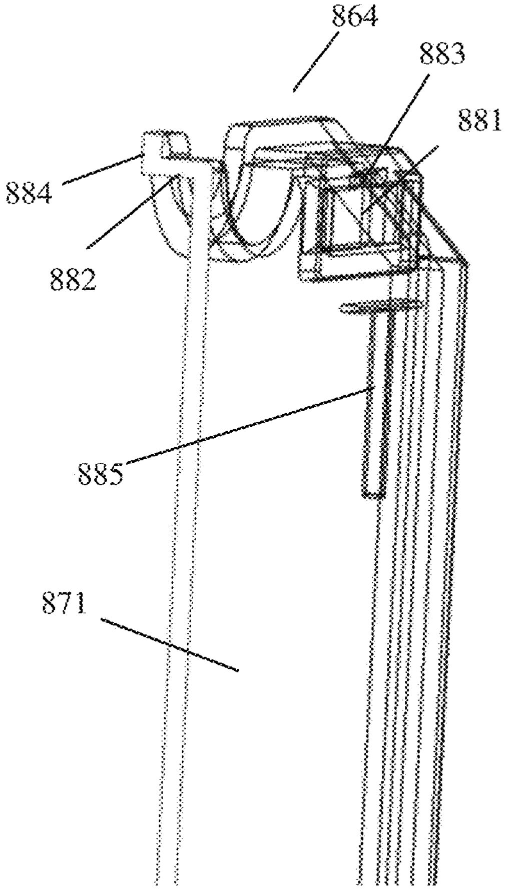
FIG. 42B is a side perspective cross sectional view of the gasket of FIG. 42A taken along line 42B.
Figure 43A:
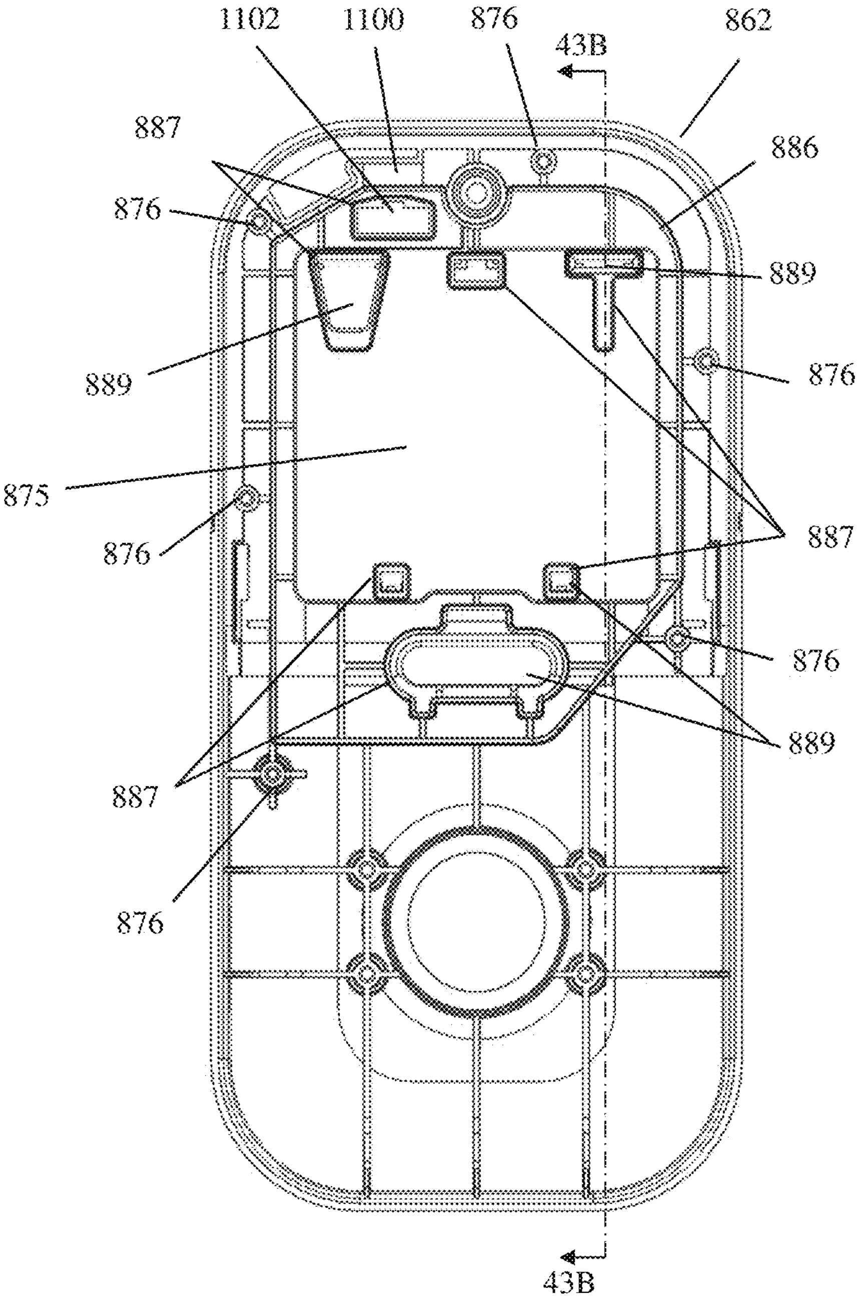
FIG. 43A is a front view of an interior housing of the interior lock portion of FIG. 40.

In this embodiment, as shown in FIGS. 42A-42B, the gasket 864 is formed of a substantially planar body 871 that is shaped to match a cavity 875 in the top portion of the interior housing 862 defined by a cavity wall 886 that extends entirely around the cavity 875 (see FIGS. 40 and 43A). The gasket include an L-shaped perimeter that extends around the circumference of the body 871. The L-shaped perimeter includes a first wall 882 that extends in a direction perpendicular to the body 871 from an inner side of the gasket around an entire perimeter of the body 871. A second wall 884 parallel to the body 871 extends radially outward from an inner end of the first wall 882 around the entire gasket 864. As shown in FIGS. 40-41, the printed circuit board 866 is formed of a substantially elongate and planar body and is sized and shaped to fit within the first wall 882 on an inner side of the gasket 864.

Figure 45A:
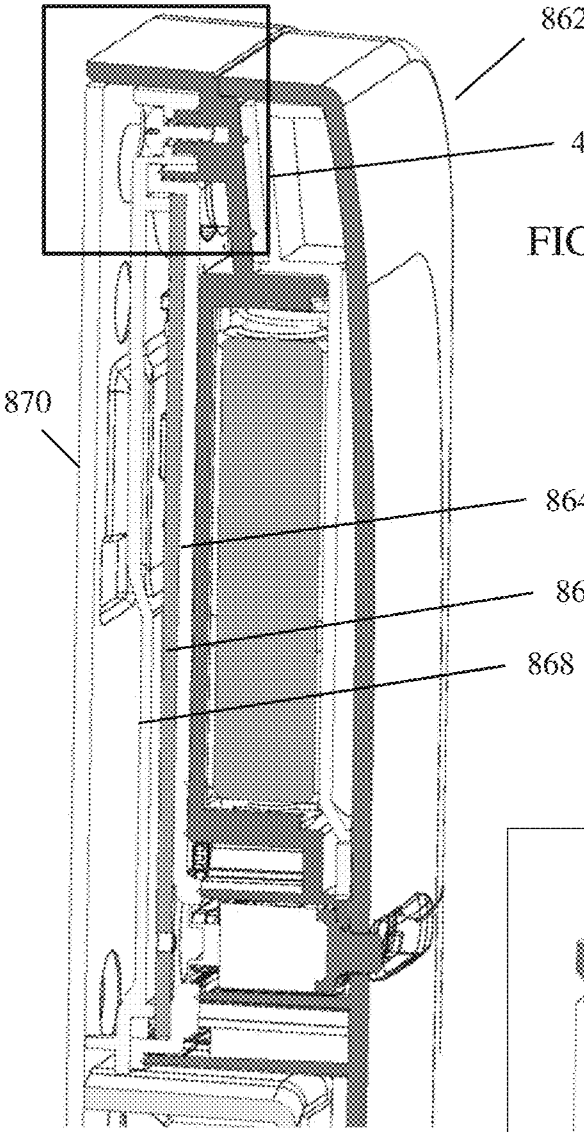
FIG. 45A is a side perspective schematic view of the interior lock portion of FIG. 40.
Figure 45B:
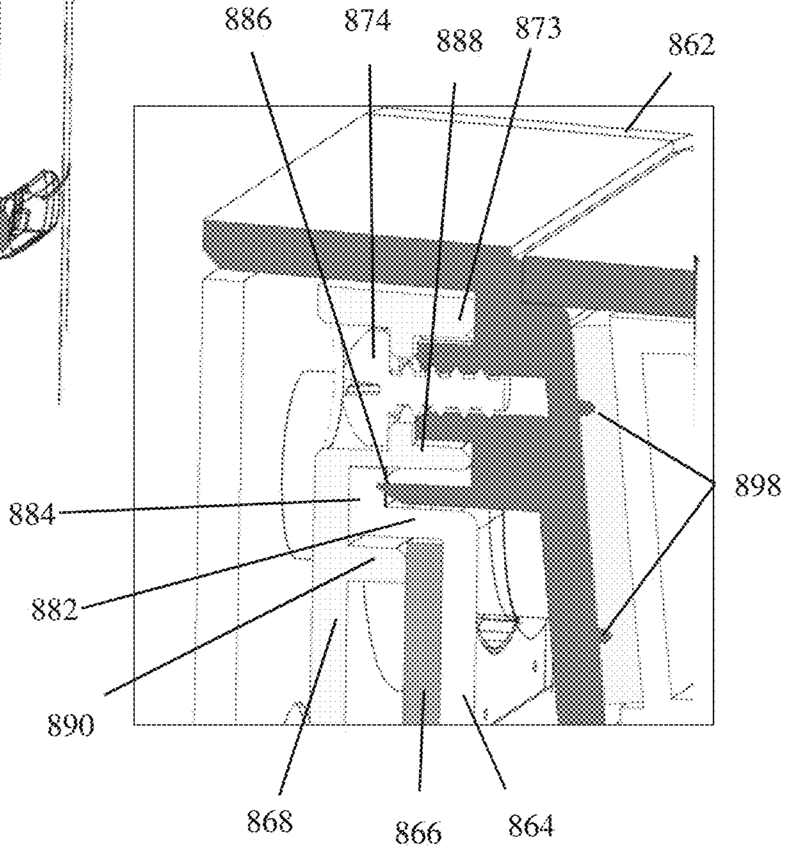
FIG. 45B is an enlarged view of section 45B of FIG. 45A.

The gasket 864 is disposed in the cavity 875 of the interior housing such that the first wall 882 fits within the cavity wall 886 and an innermost portion of the cavity wall 886 presses into an outer side of the second wall 884 (see FIG. 45B). The body 871 may include one or more openings 881, 885 to allow electrical components to extend through the gasket to connect the printed circuit board to electrical components (e.g., power, data) in the interior housing. As non-limiting examples, the gasket body may include slits 885 to allow a metal coil (not shown) to pass through the gasket and connect the circuit board to a battery or other power supply in the interior housing, or an opening 881 to allow a connector to extend through the gasket that connects power or data wires between an internal and external lock portion (see FIGS. 50A-50B).

Figure 43B:
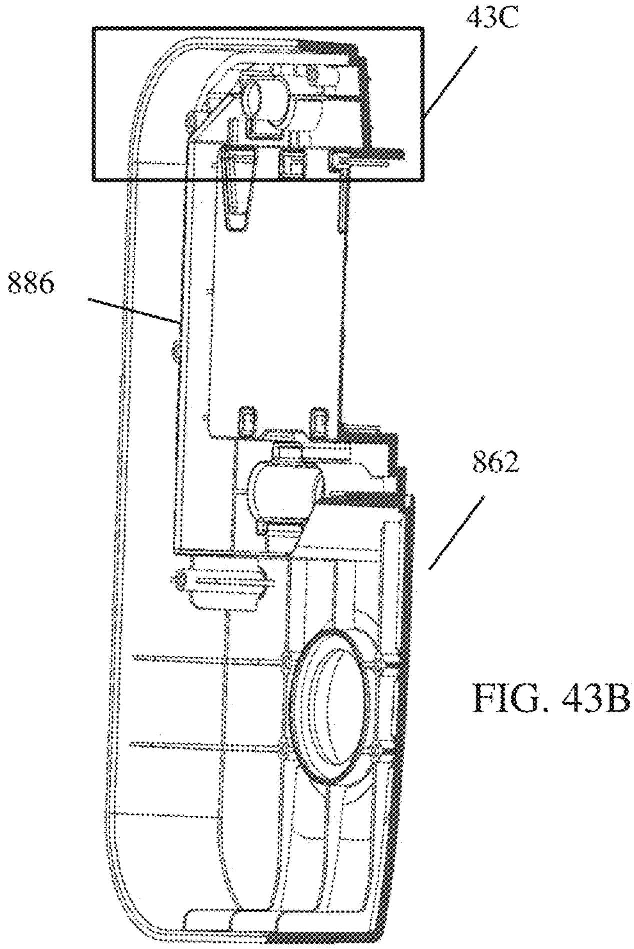
FIG. 43B is a side perspective cross sectional view of the interior housing of FIG. 43A taken along line 43B.
Figure 43C:
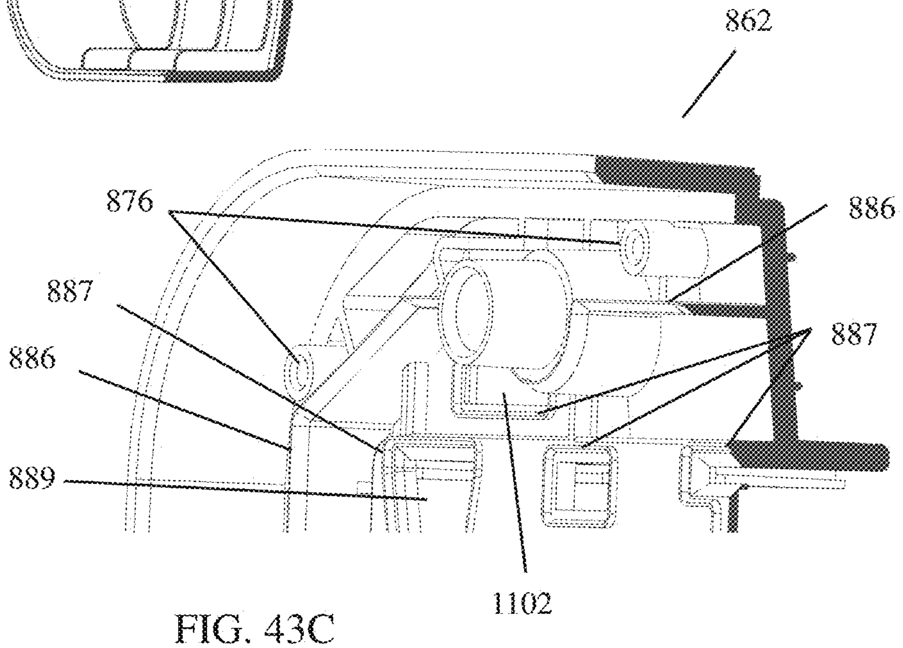
FIG. 43C is an enlarged view of section 43C of FIG. 43B.

FIG. 43A shows a back view of the interior housing 862. A cavity wall 886 extends entirely around cavity 875. The interior housing includes screw holes 876 positioned around the cavity 875 to receive screws 874 to connect plate 868 to the interior housing. Although six screw holes are shown, more or less may be used in various positions within or outside of the cavity. The interior housing may include openings 889 and 1102 positioned within the cavity to allow various electrical components to extend through a surface of the cavity to electrically connect components positioned on an outer side of the interior housing (e.g., power supply, lights, data wires) to the circuit board 866 or electrical components in an exterior lock portion. As shown in FIGS. 43B-43C, the cavity wall 886 includes a beveled edge at the innermost portion. The beveled edge is configured to compress into the first wall 882 of the gasket. The openings 889 and opening 1102 also include a beveled protruding ledge 887 around the entire opening. The beveled edges around each opening are configured to press against the outer surface of body 871 of the gasket 864 when the interior lock portion is assembled to seal each opening against entry of water and gas.

Figure 44:
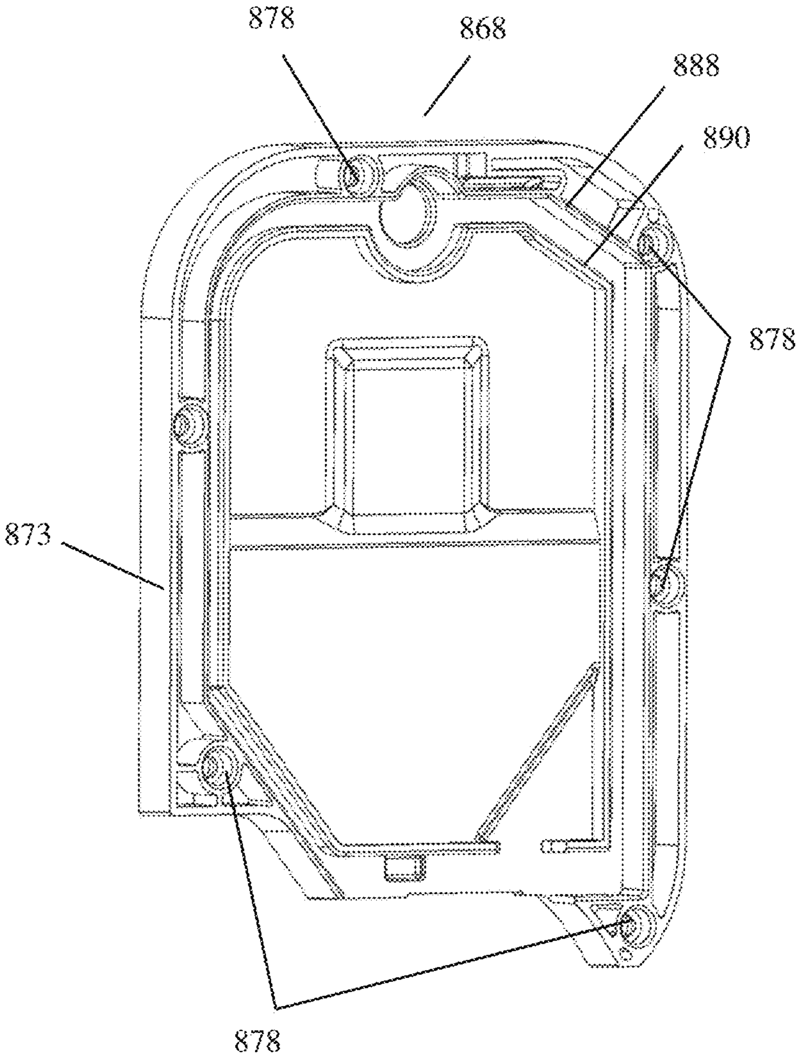
FIG. 44 is a front perspective view of a plate of the interior lock portion of FIG. 40.

As shown in FIG. 44, in this embodiment, a plate 868 is formed of a substantially planar body and is shaped and sized to match the cavity wall 886 of the interior housing. The plate 868 includes screw holes 878 positioned to match the screw holes 876 in the interior housing. The plate includes a plate perimeter 873 that extends outwardly in a direction perpendicular to the body of the plate toward the interior housing. The plate perimeter 873 may extend completely or partially (as shown) around the perimeter of the plate. The plate 868 also includes first and second ribs 888 and 890, respectively, that extend outwardly from an outer side of the plate in a direction perpendicular to a body of the plate. The ribs 888 and 890 are sized and positioned on the plate near the plate perimeter 873 such that the second wall 884 of the gasket is received between the ribs. The ribs 888 and 890 may extend completely or partially around (as shown) the perimeter of the plate.

FIGS. 45A-45B show a cross-sectional schematic view of part of an assembled interior lock portion with the interior housing 862 connected to the back plate 870 and the gasket, circuit board, and plate therebetween. As shown in FIGS. 45A-45B, screws 874 extend through the screw holes 878 in the plate 868 toward the interior housing into screw holes 876 of the interior housing to connect the plate to the interior housing. An outer end of the plate perimeter 873 contacts a surface of the interior housing that acts like a hard stop when the plate 868 is fastened to the interior housing via screws. When the plate is fastened to the interior housing, the gasket and the printed circuit board are compressed between the plate and the interior housing.

As shown in FIG. 45B, the first rib 888 of the plate extends outward a farther distance than the second rib 890 such that the first rib extends outward around an end of the second wall 844 of the gasket and over the cavity wall 886 of the interior housing and contacts a surface of the interior housing. The second rib 890 extends outward around the first wall 882 of the gasket and contacts an inner surface of the printed circuit board 866. As such, the plate 868, when tightened to the interior housing (e.g., via screws 874), compresses the gasket and the circuit board into the interior housing, pressing the beveled edge of cavity wall 886 into an outer side of the second wall 884, and therefor forming a seal between the gasket and the interior housing to prevent water and air from entering. The second wall 884 and the cavity wall 886 extend entirely around the perimeter of the gasket, and as such, a seal is formed around the entire circuit board perimeter which is disposed within the first wall 882 on an inner side of the gasket.

Figure 46:
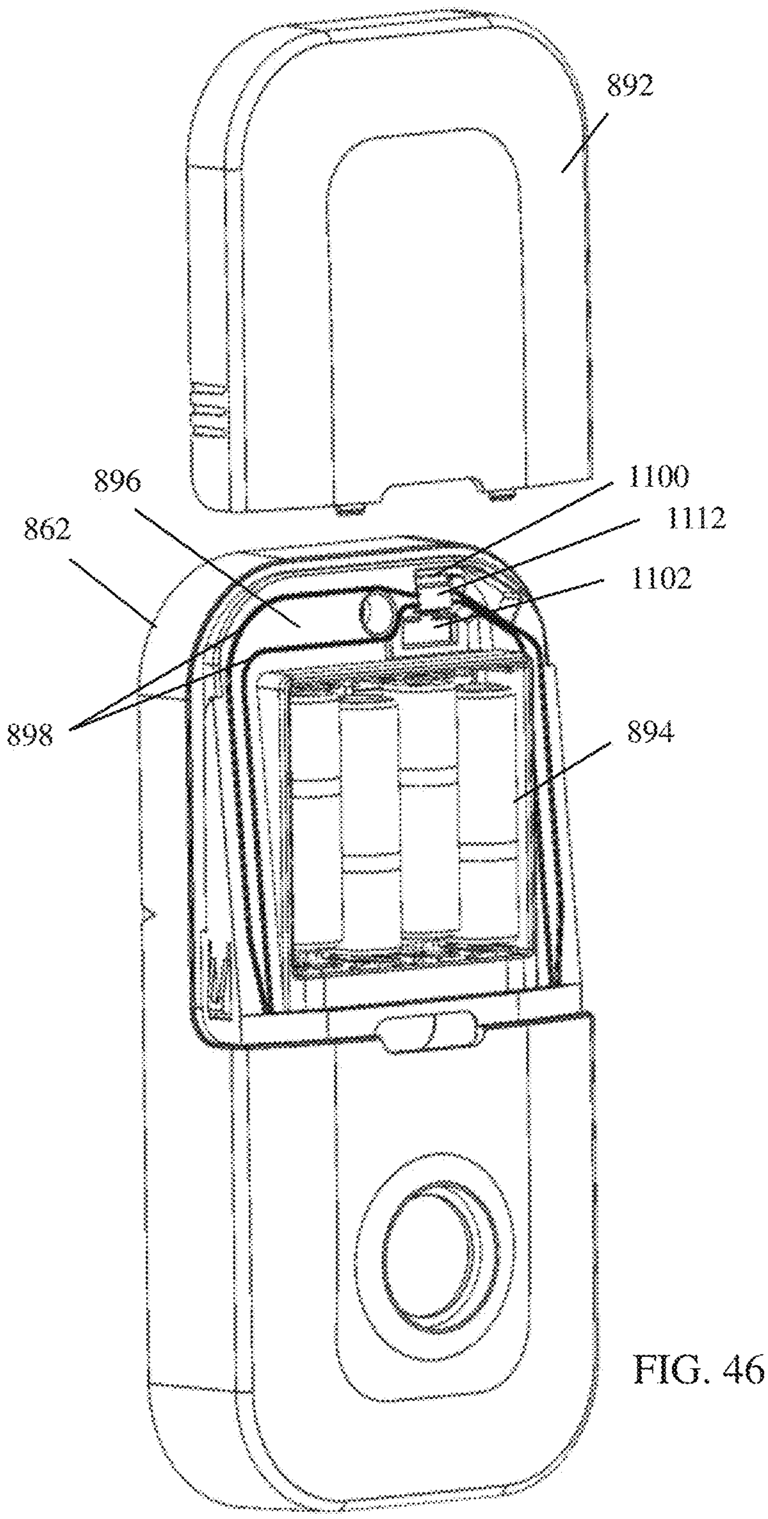
FIG. 46 is a front perspective view of the interior lock portion of FIG. 40 with a handle removed and battery cover displaced upwards.
Figure 47:
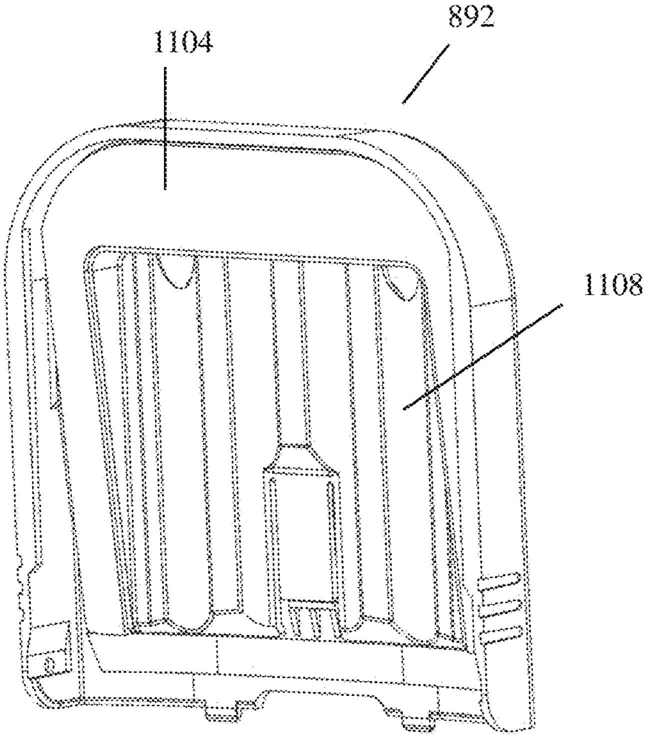
FIG. 47 is a rear perspective view of the batter cover of FIG. 46.

FIG. 46 shows a front perspective view of the interior housing 862 according to one embodiment with a battery cover 892 displaced upwards. As shown in FIG. 46, the interior housing includes a battery compartment 894 disposed on a slanted surface 896 of the interior housing to receive one or more batteries. The battery cover 892 may be slid up and down to attach and remove the cover from the interior housing and access the battery compartment. To prevent water and humid air from entering the battery compartment and potentially corroding the batteries, the slanted surface 896 includes one or more ribs 898 that surround at least the sides and top of the battery compartment 894. As shown in FIG. 47, these ribs 898 are configured to press into a first compressible insert 1104 disposed on an inner surface of the battery cover around a battery compartment 1108. The first compressible insert may be made of foam or any other compressible material. The inner surface of the battery cover is slanted to match the slanted surface 896 on the interior housing such that when the battery cover is attached to the interior housing, the first compressible insert 1104 is compressed between the slanted surface 896 and the inner surface of the battery cover.

Figure 48A:
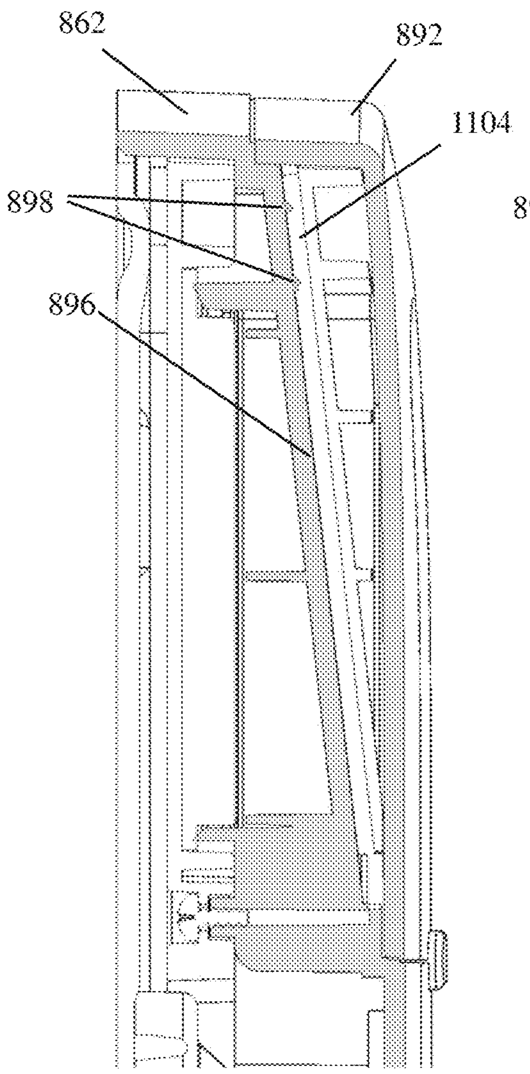
FIG. 48A is a side schematic view of the interior lock portion of FIG. 40 with the battery cover in place.
Figure 48B:
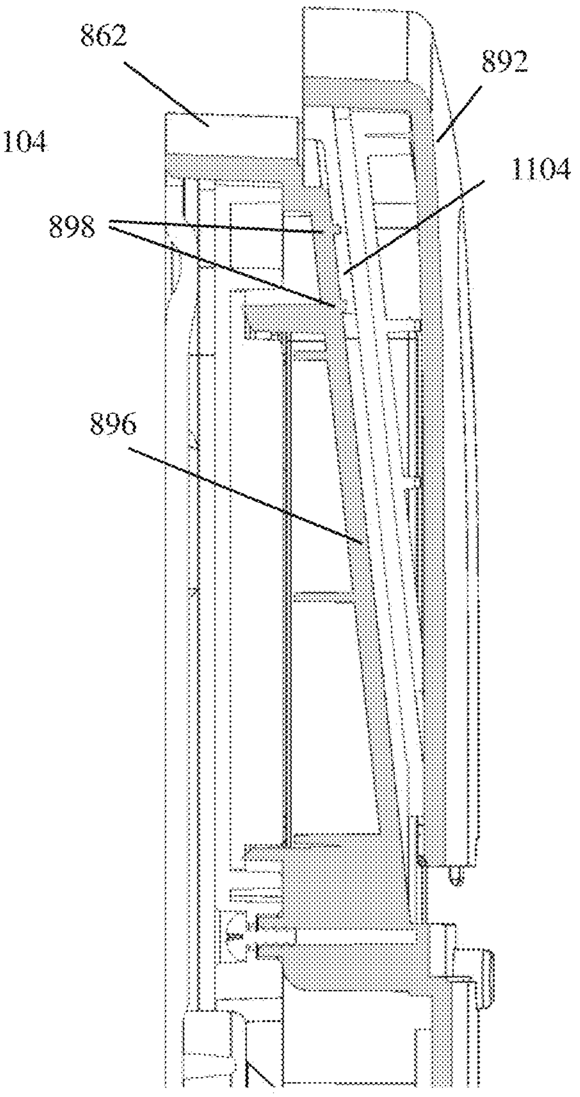
FIG. 48B is a side schematic view of the interior lock portion of FIG. 40 with the battery cover displaced upwards.

FIG. 48A shows a side cross-sectional schematic view of the interior housing 862 with the battery cover 892 attached and FIG. 48B shows a side cross-sectional schematic view of the interior housing 862 with the battery cover 892 detached and displaced upwards. In the attached position of FIG. 48A, the ribs 898 along a top portion of slanted surface press into the first compressible insert 1104, sealing the battery compartment against entry of water and air. Because the surfaces are slanted, the ribs 898 only press into the first compressible insert when the battery cover is attached to the interior housing. As shown in FIG. 48B, the first compressible insert is not in contact with the slanted surface 986 of the front cover when the battery cover is displaced upwards. As such, the battery cover may be slide up and down to remove or attached the cover without the ribs 898 pressing into the first compressible insert 1104, allowing the cover 892 to be easily removed and attached without the ribs 898 rubbing against and damaging the first compressible insert 1104.

Figure 49A:
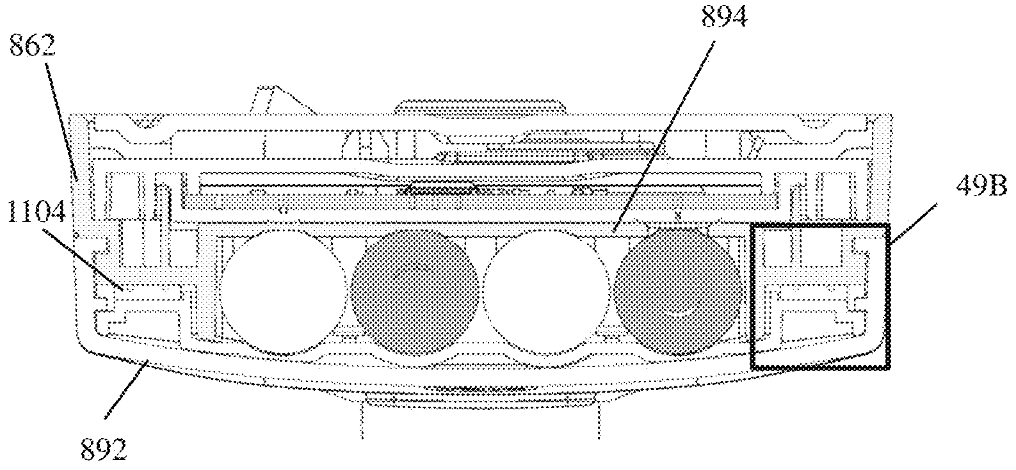
FIG. 49A is a top schematic view of the interior lock portion of FIG. 40 with the battery cover in place.
Figure 49B:
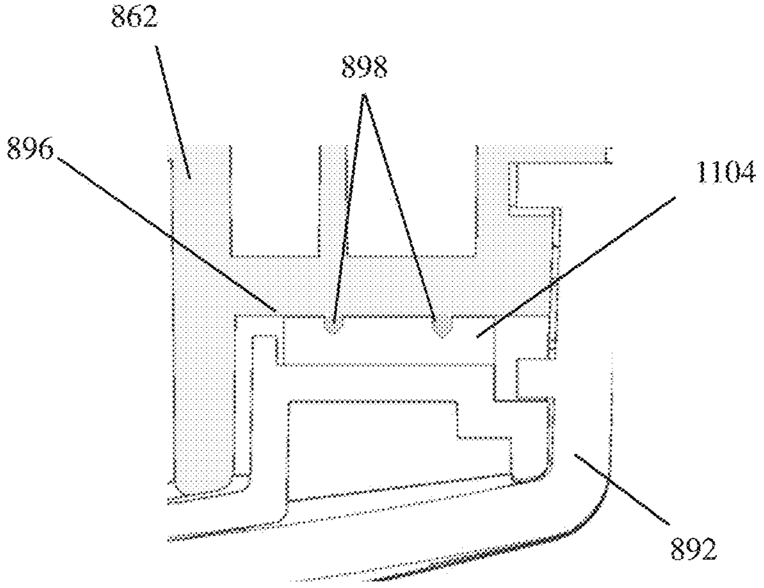
FIG. 49B is an enlarged view of section 49B of FIG. 49A.

FIGS. 49A-49B show a top cross-sectional schematic view of the interior housing through the battery compartment with the battery cover attached. As shown in FIG. 49B, the ribs 898 along the side of the slanted surface 896 compress into the first compressible insert 1104 when the battery cover is attached to the interior housing, sealing the sides of the battery compartment against entry of water and air. Because of the slanted surfaces, when the battery cover is slid upwards to detach the cover from the interior housing, the first compressible insert moves away and off the slanted surface 896 such that the ribs no longer compress into the first compressible insert (see FIG. 48B). Although the illustrated embodiment shows two ribs, it should be appreciated that any number of ribs may in disposed on the slanted surface 896.

Figure 50A:
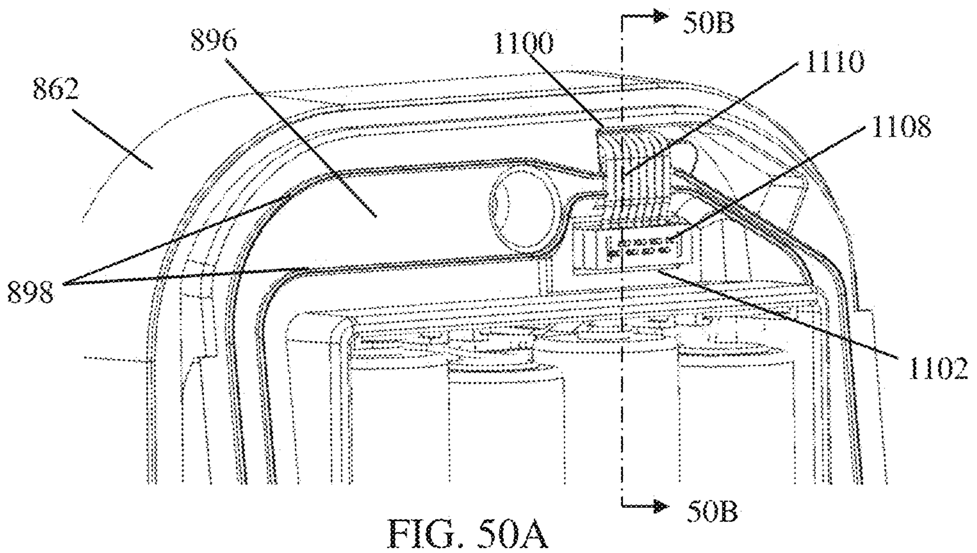
FIG. 50A is a front perspective schematic view of an interior lock portion with a battery cover removed.
Figure 50B:
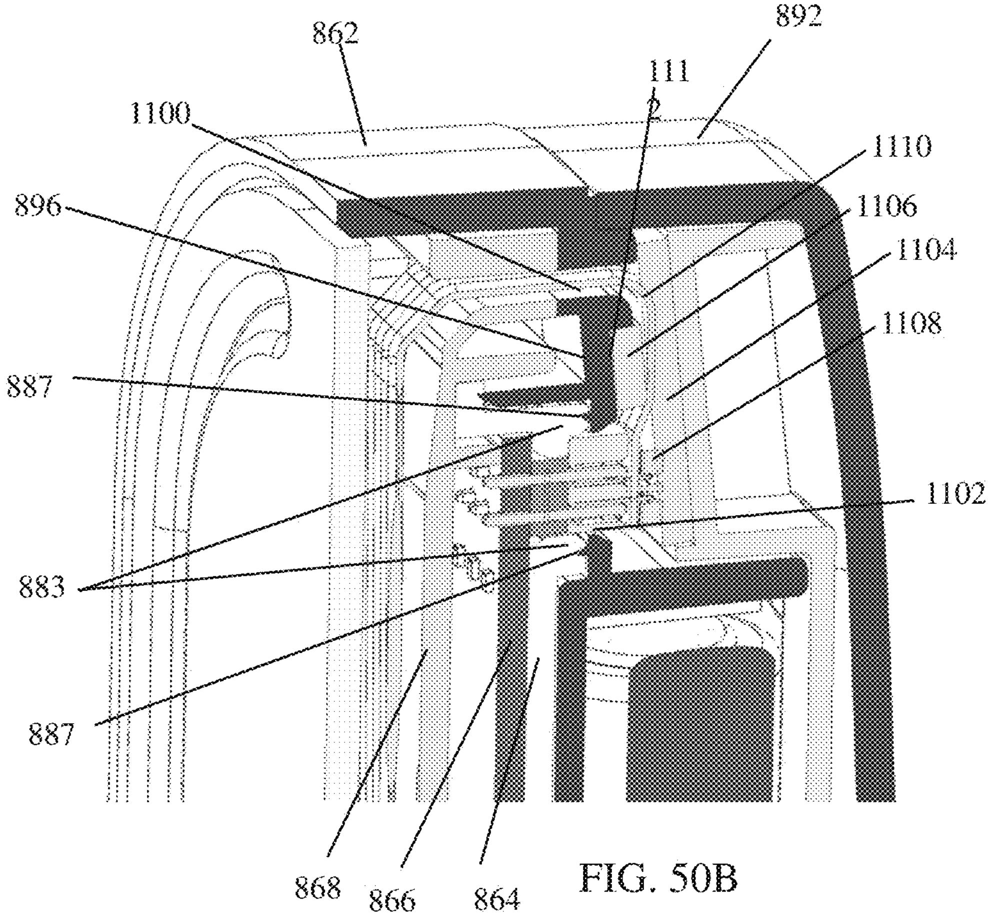
FIG. 50B is a side perspective cross-sectional view of the interior lock portion of FIG. 50A taken along line 50B, with a battery cover in place.

As shown in FIGS. 50A-50B, in some embodiments the interior lock portion may include a connector 1108 that connects to the circuit board and a power supply in the interior housing. In this embodiment, the connector 1108 is disposed in an opening 1102 (see FIG. 43A) of the interior housing and an opening 881 of the gasket 864 (see FIGS. 42A-42B). The opening 881 of the gasket includes a protruding rib 883 in outward direction that extends around the entire perimeter of the opening 881. The connector may include wires 1110 that extend from the connector over slanted surface 896 on the outer side of the interior housing inward through an opening 1100 in the interior housing. The slanted surface 896 may include a surface 1112 between openings 1100 and 1102 (see FIG. 46) which does not include ribs 898 to allow the wires to pass without being compressed by the ribs. Rather, to seal against entry of water and air, a second compressible insert 1106 may be disposed on the surface 1112 between the surface 1112 and an inner side of the wires 1110. When the battery cover is attached, the surface 1112 compresses the second compressible insert 1106 against the inner side of the wires while the first compressible insert 1104 is compressed against an outer side of the wires 1110. The first and second compressible inserts are made of materials that deform sufficiently such that the inserts compress into grooves between the wires 1110, creating a seal above the connector 1108 against entry of water and air.

Also shown in FIG. 50B, the protruding rib 883 around opening 881 of gasket 864, in which the connector is disposed, is pressed against a beveled protruding ledge 887 on the inner side of the interior housing around opening 1102. The protruding rib 883 and the protruding ledge 887 extend completely around the opening 1102, forming a water and airtight seal between the gasket and the interior housing around the opening 1102. Although only the opening 1102 is shown, it should be noted that any openings 889 in the interior housing may form a seal with the outer side of the gasket against water and air entry in a similar way.

Other Lock Configurations

Although the door lock system is shown to be utilized with a cylindrical lock in the embodiments shown in FIGS. 1-50, the present disclosure is not so limited, and the door lock system may be used with other locking arrangements.

Figure 51:
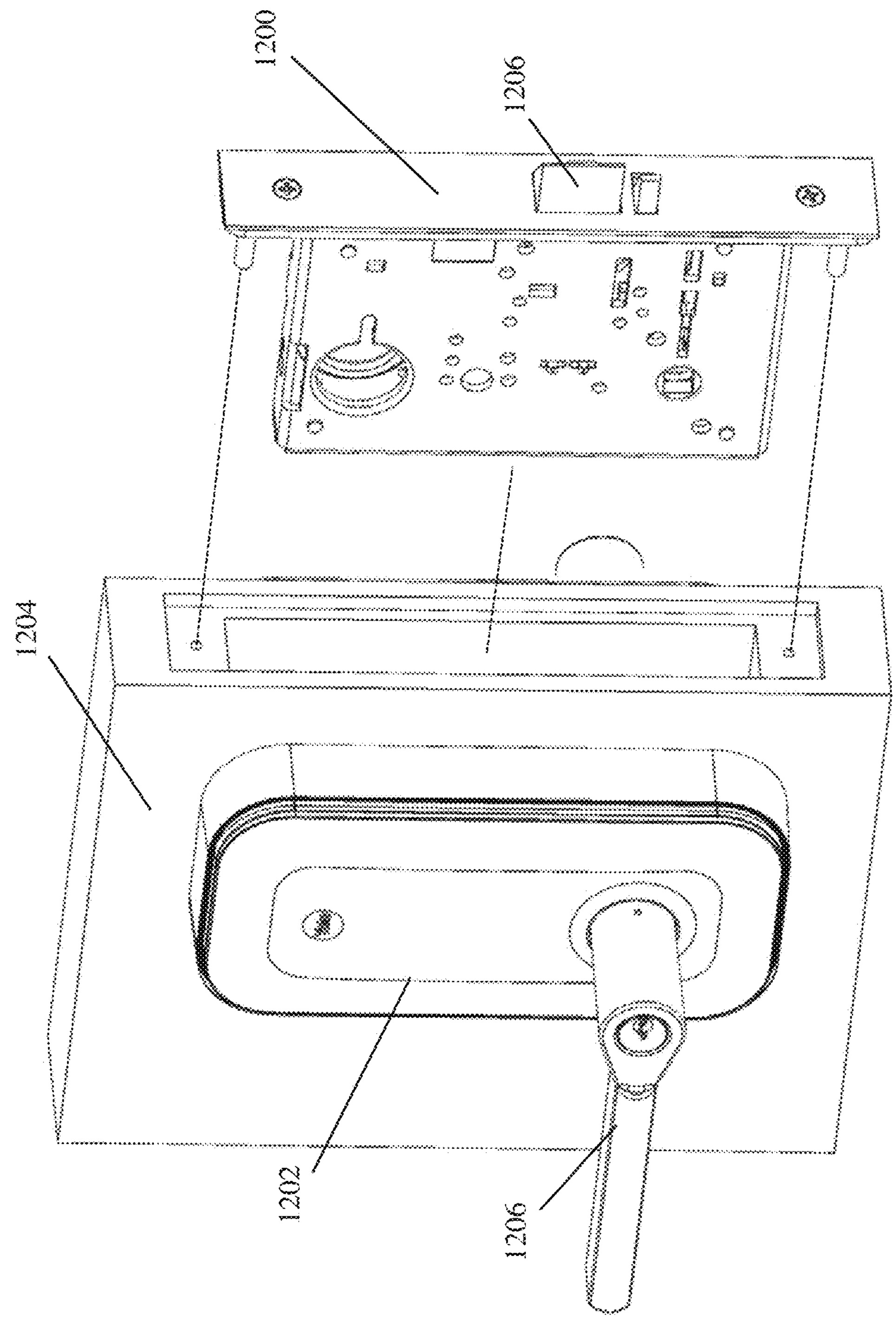
FIG. 51 is a perspective view of an embodiment of a door lock system utilized with a mortise locking arrangement.

Examples of alternative locking arrangements include but are not limited to a mortise lock, an exit device, and a deadbolt In one embodiment, the door lock system may be used with a mortise lock, as shown in FIG. 51, with an exterior lock portion 1202 mounted to a door 1204. Mortise locks are common in both commercial and residential and allow users to lock a door for both entrance and exits. A door 1204 is partially hollowed out along the edge of the door and a lock body 1200 is inserted into the cavity. The lock body 1200 uses a latch 1206 or similar device to keep the door closed and can be opened by a handle 1208 and unlocked with a key or control system.

Figure 52A:
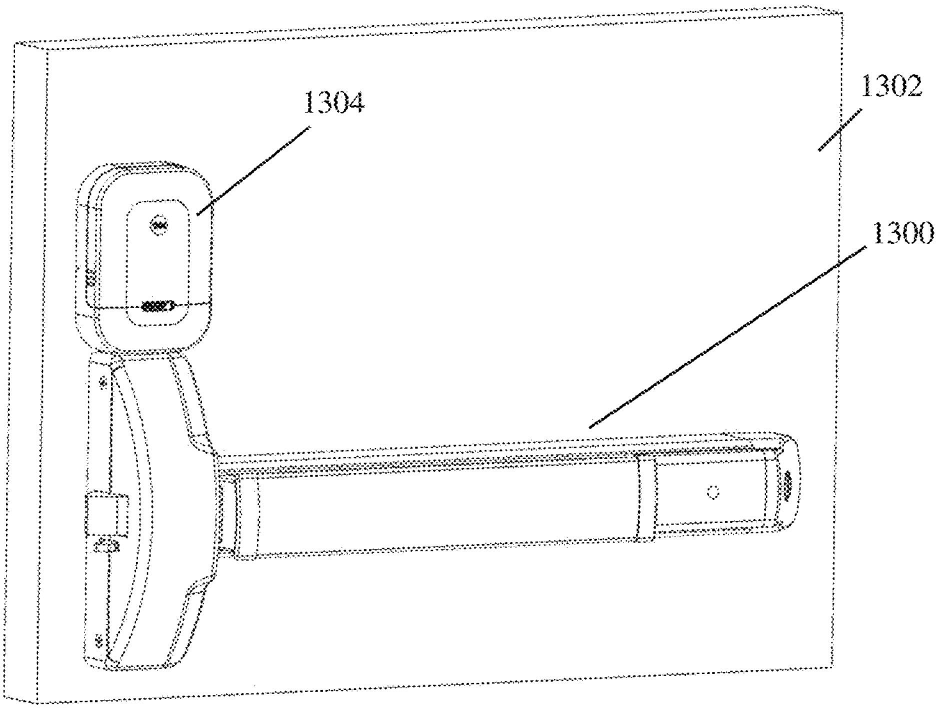
FIG. 52A is a perspective view of an embodiment of a door lock system utilized with an exit device on an interior door.
Figure 52B:
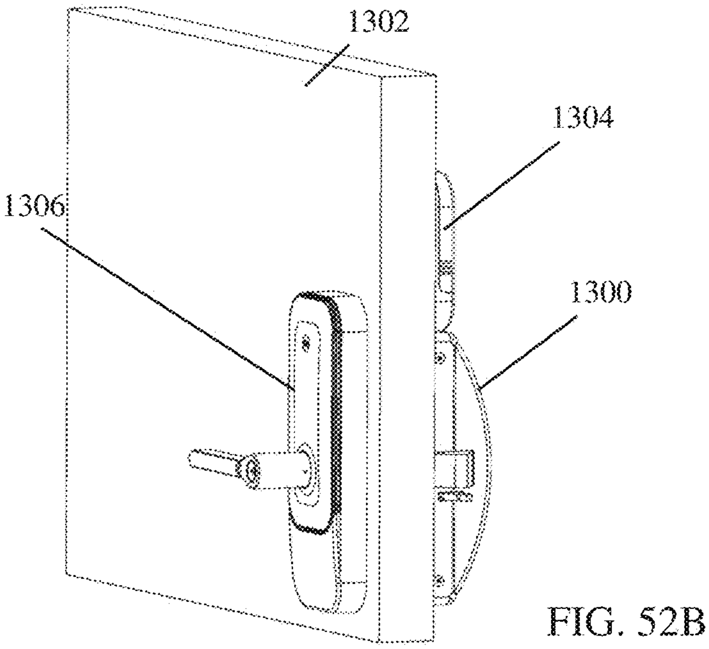
FIG. 52B is a perspective view of an exterior scutcheon of the door lock system of FIG. 52A.

In another embodiment, the door lock system may be used with an exit device, as shown in FIGS. 52A-52B. Exit devices are door features that allow users to open a door from one side. They are typically installed on the face of a door and includes a push bar to allow a user to easily open the door. The push bar moves a latch so that the door can be opened. Some exit devices can be locked or unlocked for the entrance direction, but the exit direction is always unlocked. As shown in FIG. 52A, an exit device 1300 is mounted to an interior side of a door 1302. An interior lock portion 1304 may be mounted in a separate housing from the exit device, as shown. In other embodiments, the interior lock portion 1304 may be formed in the same housing as the exit device. FIG. 52B shows an exterior lock portion 1306 mounted to the exterior side of the door 1302.

Figure 53:
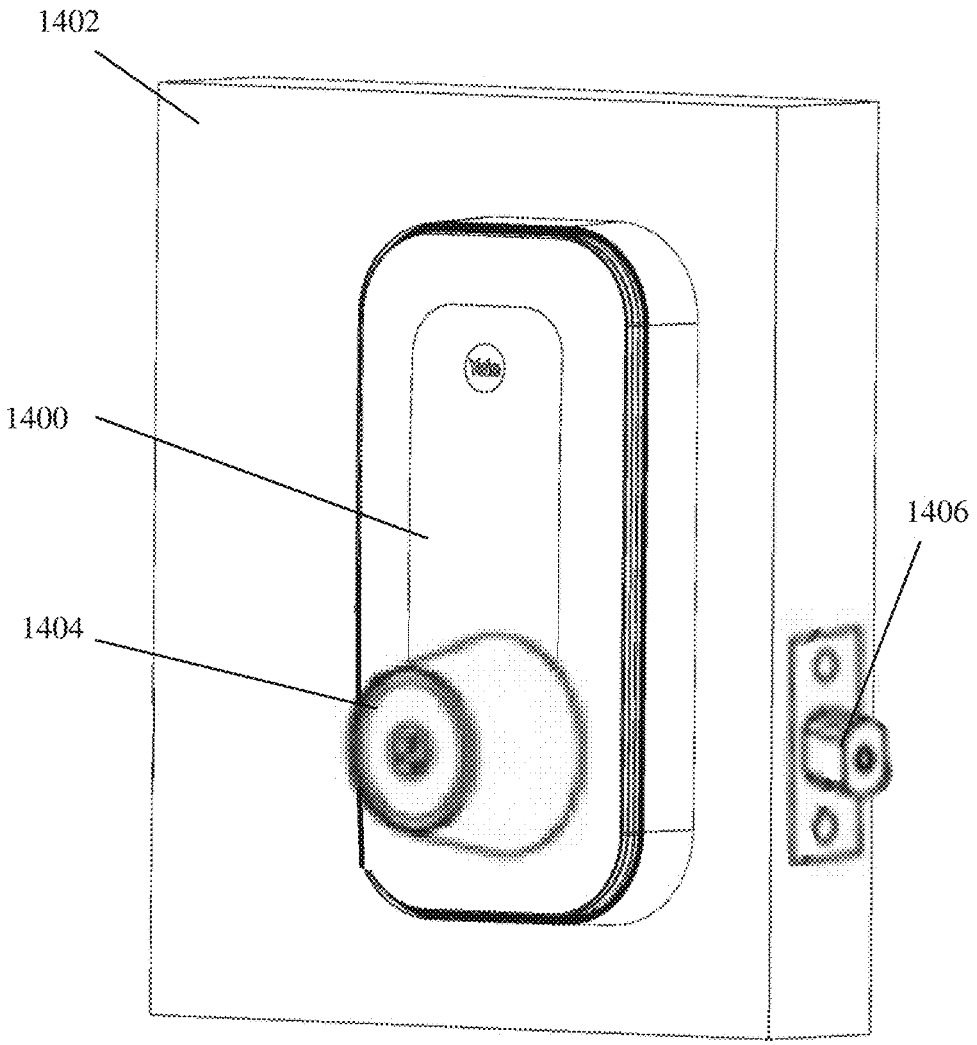
FIG. 53 is a perspective view of an embodiment of a door lock system utilized with a deadbolt locking arrangement.

In still another embodiment, the door lock system may be used with a deadbolt, as shown in FIG. 53. Deadbolts operate in a similar fashion to previously mentioned cylinder locks, however instead of a latch and spring, a bolt 1406 is used. The bolt 1406 extends into a strike when the door is locked by a key, handle, or control system physically turning so that the bolt translates into the strike. FIG. 53 shows an exterior lock portion 1400 with dead bolt assembly 1404 mounted to a door 1402. In some embodiments, the exterior lock portion may include a handle (not shown), or a handle may be mounted to the door 1402 separate from the door lock system.

With the above-described devices and methods, a secure and weather sealed door lock system may be configured to fit any typical door regardless of the conventional door thickness and handing requirements. The lock body and interior and exterior handles may be positioned and set to accommodate all door swings, including left, right, left reverse, and right reverse. No tools or disassembly may be required to set and/or reset the handing of the handles.

It should be understood that the foregoing description of the invention is intended merely to be illustrative thereof and that other embodiments, modifications, and equivalents of the invention are within the scope of the invention recited in the claims appended hereto. Further, the door lock system described above includes various features that may be employed singularly or in any suitable combination.

What is claimed is:

1. A door lock system comprising:

a handle;

a first lock portion comprising a first spindle and a rail fixedly attached to and extending from the first lock portion;

and a second lock portion comprising a second spindle, the first spindle and the second spindle extending along a lock axis;

a lock body comprising a channel offset from the lock axis, the channel sized to receive the rail; wherein, the first spindle is configured to engage a first side of the lock body to bias the lock body in a first direction along the lock axis; and the second spindle is configured to engage a second side of the lock body opposite the first side of the lock body to bias the lock body in a second direction along the lock axis, wherein the first direction is opposite the second direction, and wherein the first spindle and the second spindle exert equal and opposite forces opposing forces on the lock body to move the lock body to a position between the first lock portion and second lock portion;

wherein the rail is offset from the lock axis, and wherein the rail is disposed in the channel whenever the first spindle engages the first side of the lock body, wherein the lock body slides along and relative to the rail as the lock body is moved to the position between the first lock portion and the second lock portion.

2. The door lock system of claim 1, further comprising a first spring configured to exert a force on the first spindle in the first direction; and a second spring configured to exert a force on the second spindle in the second direction.

3. The door lock system of claim 2, wherein the first spring and the second spring have equal spring constants.

4. The door lock system of claim 2, further comprising:

a first spindle holder having a first opening configured to receive the first spring and the first spindle and to compress the first spring between a surface of the first opening and the first spindle; and a second spindle holder having a second opening configured to receive the second spring and the second spindle and to compress the second spring between a surface of the second opening and the second spindle.

5. The door lock system of claim 1, wherein the first spindle and the second spindle have non-circular cross-sectional shapes.

6. The door lock system of claim 1, wherein the first spindle and the second spindle are configured to center the lock body along a central plane of a door.

7. The door lock system of claim 1, wherein the first spindle and the second spindle have square cross-sectional shapes with tapered corners.

8. The door lock system of claim 1, further comprising a disc having an opening configured to receive the first spindle;

wherein the first spindle is configured to slide within the opening along the lock axis within bounded limits; and wherein an outer diameter of the first spindle and an inner diameter of the opening of the disc have complementary shapes and sizes whereby rotation of the handle causes rotation of the disc which causes rotation of the first spindle.

9. The door lock system of claim 8, wherein the opening of the disc includes at least one rib configured to engage at least one ledge extending from an end of the first spindle to prevent the first spindle from extending beyond a first end of the bounded limits.

10. The door lock system of claim 8, further comprising an outer spindle that extends from a surface of the disc opposite the lock body, wherein the outer spindle is configured to receive the handle.

11. A method for installing a lock body in a door; the method comprising:

engaging a first spindle of a first lock portion on a first side of a lock body along a lock axis, wherein the first spindle biases the lock body in a first direction along the lock axis;

engaging a rail fixedly attached to and extending from the first lock portion with a channel in the lock body;

engaging a second spindle of a second lock portion on a second side of a lock body along the lock axis, wherein the second spindle biases the lock body in a second direction opposite the first direction, and wherein the first spindle and the second spindle exert equal and opposing forces on the lock body to approximately center the lock body along a central plane of a door; and wherein the lock body slides along and relative to the rail when the lock body is approximately centered.

12. The method of claim 11, further comprising exerting a first force against the first spindle in the first direction with a first spring and exerting a second force against the second spindle in the second direction with a second spring.

13. The method of claim 12, exerting a first force against the first spindle in the first direction with a first spring and exerting a second force against the second spindle in the second direction with a second spring further comprises exerting equal first and second forces with the first spring and the second spring having equal spring constants.

14. The method of claim 12, further comprising compressing the first spring and the first spindle between a first spindle holder and compressing the second spring and the second spindle between a second spindle holder.

15. The method of claim 11, further comprising sliding the first spindle within an opening of a disc along the lock axis within bounded limits.

16. The method of claim 15, further comprising engaging at least one rib of the opening of the disc with at least one ledge extending from an end of the first spindle to prevent the first spindle from extending beyond a first end of the bounded limits.

17. The method of claim 11, further comprising aligning the lock body with a latch on an edge of the door.

18. The method of claim 11, further comprising engaging an outer spindle that extends from a surface of a disc opposite the lock body to a handle to rotate the disc, wherein rotation of the disc rotates the first spindle.

19. The method of claim 18, further comprising attaching the handle to the outer spindle, and wherein rotation of the handle rotates the disc.

20. The method of claim 18, further comprising engaging an opening of the disc with a complementary shaped and sized outer diameter of the first spindle such that rotation of the disc rotates the first spindle.

* * * * *